(12) United States Patent
Prasad

(10) Patent No.: US 6,958,232 B2
(45) Date of Patent: Oct. 25, 2005

(54) AGROPOLYMER CONTAINING A CARBOHYDRATE AND SILICA MATRIX FROM PLANTS

(75) Inventor: Yandapalli Durga Prasad, Machilipatnam (IN)

(73) Assignee: Bijam Biosciences Private Limited, Hyderabad (IN)

( * ) Notice: Subject to any disclaimer, the term of this patent is extended or adjusted under 35 U.S.C. 154(b) by 0 days.

(21) Appl. No.: 09/938,757

(22) Filed: Aug. 24, 2001

(65) Prior Publication Data

US 2002/0062498 A1 May 23, 2002

Related U.S. Application Data

(63) Continuation of application No. PCT/IN00/00015, filed on Feb. 24, 2000.

(30) Foreign Application Priority Data

Feb. 24, 1999 (IN) ........................................ 223/MAS/99
Feb. 24, 1999 (IN) ........................................ 222/MAS/99

(51) Int. Cl.$^7$ .............................. B09B 3/00; C07H 1/00
(52) U.S. Cl. .................... 435/262; 435/262.5; 536/1.11
(58) Field of Search .............................. 435/262, 262.5; 536/1.11; 424/400, 484, 725, 405, 485, 93.7; 514/23

(56) References Cited

U.S. PATENT DOCUMENTS 5,352,264 A * 10/1994 Vega
5,830,887 A * 11/1998 Kelly

FOREIGN PATENT DOCUMENTS

| DE | 3736950 | 5/1989 |
| WO | 9312877 | 7/1993 |
| WO | 9502452 | 1/1995 |

* cited by examiner

Primary Examiner—David M. Naff
Assistant Examiner—Deborah K. Ware
(74) Attorney, Agent, or Firm—Baker Botts LLP

(57) ABSTRACT

The present invention relates to novel agropolymers, which comprise a carbohydrate and/or silica matrix substantially devoid of proteins, tannins and polyphenols and which comprise metal binding reactive sites. A method of producing the agropolymers is also disclosed wherein the agropolymers are derived from plant materials such as seed coats, seed covers, husks, or hulls of various agricultural crops. The agricultural crops typically used to produce the agropolymers include *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp. The agropolymers of the present invention are capable of purifying aqueous solutions polluted or contaminated with metals and/or ions. Thus, the present invention also discloses a method whereby agropolymers are used in the purification of contaminated water and other aqueous solutions. The agropolymers disclosed herein are useful in several industrial applications including purifying polluted drinking water or ground water.

13 Claims, 72 Drawing Sheets

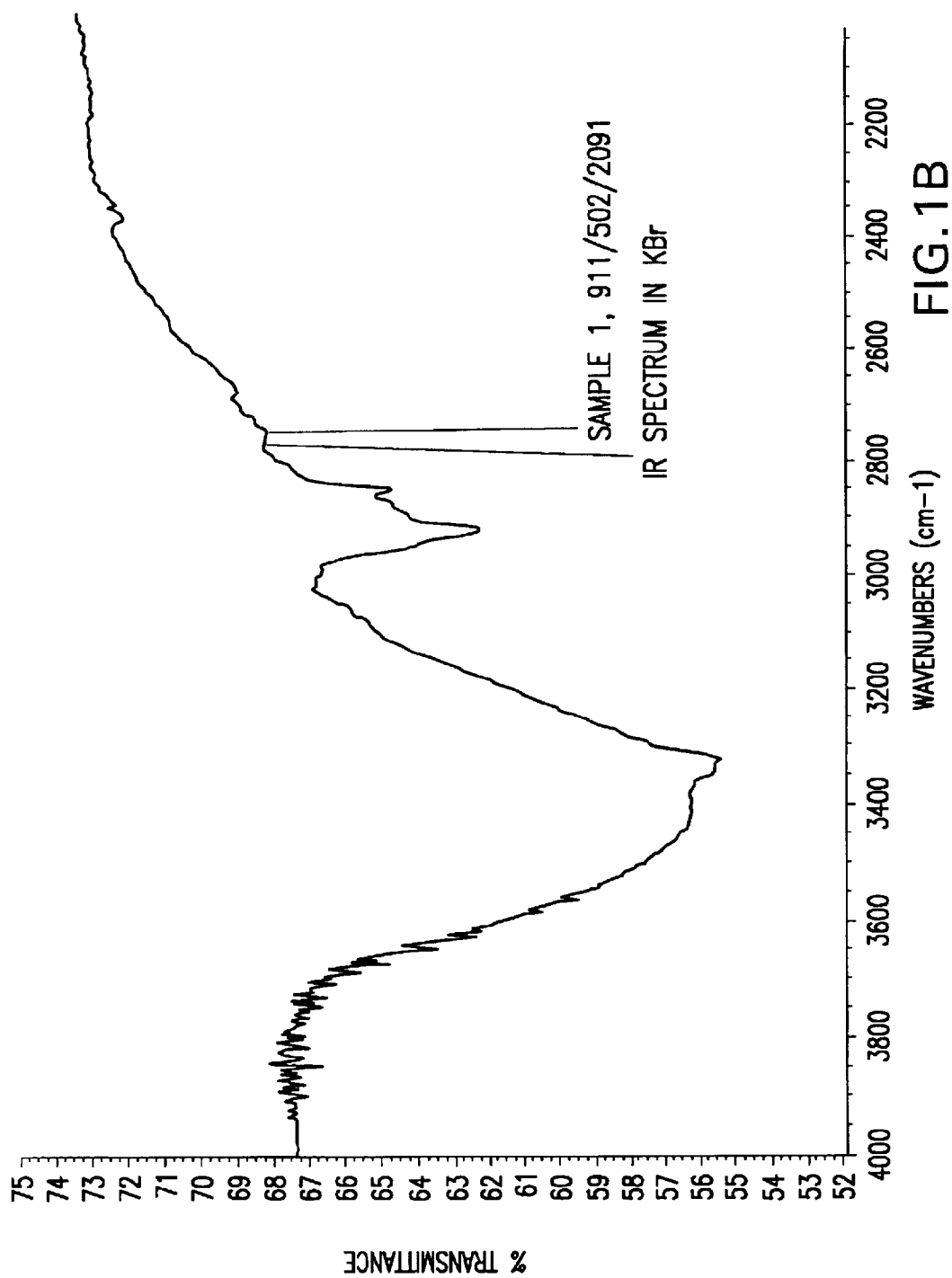

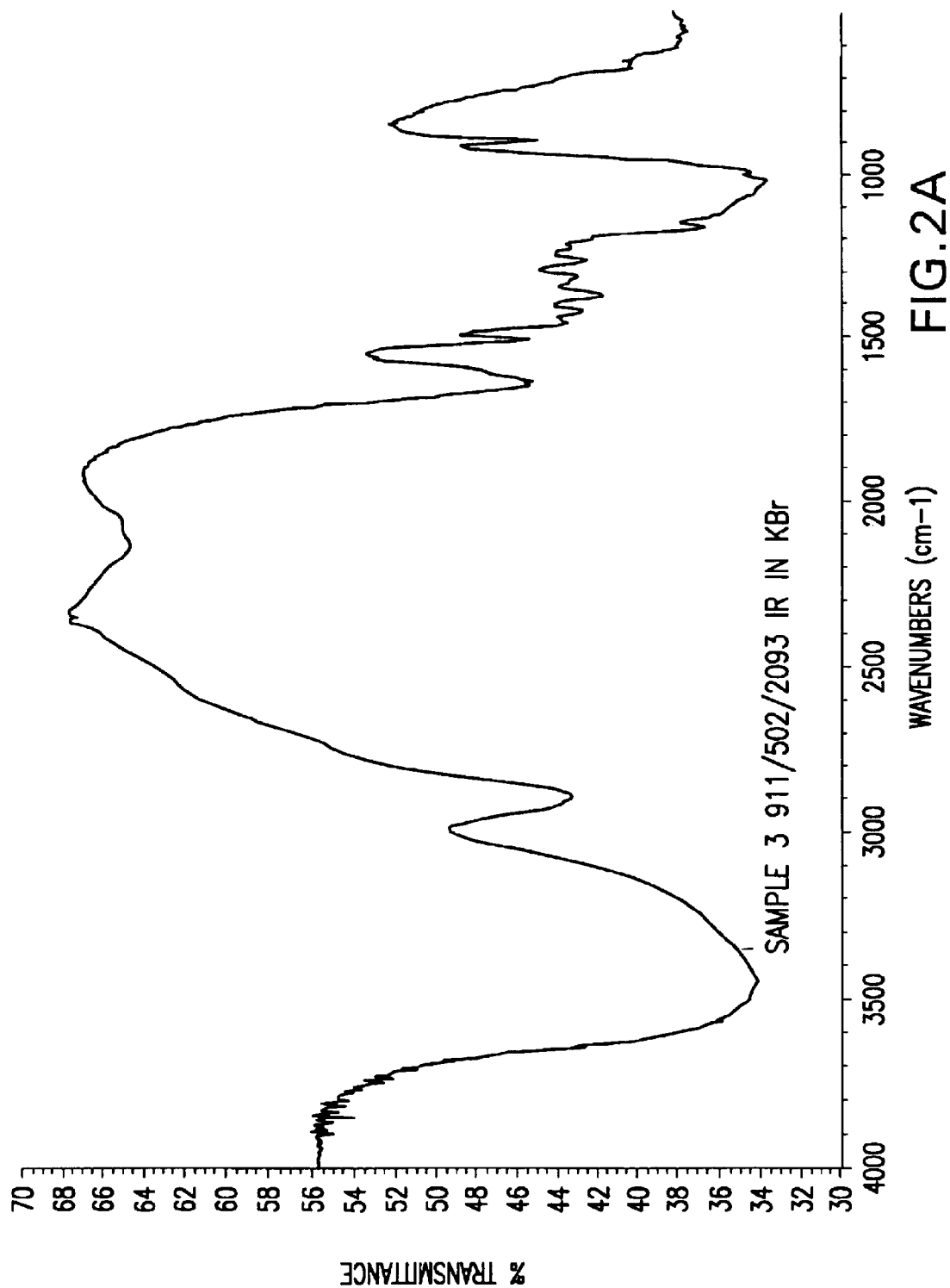

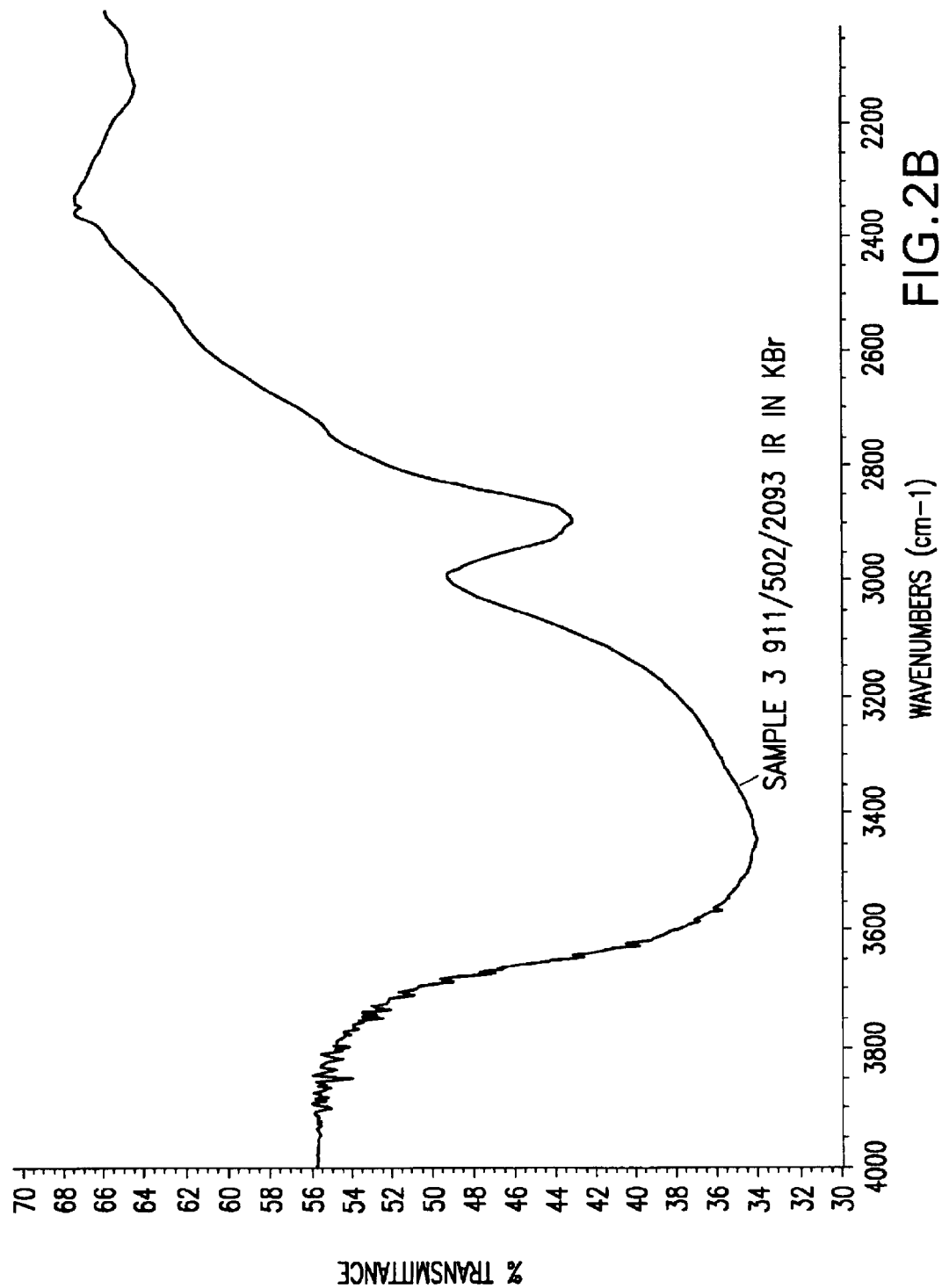

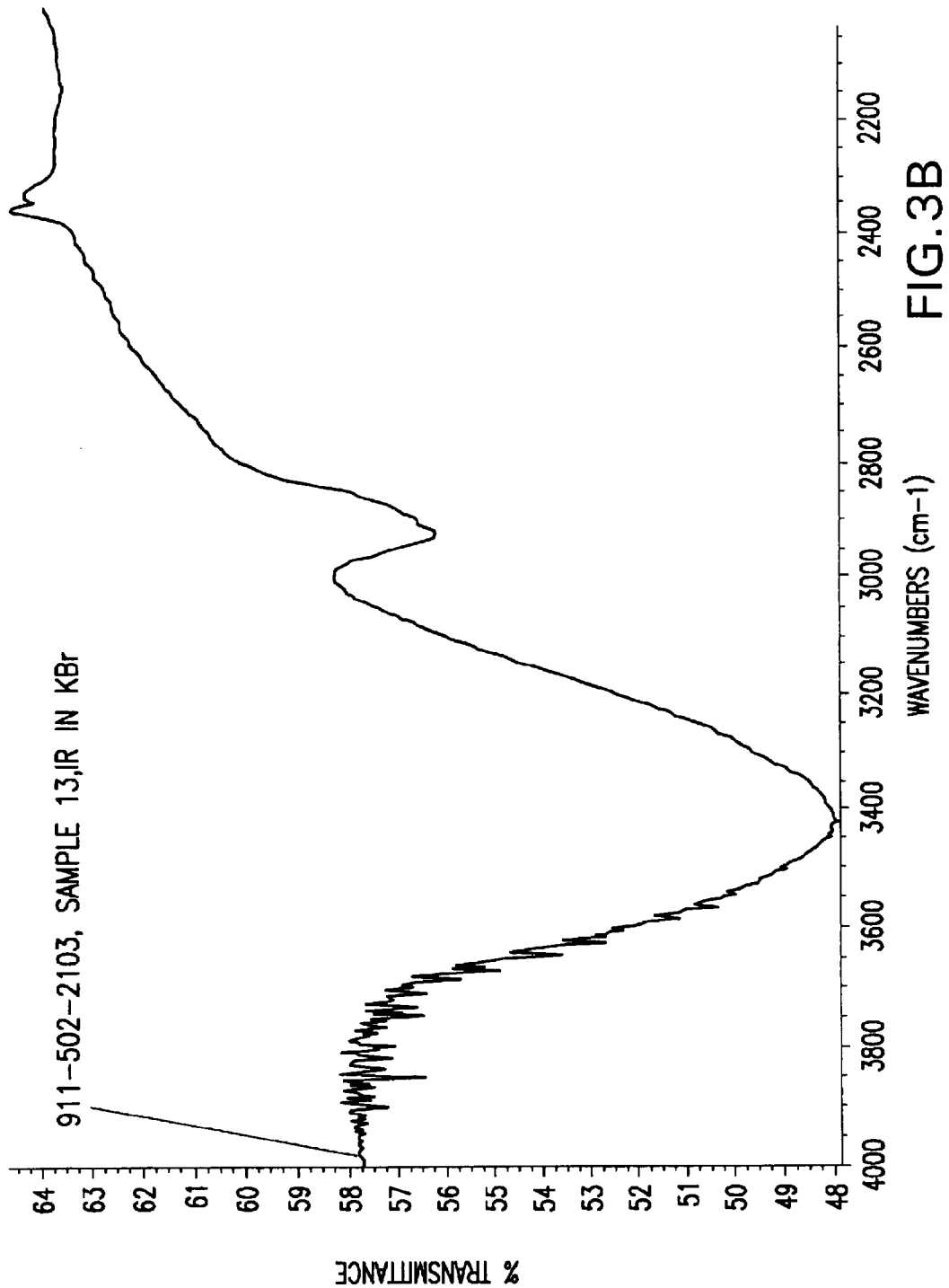

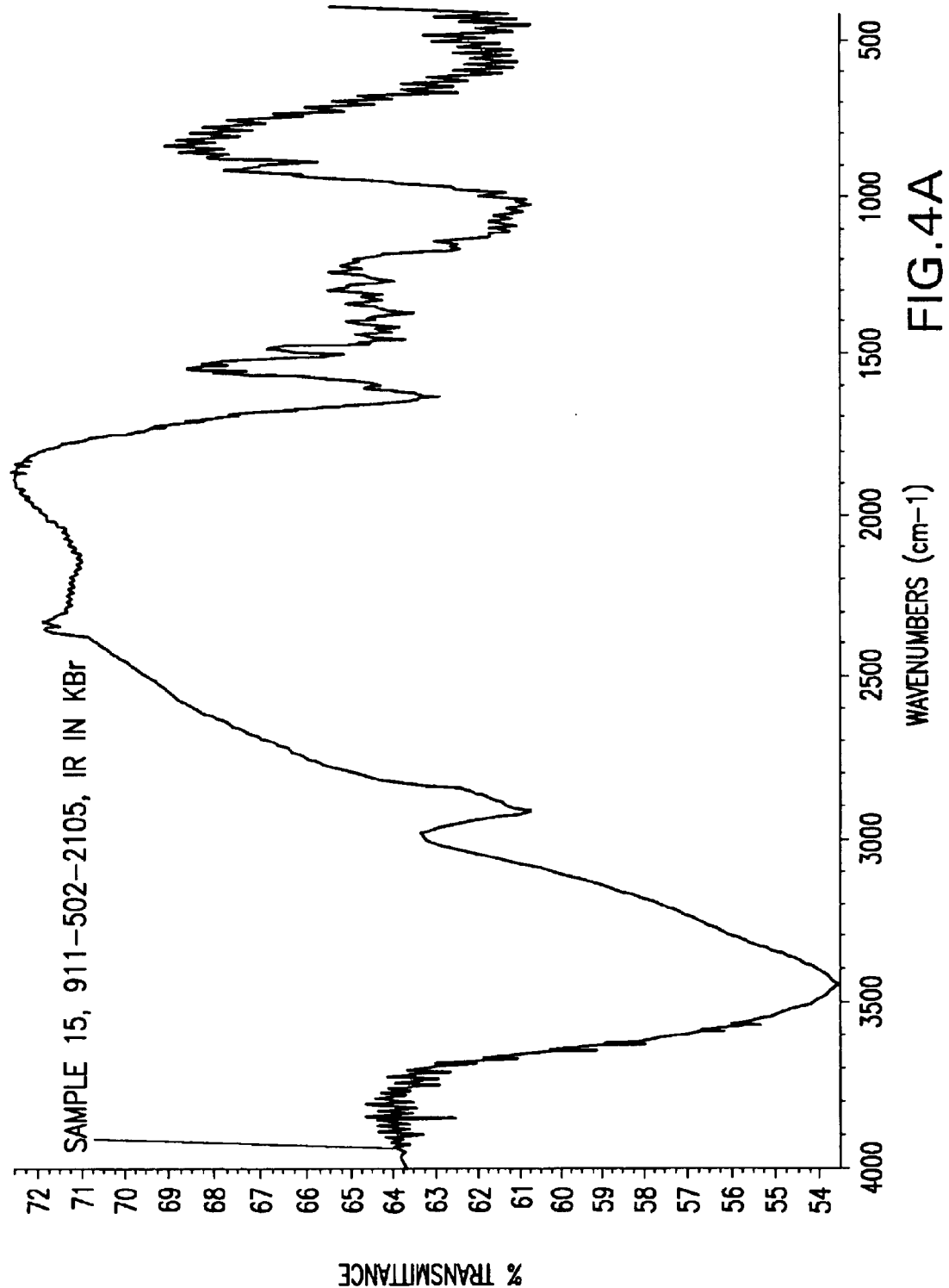

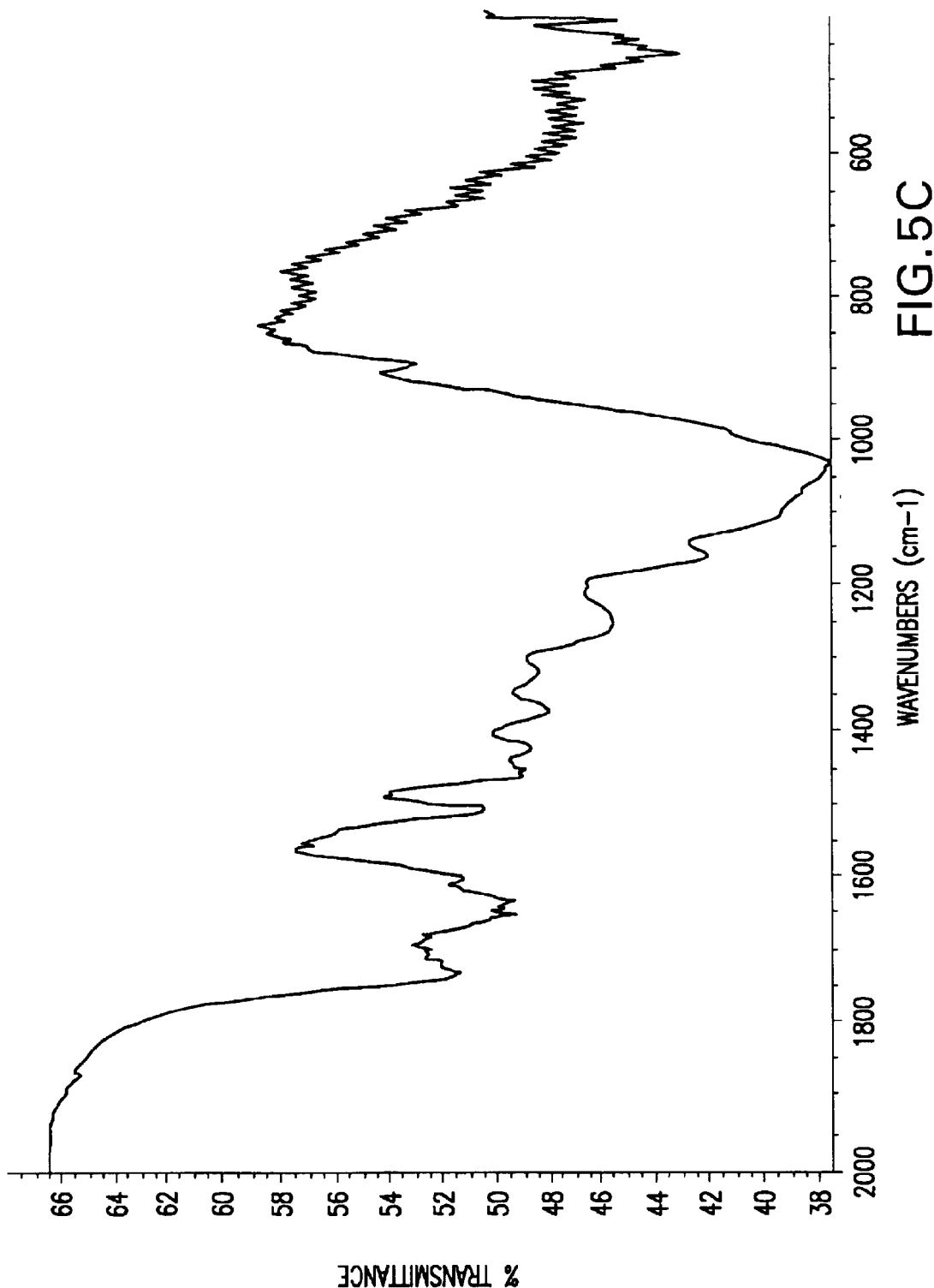

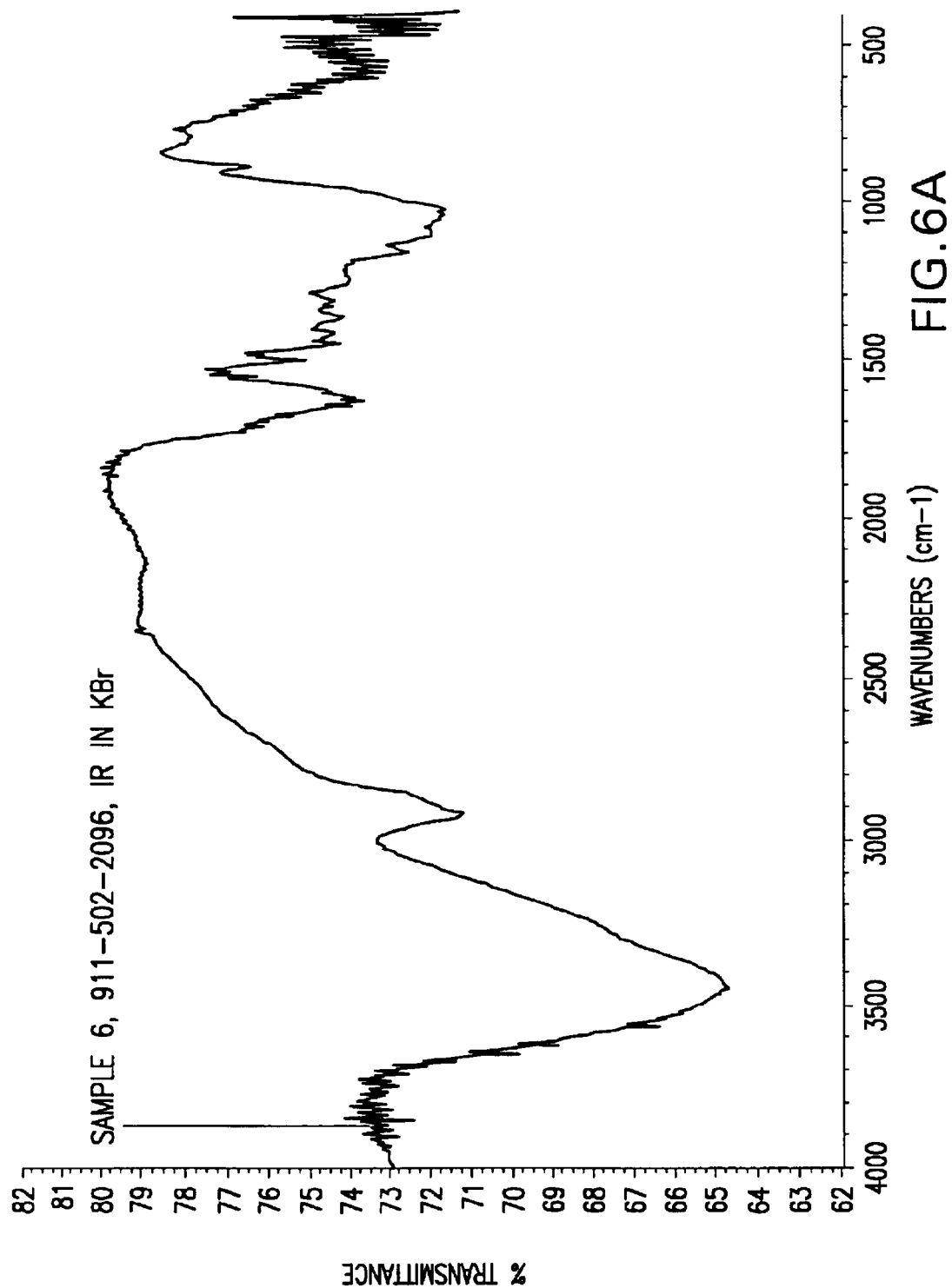

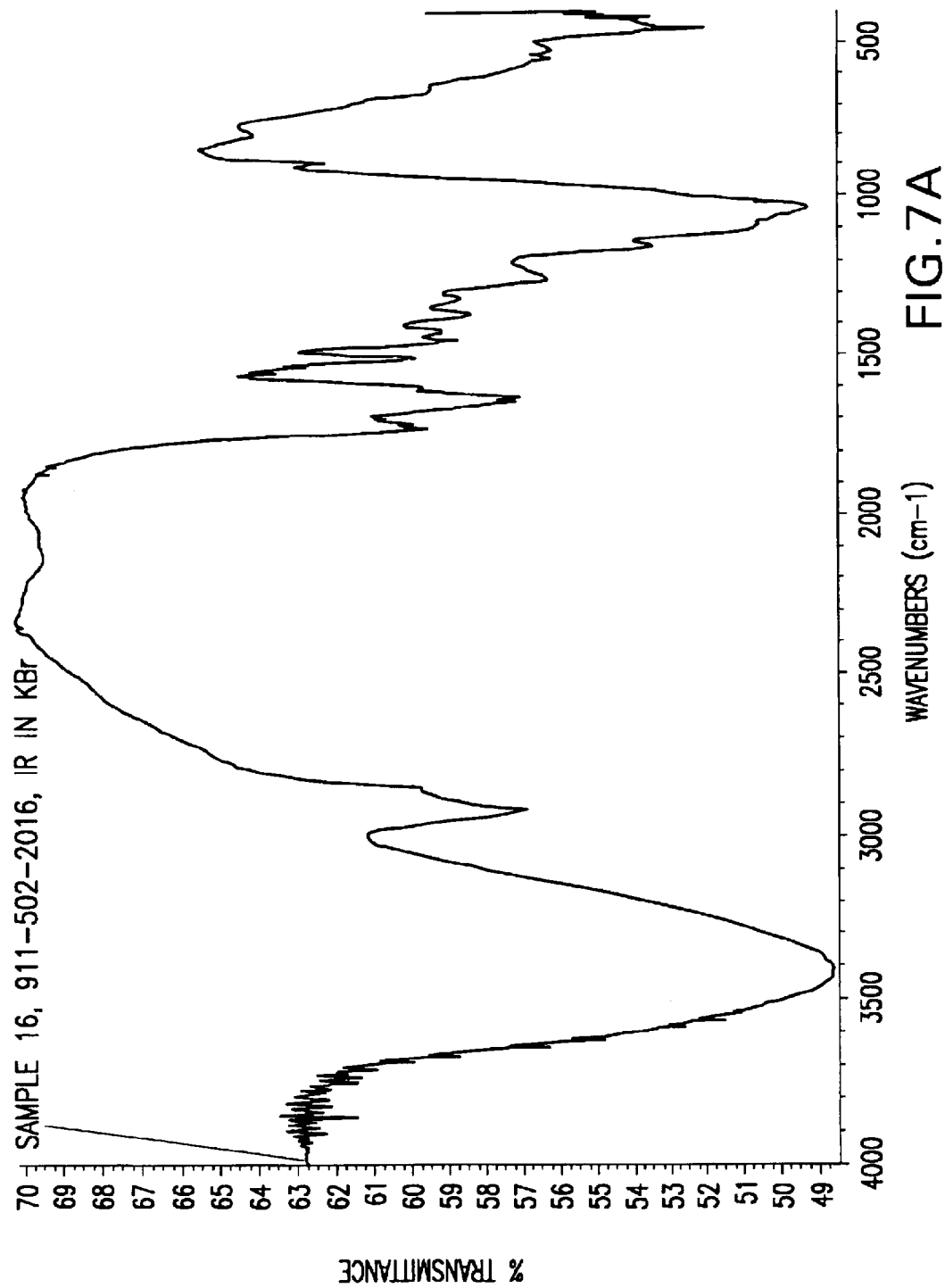

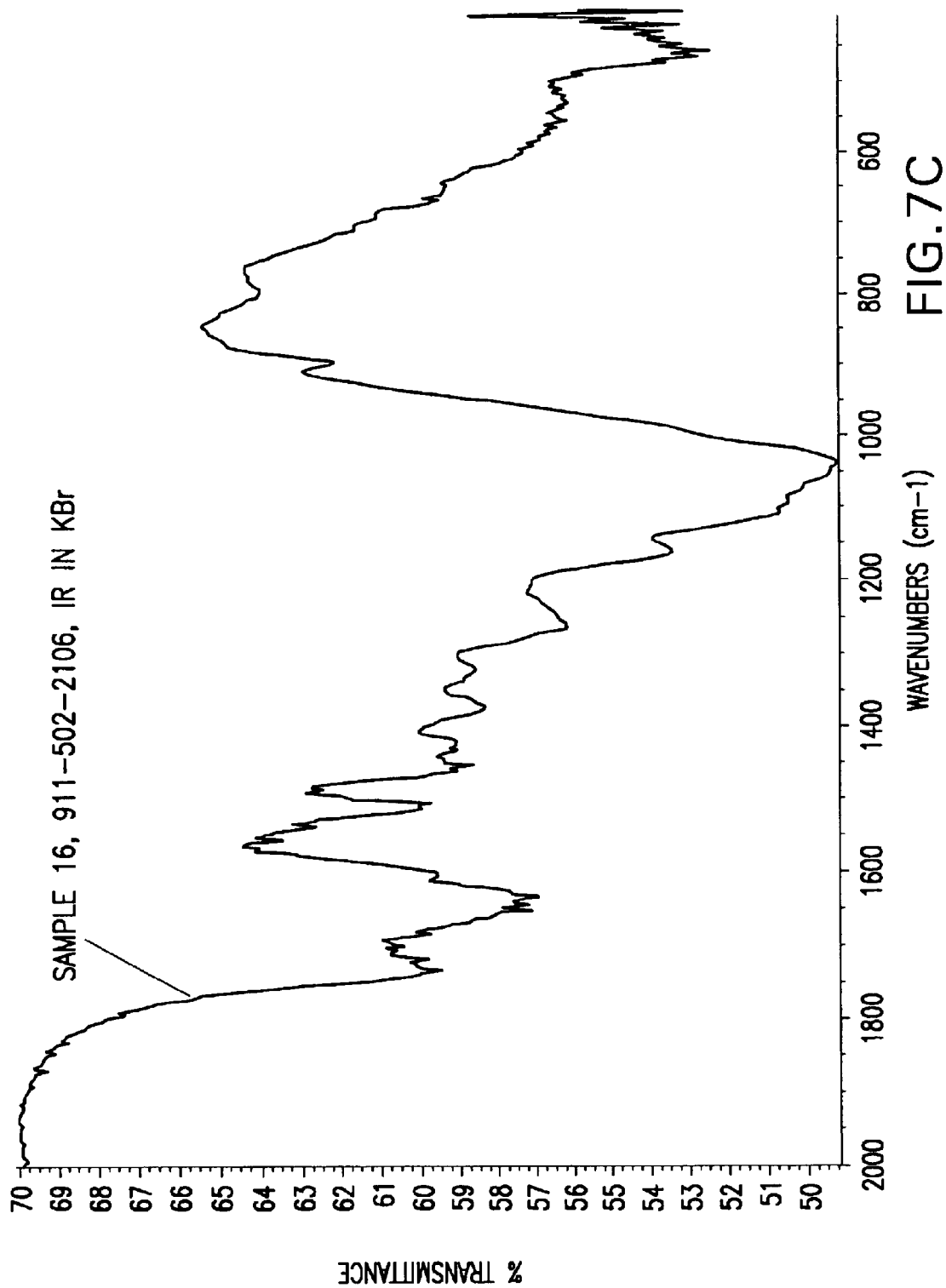

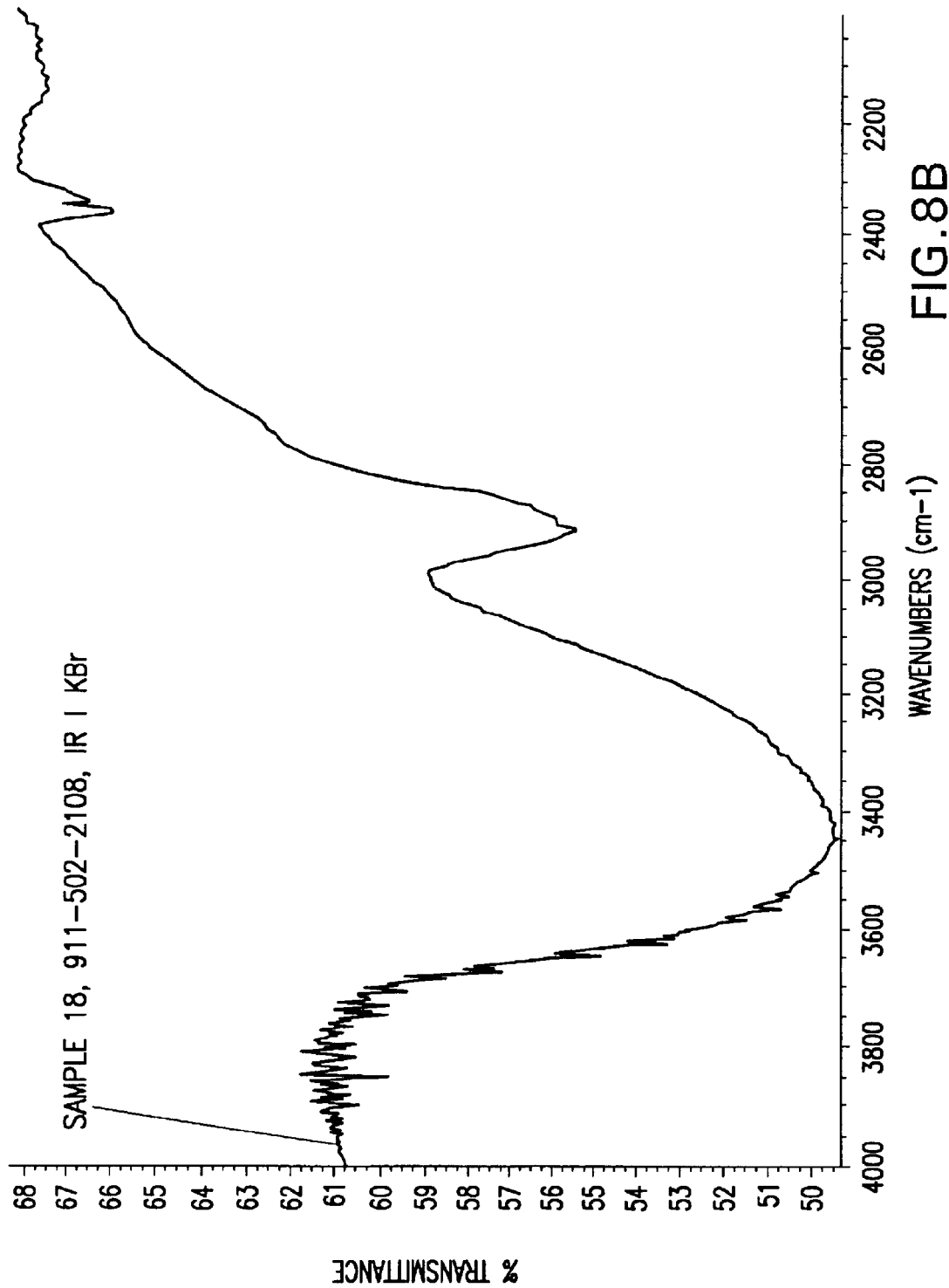

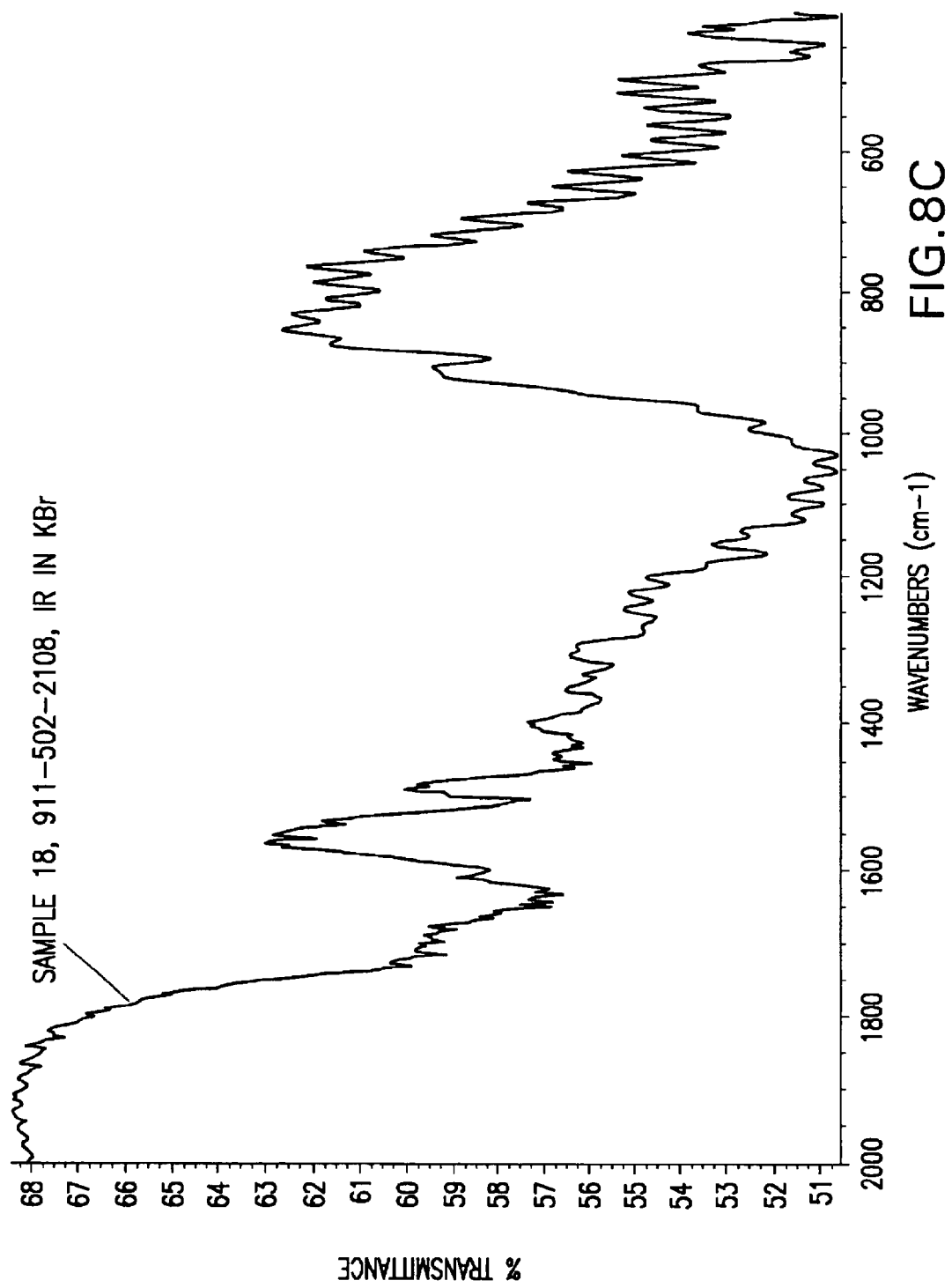

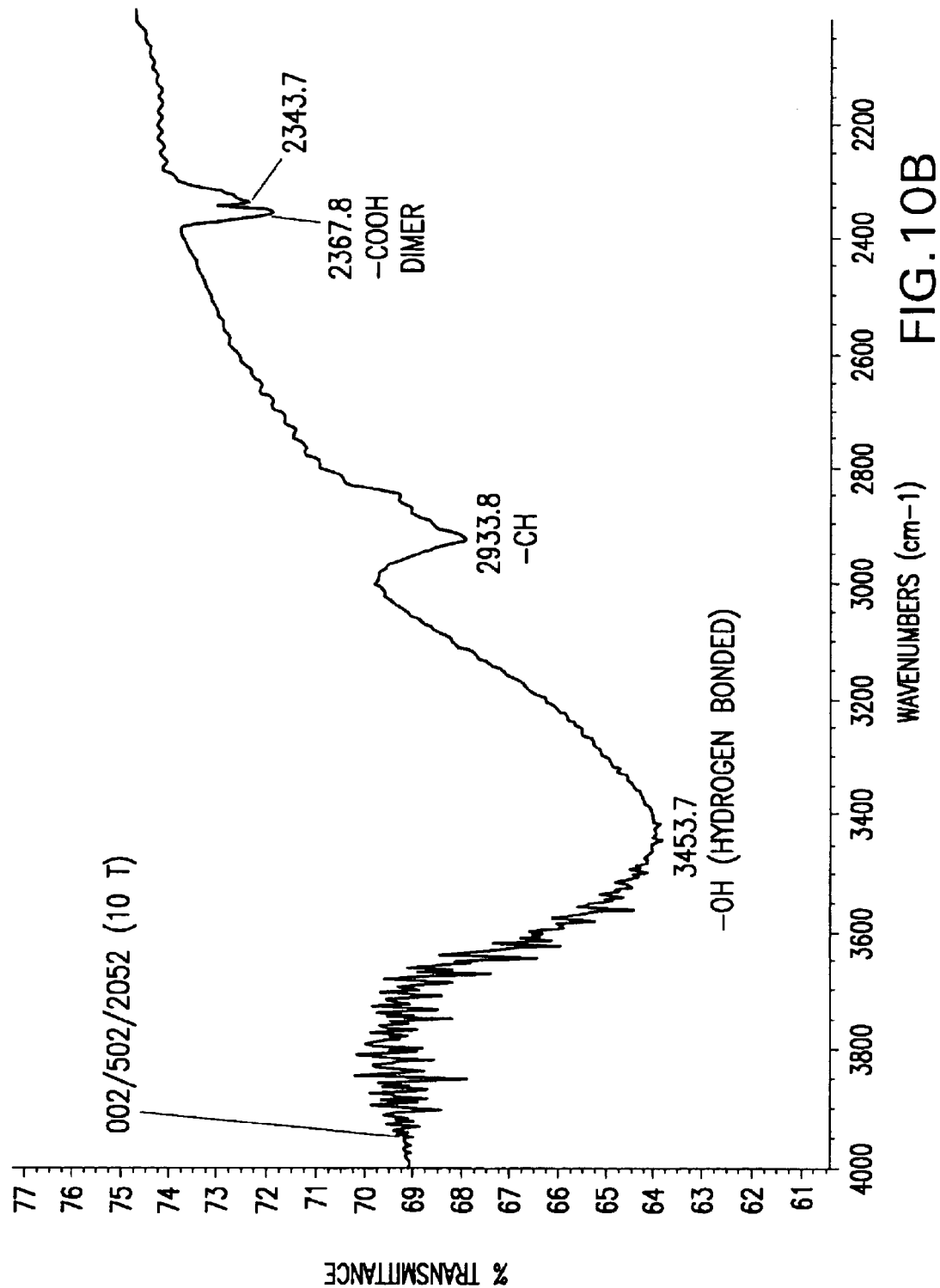

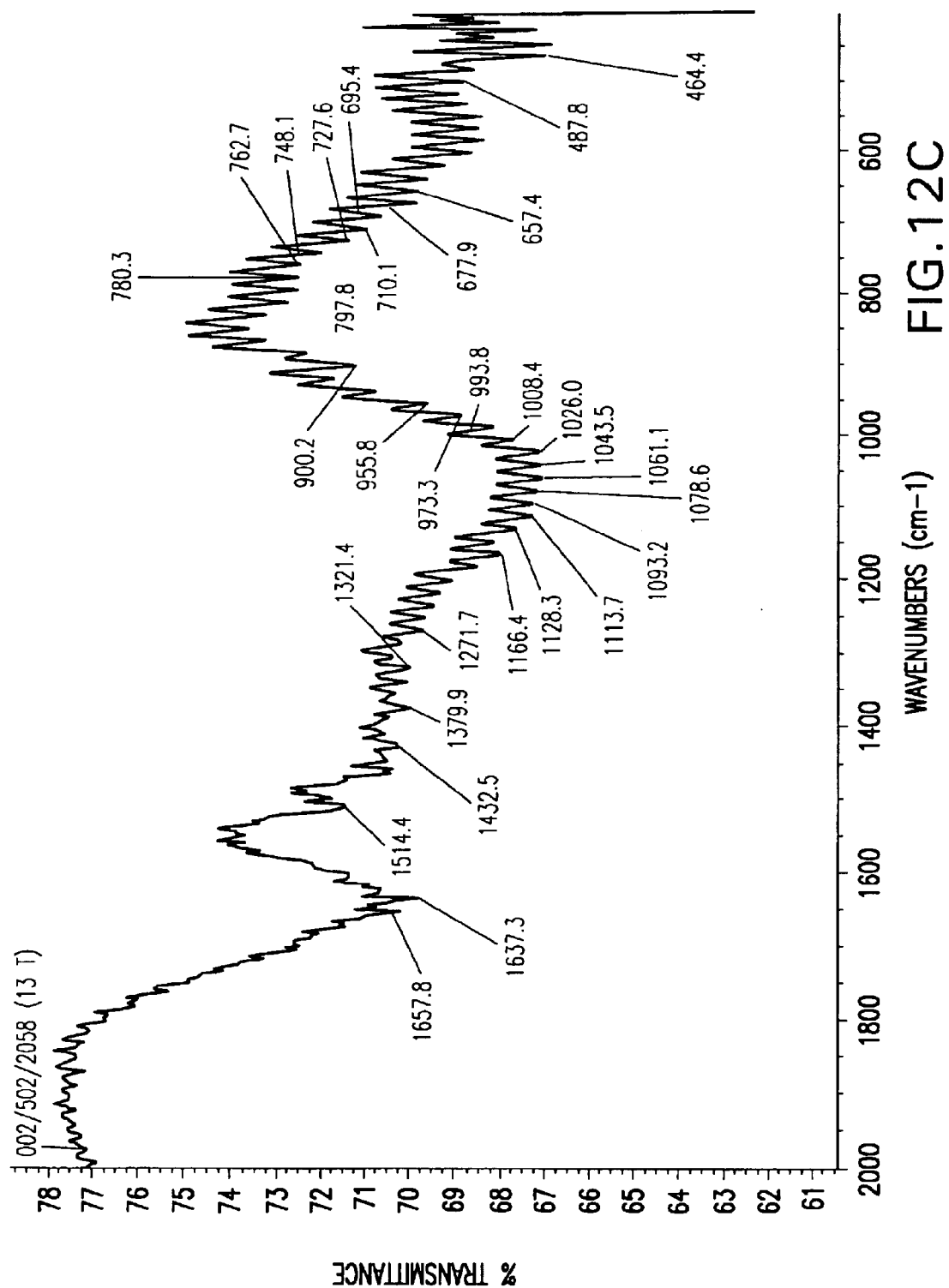

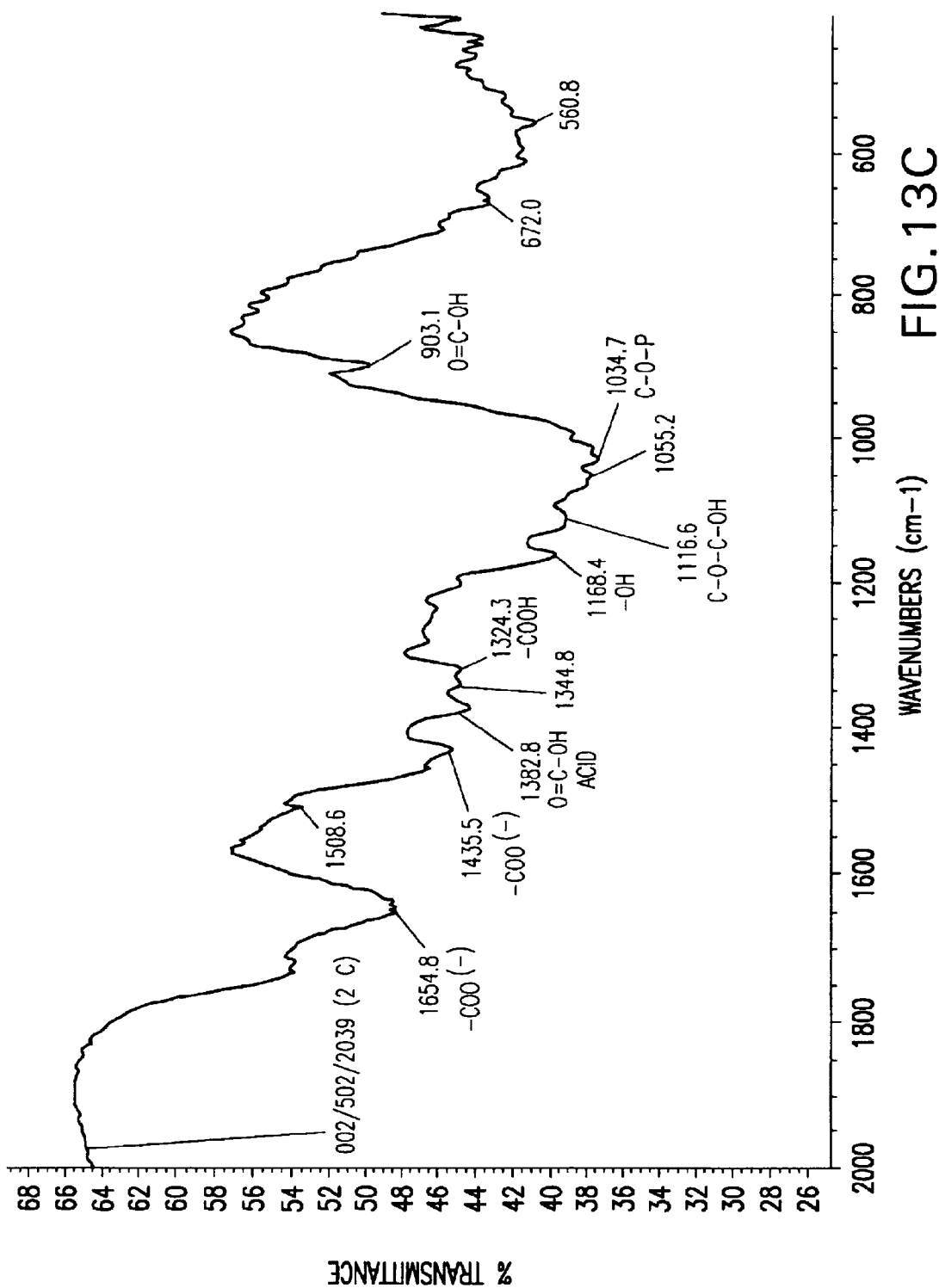

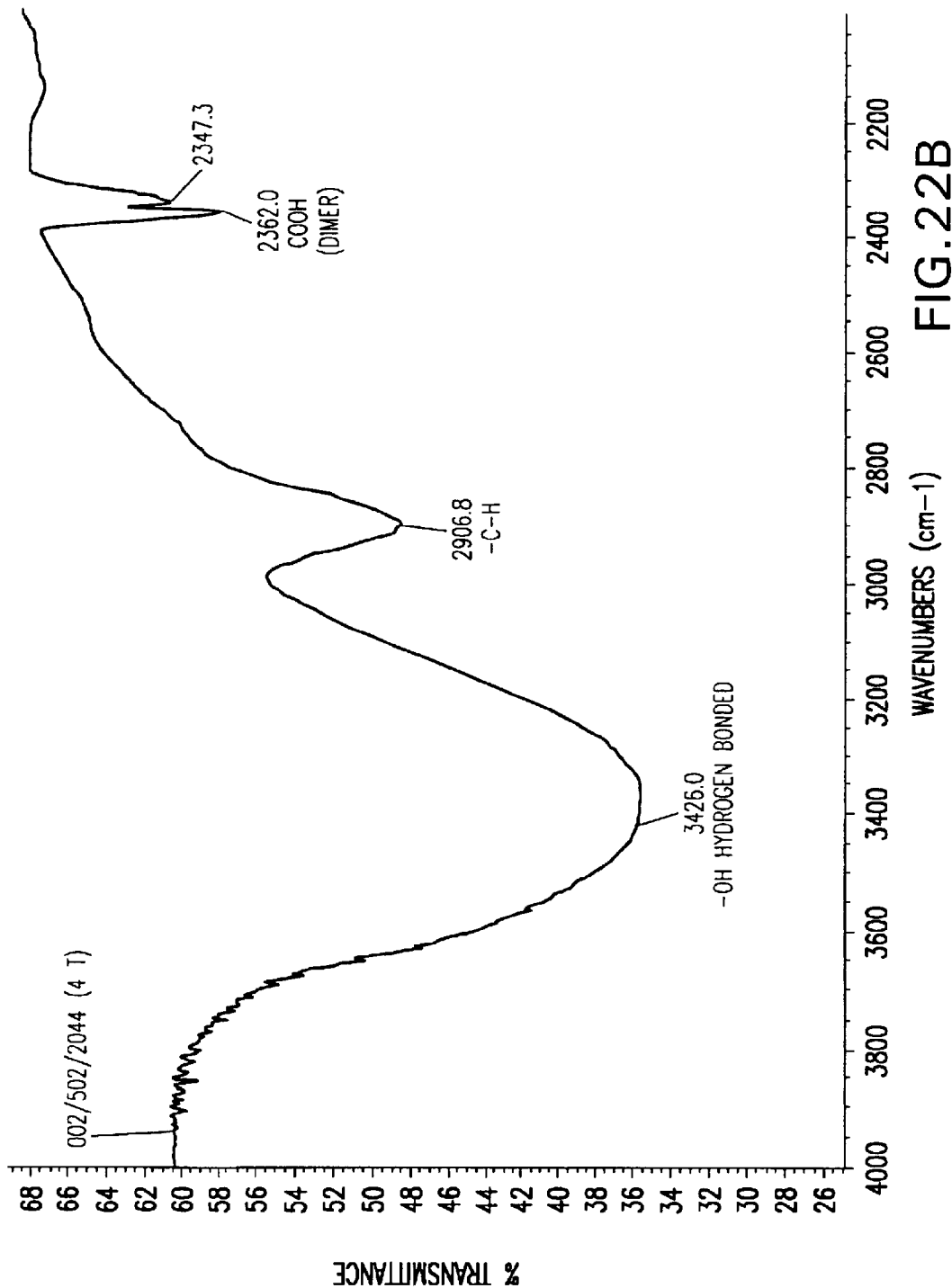

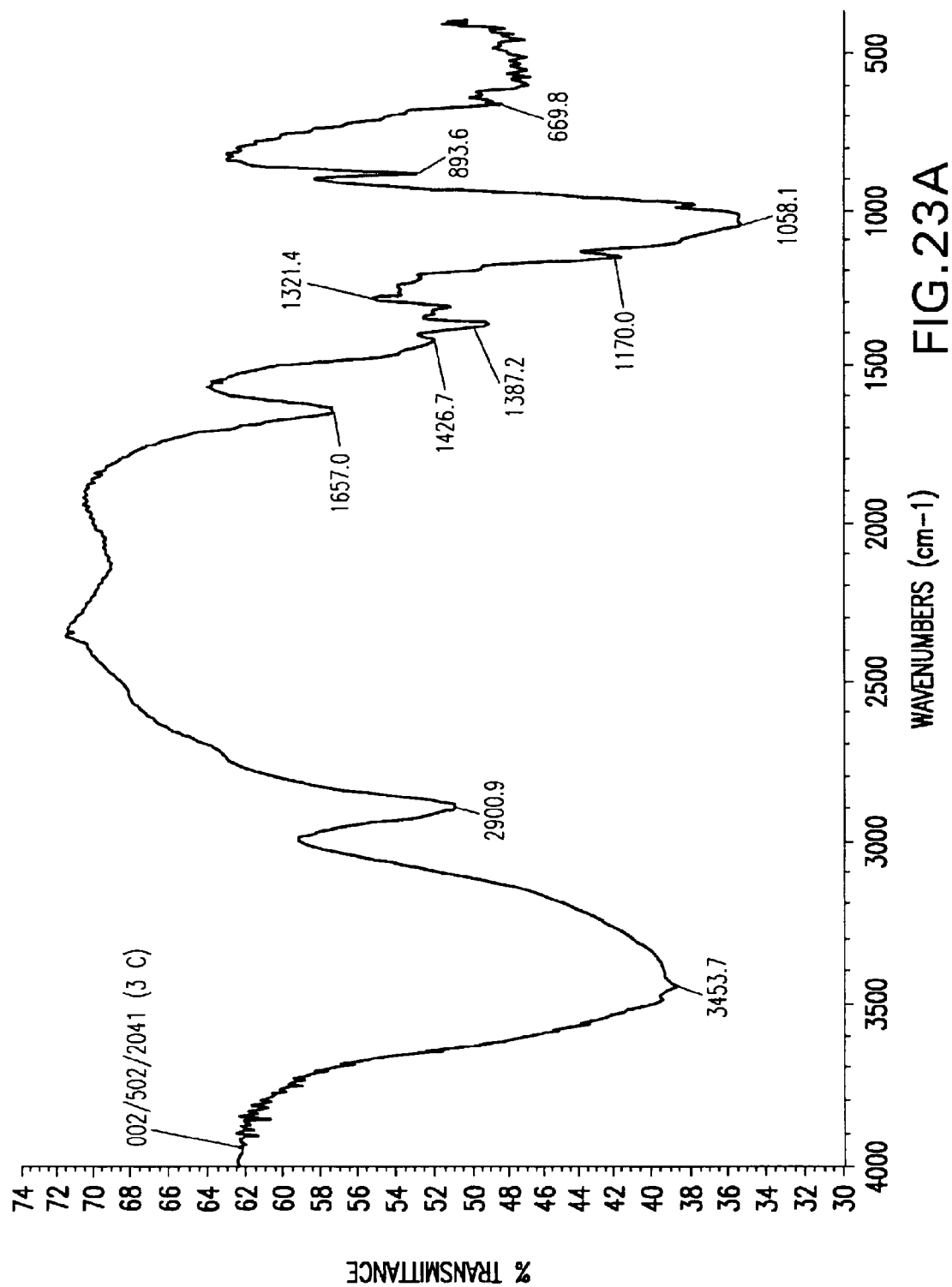

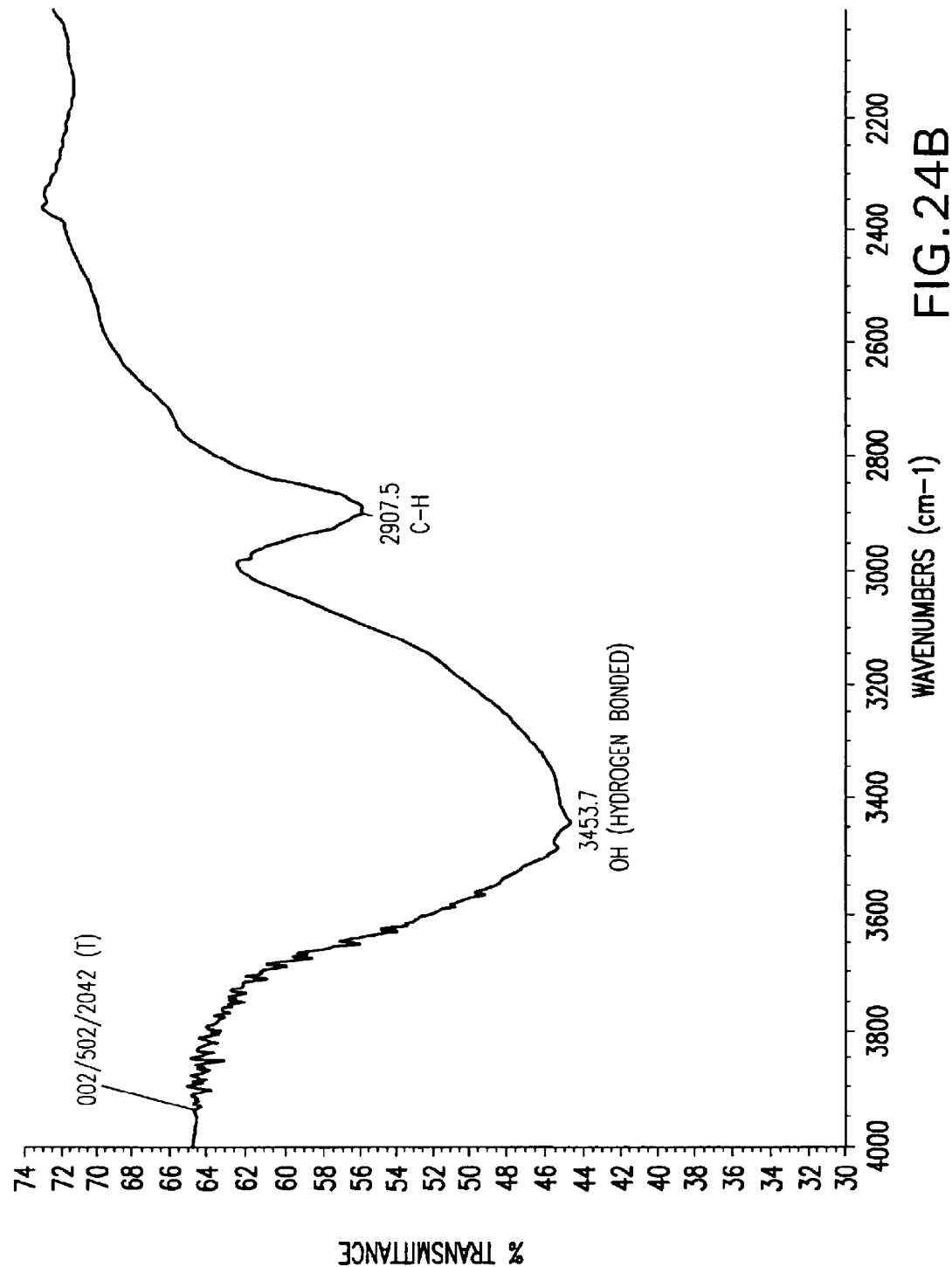

AGROPOLYMER CONTAINING A CARBOHYDRATE AND SILICA MATRIX FROM PLANTS

This application is a continuation of International Publication Number WO00/50167, published in English on Aug. 31, 2000, filed as International Application No. PCT/IN00/00015 on Feb. 24, 2000, which claims priority from Indian Patent Application No. 222/MAS/99 filed Feb. 24, 1999 and Indian Patent Application No. 223/MAS/99 filed Feb. 24, 1999.

FIELD OF THE INVENTION

The present invention generally relates to the field of agricultural biotechnology. In particular, this invention pertains to a novel agropolymer and a method of manufacturing the agropolymer from plant parts such as seed coats, hulls, husks or seed covers of plants including agricultural crops. The agropolymers disclosed herein have extensive industrial application and may be useful in purifying water of aqueous solutions polluted or contaminated by metal or ions.

BACKGROUND OF THE INVENTION

Several biologically originating metal sequestration agents are known in the art. Examples of such agents include tannins, humic acid, whole cell biomass, chitin and chitin derivatives, metallothioneins, microbial polysaccharides, melannins, polyphenolic biopigments, bacterial cell wall polymers, microbially produced chelating agents (siderophores), and the like. However, the above materials may be costly and often are not available in sufficient quantities. Specifically, the substances known in the art have not been successfully produced on large scale for industrial use because of the low availability of raw materials and the high production costs.

Furthermore, the substances known in the art may be less effective than the agropolymer disclosed herein. Thus, the present invention is aimed at producing agropolymers, which are effective in sequestering metals and ions from polluted or contaminated aqueous solutions and which derive from inexpensive, widely available plant materials, preferably raw agricultural materials, such as seed coats, hulls, husks, or seed covers of agricultural crops.

SUMMARY OF THE INVENTION

An objective of the present invention is to provide novel agropolymers that originate from plant materials, such as the seed coats, husks, hulls, or seed covers of agricultural crops. Agricultural crops which may be employed in forming the agropolymers of the present invention include *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp.

Another object of the present invention is to provide an agropolymer material that originates biologically and that is non-toxic, biodegradable, inexpensive, widely available, and effective. Such an agropolymer may be derived from agricultural sources.

Still another objective of the present invention is to develop a method for producing the agropolymer materials disclosed herein and a method of using the agropolymers in industrial applications such as sequestering or removing metals or ions from water or aqueous solutions. Such industrial applications would enable the agropolymer to aid in improving water pollution control and reducing overall environmental pollution.

Yet another object of the present invention is to provide a method of removal of heavy metals and ions from aqueous solutions using the agropolymers disclosed herein.

Still another objective of the present invention is creating a method of water purification which uses natural, biological agricultural resources, which are abundant in nature and thus readily available.

Therefore, a further object of the present invention is to provide a method of producing an agropolymer material comprising a carbohydrate and/or silica matrix substantially devoid of proteins, tannins, pigments and polyphenols, wherein the agropolymer material has metal binding reactive sites.

One skilled in the art will appreciate that the various embodiments disclosed herein, as well as other embodiments within the scope of the invention, will have numerous applications in the environmental, chemical, and biological fields.

BRIEF DESCRIPTION OF THE DRAWINGS

The present invention may be better understood with reference to the attached drawings described below.

DETAILED DESCRIPTION OF THE INVENTION

Figure 1A:
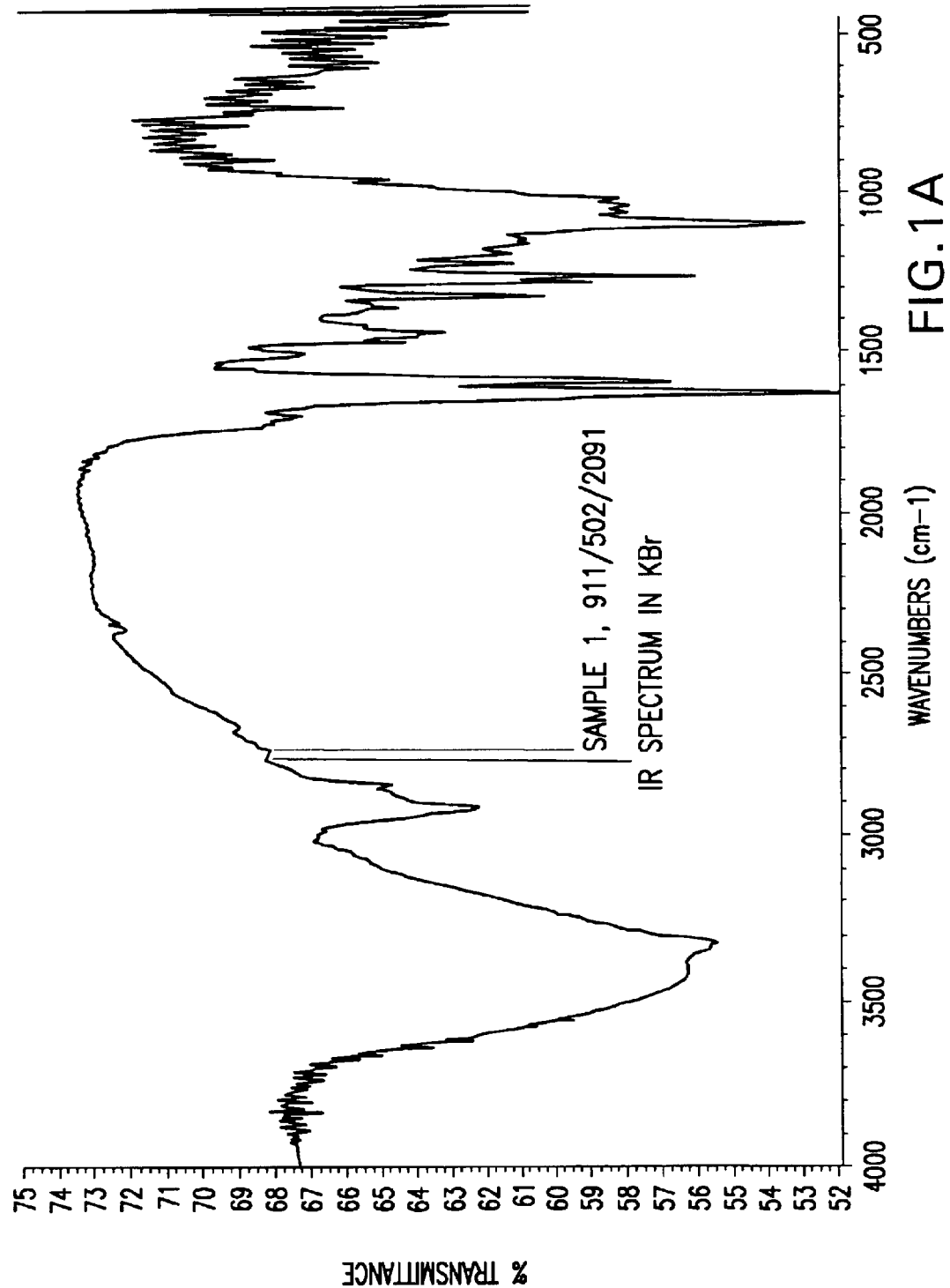
FIGS. 1(A), (B), and (C): IR spectra of a raw rice husk sample.
Figure 1C:
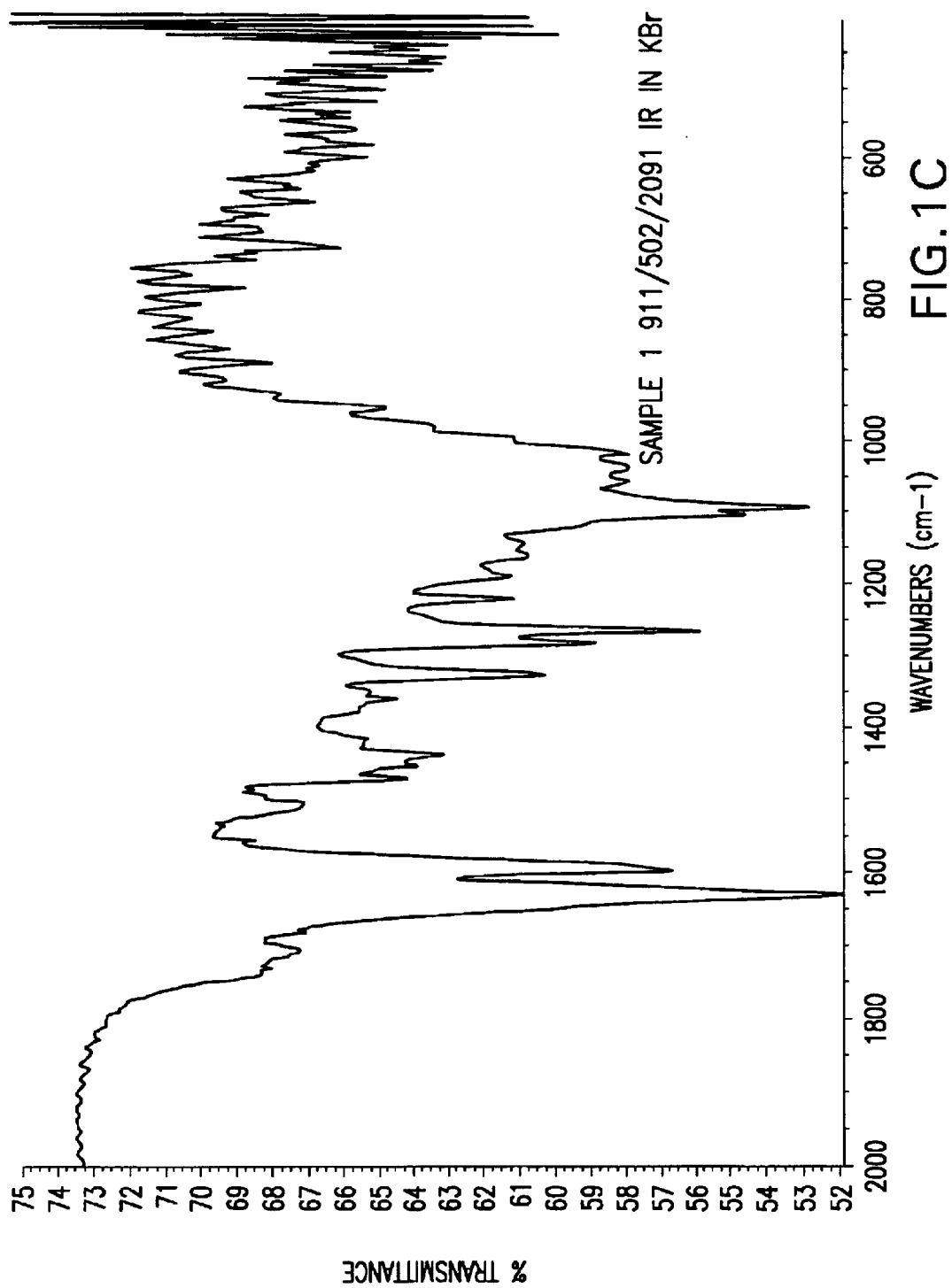
Figure 2C:
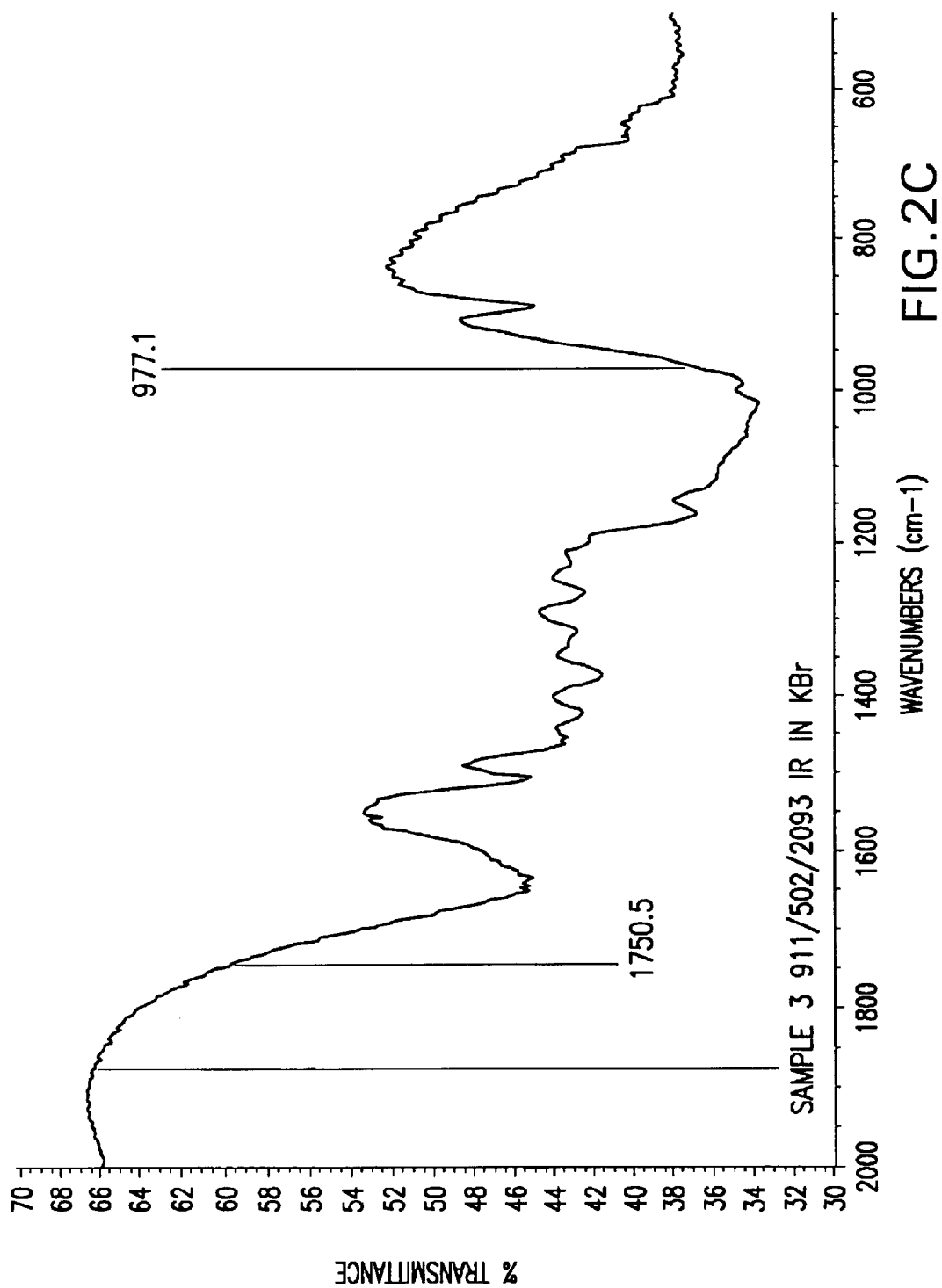
FIGS. 2(A), (B), and (C): IR spectra of a rice husk sample treated with alkaline hydrogen peroxide.
Figure 3A:
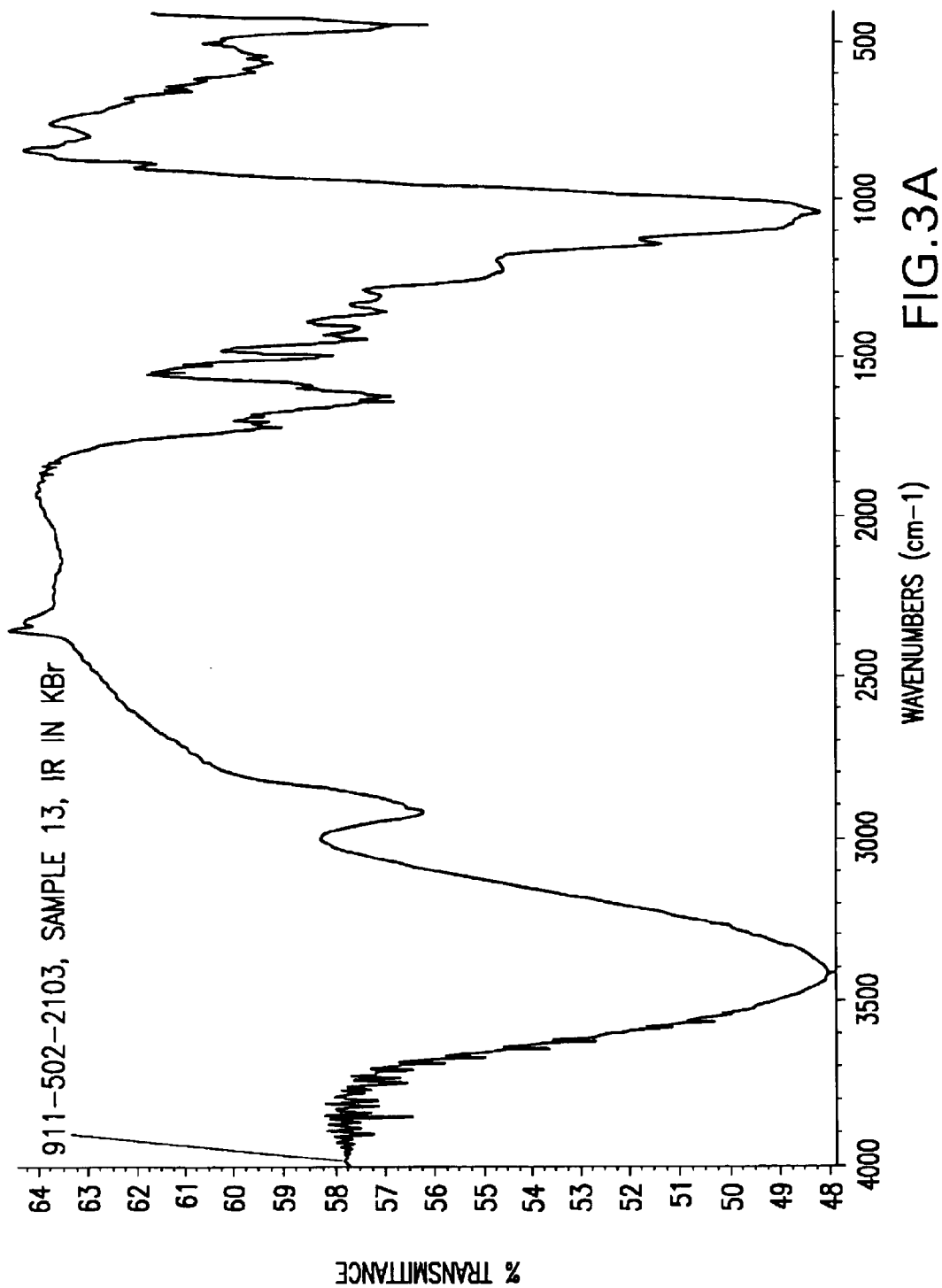
FIGS. 3(A), (B), and (C): IR spectra of a raw rice husk sample treated with ferric chloride.
Figure 3C:
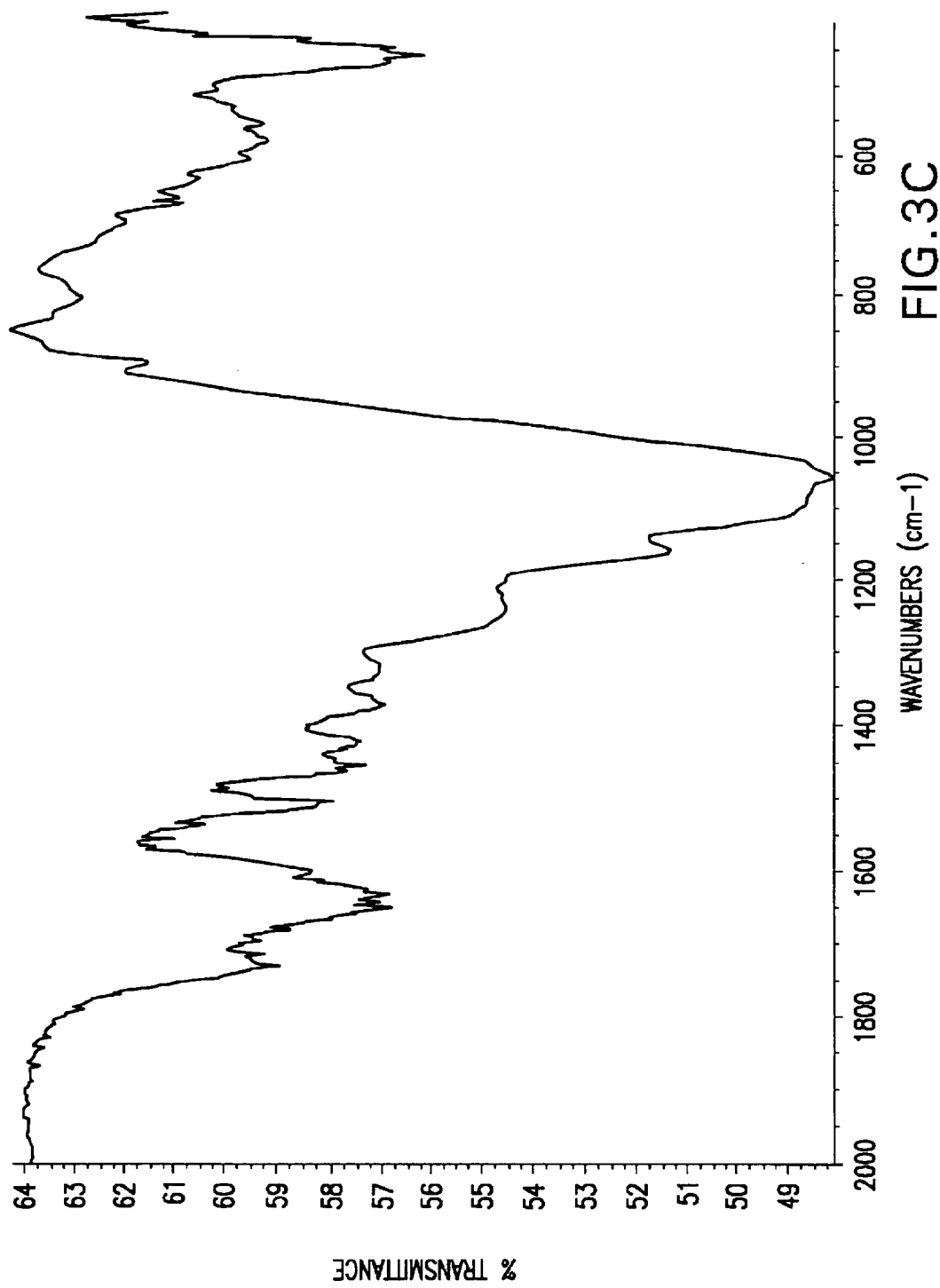
Figure 4B:
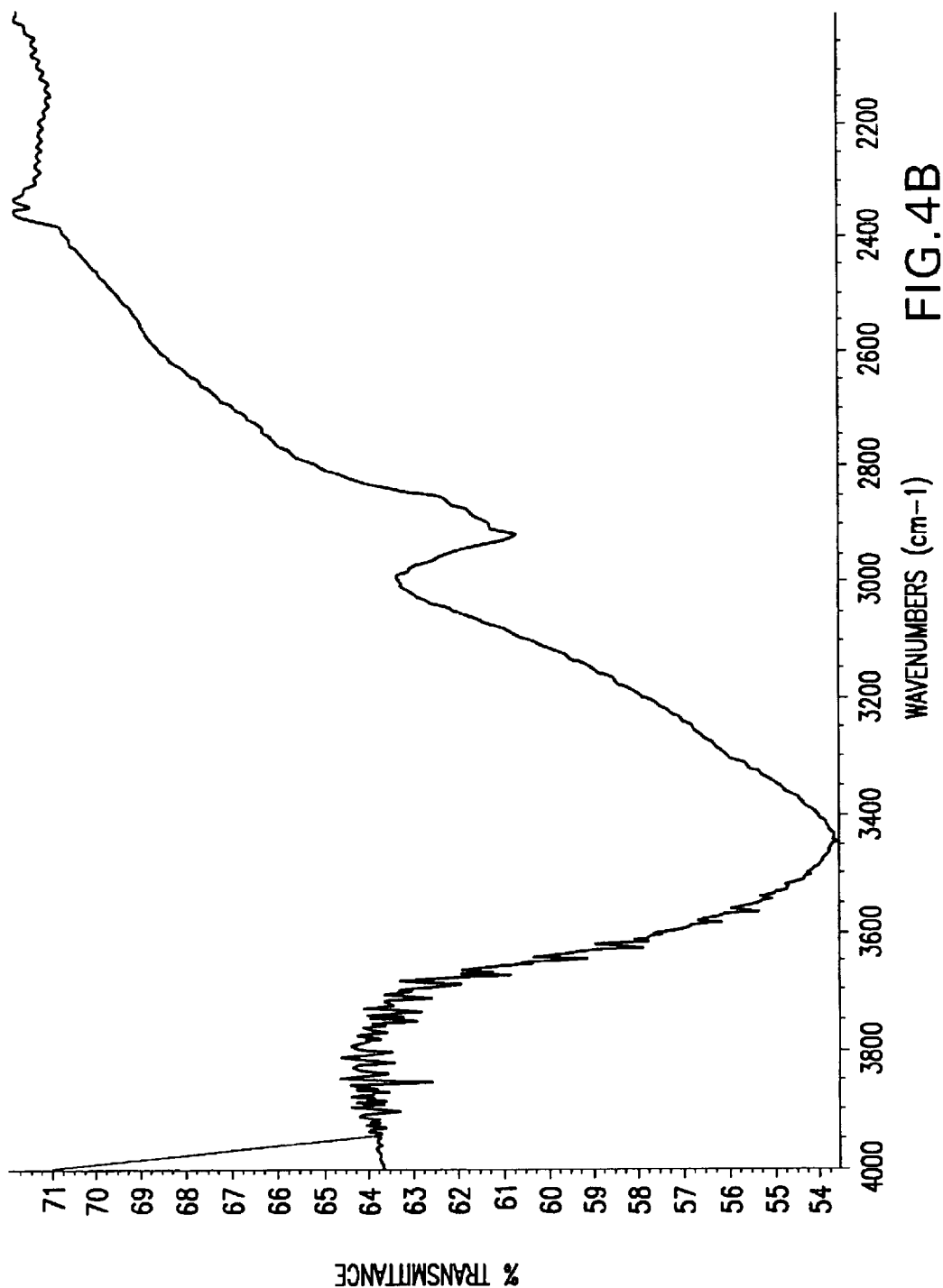
FIGS. 4(A), (B), and (C): IR spectra of an alkaline hydrogen peroxide treated rice husk sample, which was subsequently treated with ferric chloride.
Figure 4C:
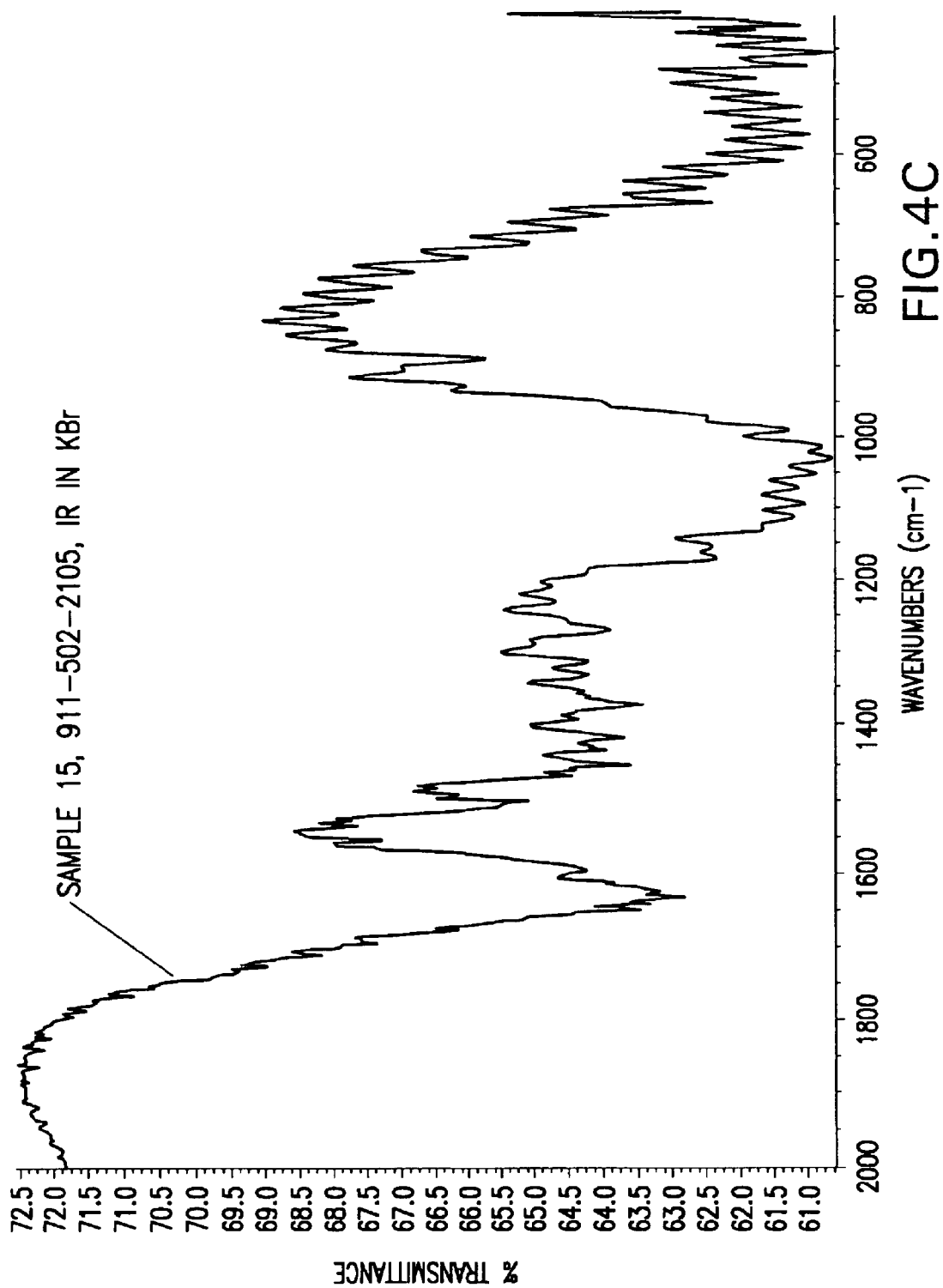
Figure 5A:
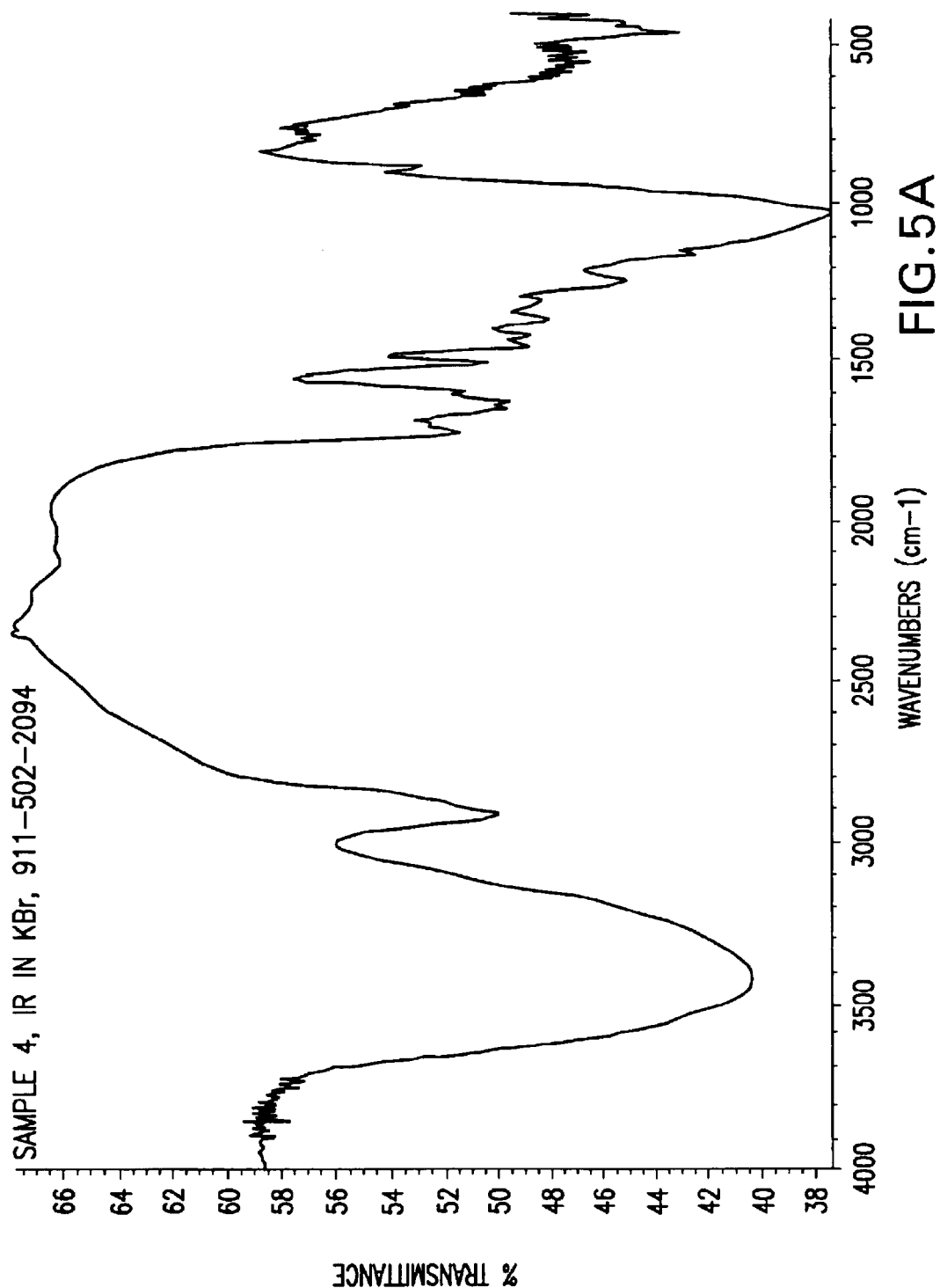
FIGS. 5(A), (B), and (C): IR spectra of a raw *Setaria italica* husk sample.
Figure 5B:
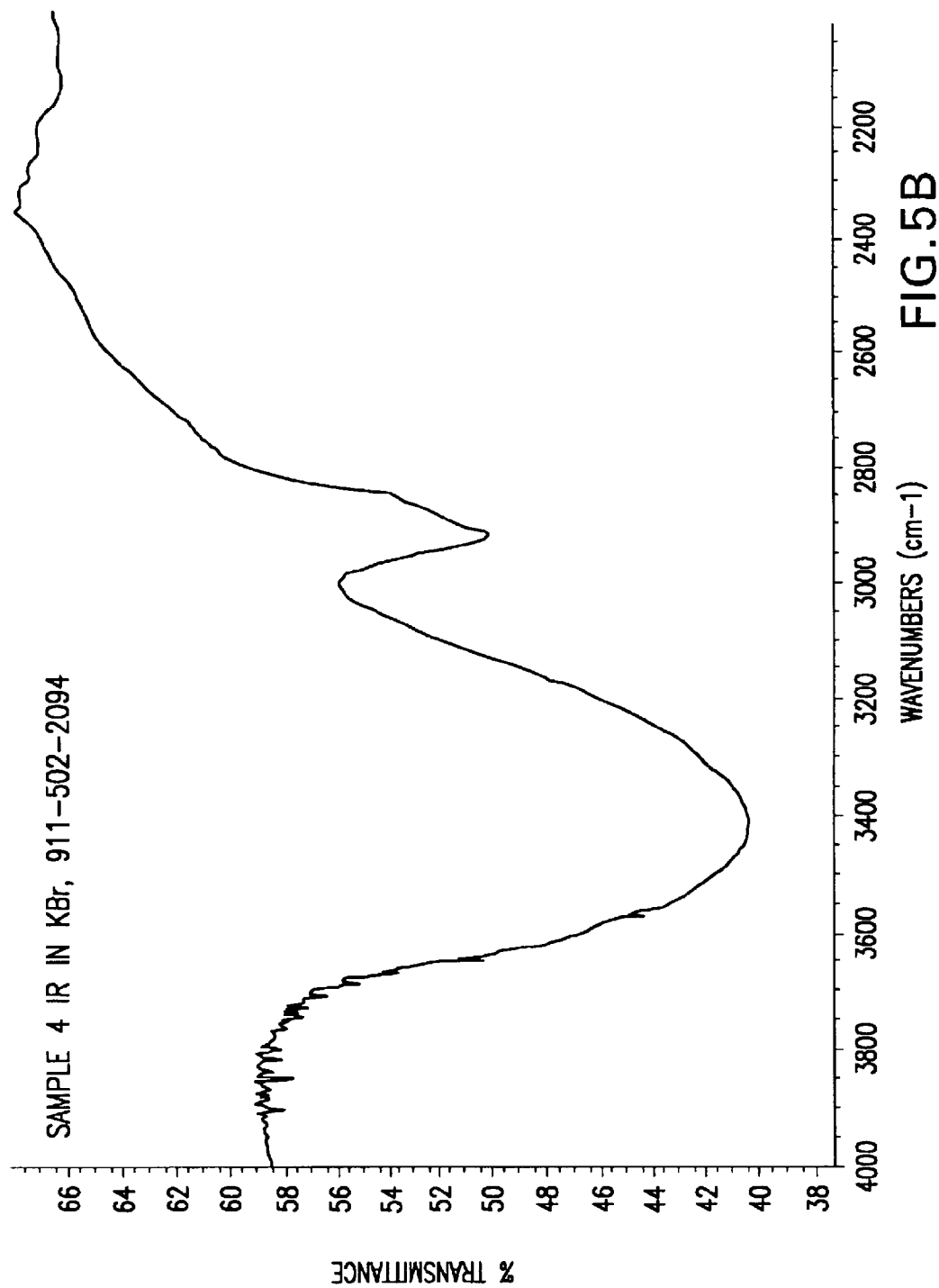
Figure 6B:
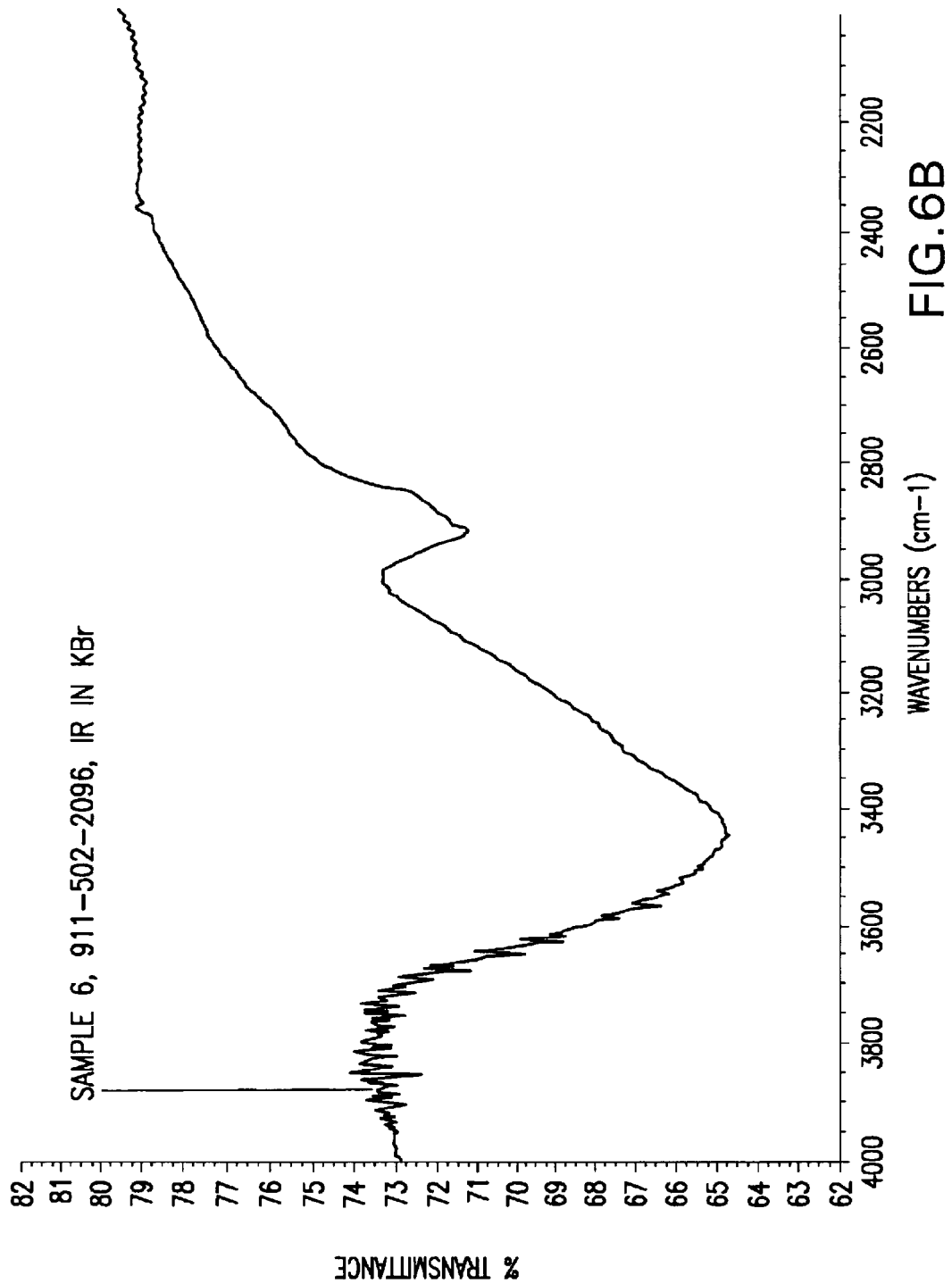
FIGS. 6(A), (B), and (C): IR spectra of an alkaline hydrogen peroxide treated *Setaria italica* husk sample.
Figure 6C:
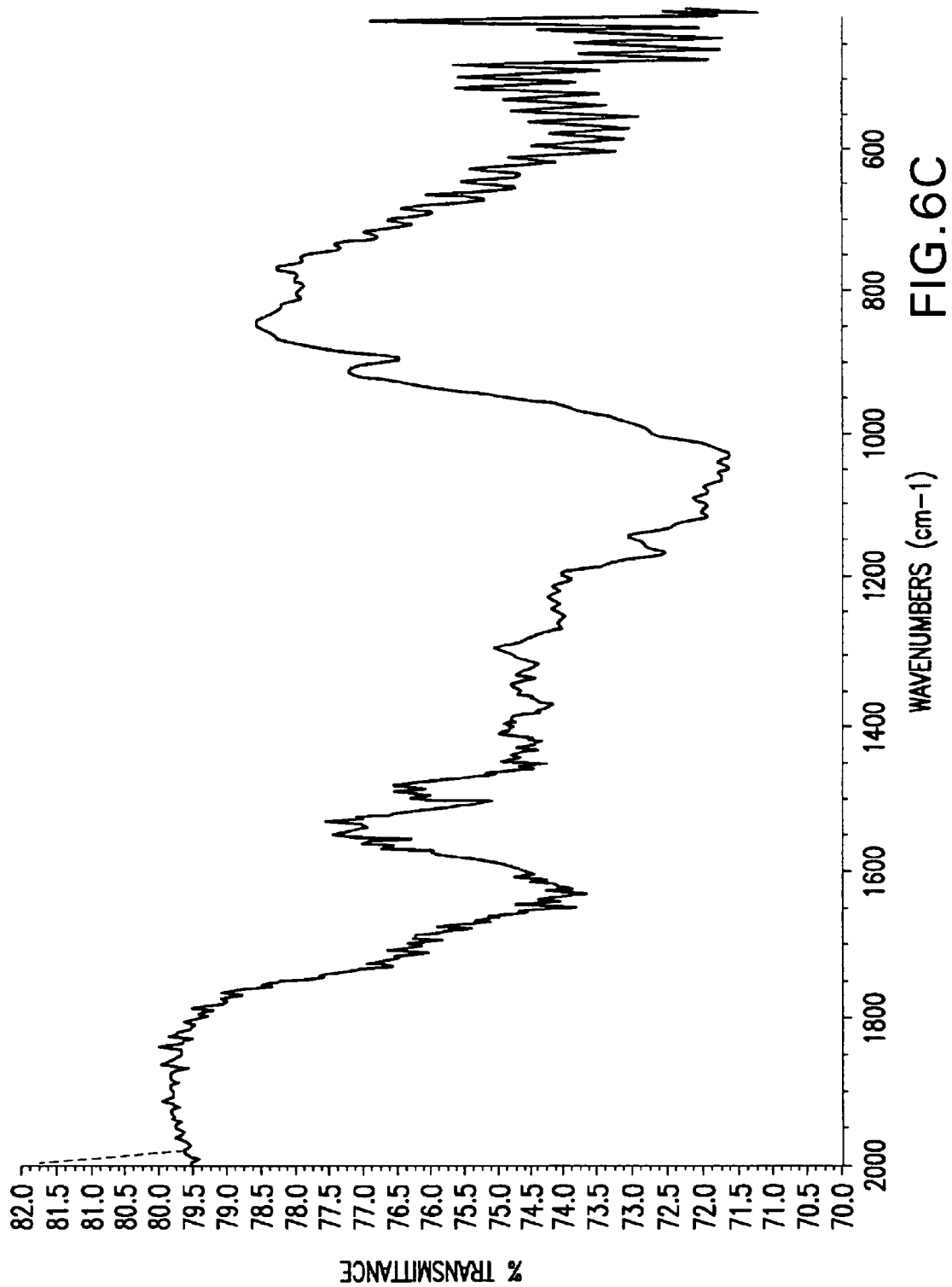
Figure 7B:
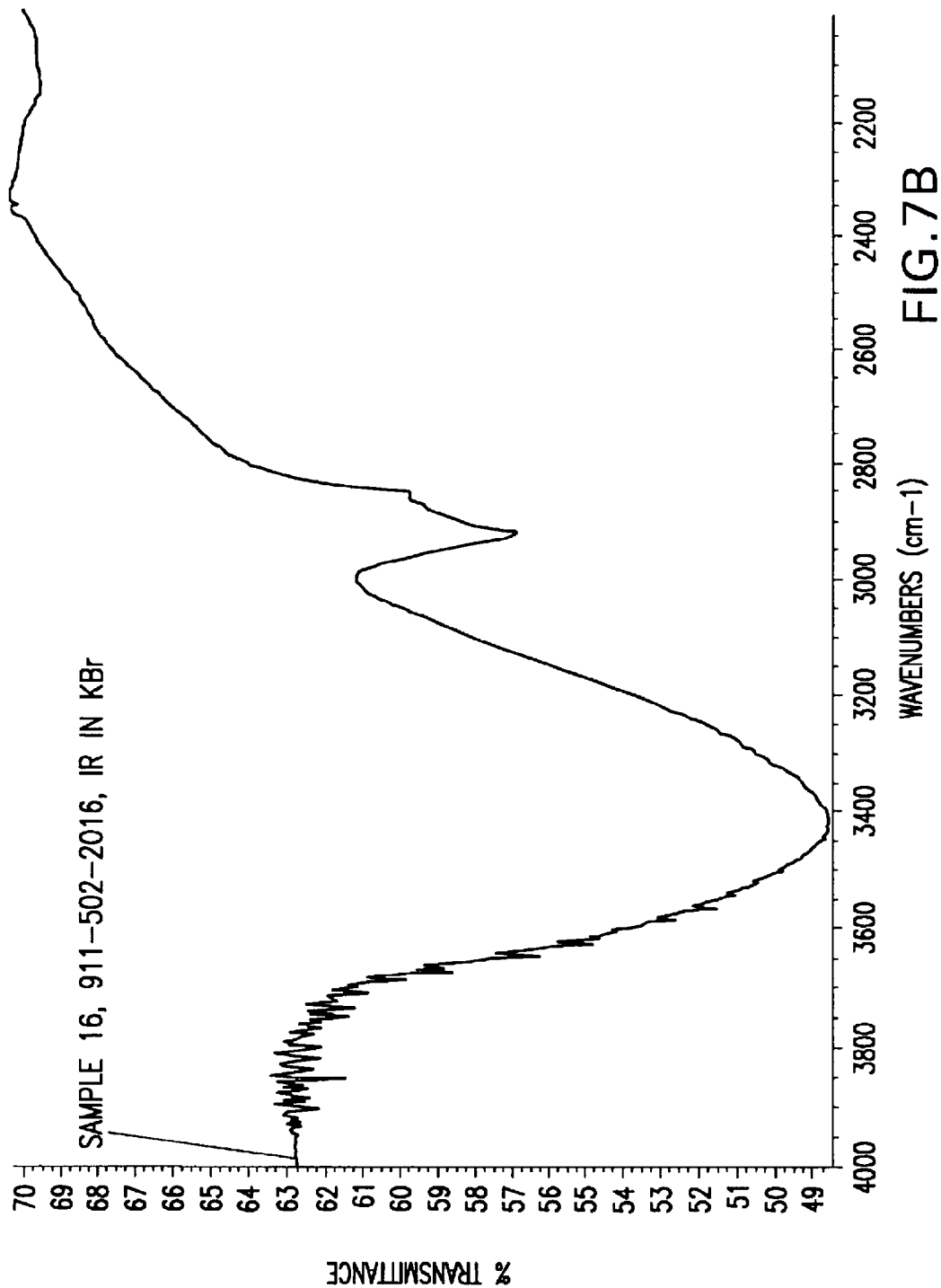
FIGS. 7(A), (B), and (C): IR spectra of a raw *Setaria italica* husk sample treated with ferric chloride.
Figure 8A:
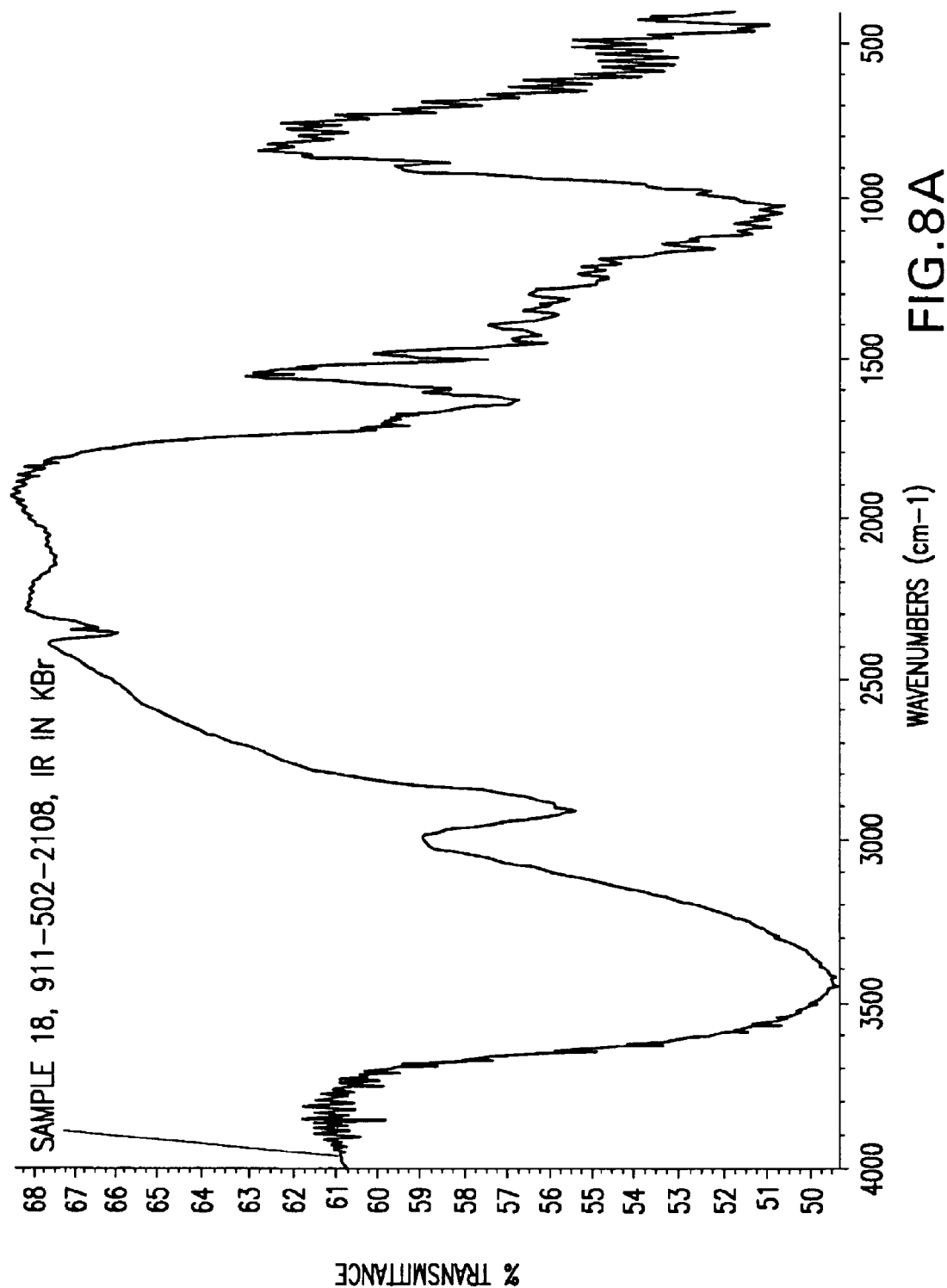
FIGS. 8(A), (B), and (C): IR spectra of an alkaline hydrogen peroxide treated *Setaria italica* husk sample which was subsequently treated with ferric chloride.

The present invention is directed to providing a novel agropolymer having metal binding sites, which are incorporated into a matrix of the agropolymer either by alkali treatment, hydrogen peroxide treatment, or a combination alkaline hydrogen peroxide treatment. More particularly, this invention relates to the use of the agropolymer disclosed herein in the purification of water or aqueous solutions polluted by metals or ions, including the purification of industrial ground water and drinking water. Such a purification method is possible because of the capability of the agropolymer to sequester metals and/or ions found in polluted or contaminated water or aqueous solutions.

The matrix of the agropolymer is obtained from any plant parts such as seed coats, seed covers, hulls and husks. The metal binding reactive sites (which facilitate organometallic bonds) are created by reacting the agropolymers with metals as observed under infrared (IR) spectroscopy.

The agropolymers of the present invention may be produced from plant materials (such as seed coats, seed covers, hulls, or husks) of agricultural crops, and the crops appropriate for use herein may include *Oryza sativa, Panicum miliaceum, Setaria italica, Cajanus cajan, Vigna mungo, Vigna radiata, Triticum* sp., *Ricinus communis, Helianthus annus, Gossypium* sp. *Arachis* sp. These crops are used in certain preferred embodiments because they better facilitate the sequestration of metals and ions.

In certain embodiments of the present invention, the method of producing the agropolymers disclosed herein begins with the plant material (such as the seed coat, seed cover, hull, or husk) being powdered. In preferred embodiments, the powdering of the plant material is effected by a grinder. The plant material is subsequently micronized, which is accomplished by using a micronizer to obtain desired particle size (to be measured in microns).

The micronized plant material then undergoes either alkali treatment, hydrogen peroxide treatment, or a combination alkaline hydrogen peroxide treatment. In certain preferred embodiments, the alkali treatment is effected with sodium hydroxide, potassium hydroxide, sodium carbonate, or the like. In typical embodiments, the alkali solutions used to treat the micronized plant material have concentrations of alkali material in water of from about 1% by weight to about 10% by weight.

In other embodiments, the micronized plant material samples undergo hydrogen peroxide treatment either in combination with the alkali treatment or alone (without an alkali solution). In these embodiments, hydrogen peroxide is typically employed at a concentration of from about 5% by weight to about 30% by weight.

In embodiments where the combination alkaline hydrogen peroxide treatment is employed, the alkaline treatment may be performed either before hydrogen peroxide treatment, along with hydrogen peroxide treatment, or after hydrogen peroxide treatment. In certain preferred embodiments, the plant material undergoes the alkaline treatment and the hydrogen peroxide treatment simultaneously.

The above described treatments (including alkali treatment, hydrogen peroxide treatment, or combination alkaline hydrogen peroxide treatment) serve to create the property of enhanced metal or ion sequestration for the resultant agropolymer molecules.

After either alkaline treatment, hydrogen peroxide treatment, or a combination alkaline hydrogen peroxide treatment, the treated plant material is washed repeatedly with water or an acid solution to remove any alkaline and/or hydrogen peroxide residue. The acid solutions typically used in this step include solutions of diluted $H_2SO_4$, HCl, or $HNO_3$.

The treated plant material is further contacted with an acid solution to remove any bound metals. If bound metals are present in the agropolymer material, such metal ions are eluted with acid solutions (typically of $H_2SO_4$, HCl, or $HNO_3$) having concentrations of acid in water of from about 1% by weight to about 3% by weight.

The resulting agropolymer molecules are subsequently neutralized (to remove any remaining acid) through water washings or by the addition of a diluted alkali solution. The diluted alkali solution is typically a solution of about 1.0 M sodium hydroxide or potassium hydroxide.

Lastly, the resultant agropolymer molecules are removed from the supernatant through decantation and are dried to remove the remaining moisture content. This drying takes place either at room temperature or with the aid of a dryer at a temperature of from about 70° C. to about 80° C.

The yield of agropolymer depends on the source of the plant material, the size of the plant material before treatment, and the reaction procedure or treatment adopted. Generally, yields of about 30 to 40% of the agropolymer were obtained when producing smaller agropolymer samples. Conversely, yields of about 75 to 80% of the agropolymer were obtained when producing larger agropolymer samples (for example, agropolymer samples larger than 150 microns). General analysis of the agropolymer yields show that the smaller agropolymer molecules are better able to sequester metals and/or ions.

In certain embodiments, the alkaline treatment without hydrogen peroxide is employed for producing agropolymers from cereals and millets. The micronized seed coats or hulls are first mixed with an alkaline solution (such as sodium hydroxide or potassium hydroxide). This alkaline treatment may be carried out either by the addition of an alkaline solution to the micronized seed coat or hull powder or by direct addition of alkaline powder or flakes to the micronized seed coat or hull powder followed by addition of water.

In embodiments involving alkaline treatment, the treated plant material releases a dark brownish-yellow substance. In these embodiments, the use of lower percentages of alkali (for example amounts of from about 5% to about 7.5%) requires more time to remove the dark brownish-yellow substance from the seed coats or hulls. However, the use of higher percentages of alkali (for example solutions of from about 20% to about 25% alkali) removes the dark brownish-yellow substance within about 3–4 hours.

Agropolymers developed according to the present invention have extensive industrial applications. They can be used effectively for pollution control in order to protect water and aqueous solutions in the environment from metal or ion contamination. In preferred embodiments, metals such as iron, copper, aluminum, arsenic, mercury, lead, and zinc as well as various ions may be removed from water and other aqueous solutions using the agropolymer disclosed herein.

In the present method, contaminated or polluted aqueous solutions (including metal-polluted or ion-polluted drinking water and ground water) are treated with agropolymers and/or metal-impregnated agropolymers. First, the polluted water is contacted with the agropolymers and/or the metal-impregnated agropolymers using a column or batch mode. This effects the ion or metal sequestration, thereby resulting in pollution-free water. The sequestration is typically carried out under optimum conditions wherein factors such as pH are closely regulated for maximum sequestration efficiency. In preferred embodiments, the agropolymers disclosed herein are capable of removing metals or ions from water or other aqueous solutions at the parts per million (PPM) to parts per billion (PPB) level.

Possible sites for the use of the agropolymers disclosed herein include areas where ground water is contaminated by toxic metals. For example, in certain embodiments, natural ground water, which is rich in arsenic, may be treated with the agropolymers of the present invention, and the arsenic content is significantly reduced so that the previously arsenic-rich water becomes potable water.

The following examples are intended to illustrate the invention and should not be construed as limiting the invention in any way.

EXAMPLES

Example 1

IR Spectroscopy Results of Various Agropolymers

In these examples, raw husks, hulls or seed coats were micronized, and IR spectroscopy was performed using KBr pellets. The agropolymer samples used herein were treated with ferric chloride and dried before the IR spectroscopy was performed. IR spectroscopy of each sample was performed in three patterns: (A) total scans, representing 4000 to 500 wavenumbers ($cm^{-1}$); (B) scans from 4000 to 2200 wavenumbers ($cm^{-1}$); and (C) scans from 2000 to 600 wavenumbers ($cm^{-1}$). Thus, in FIGS. 1–24, each figure is denoted (A), (B), or (C), and this denotation represents the IR spectroscopy pattern from the list above that was performed in the particular example.

As shown in FIGS. 1–4, IR spectra of various samples of rice husk revealed that the alkaline hydrogen peroxide treatment to rice husk resulted in more reactive bonds or more organometallic bonds.

As shown in FIGS. 5–8, the IR spectra revealed more reactive organometallic bonds when samples of the *Setaria italica* husk were treated with iron.

Figure 9A:
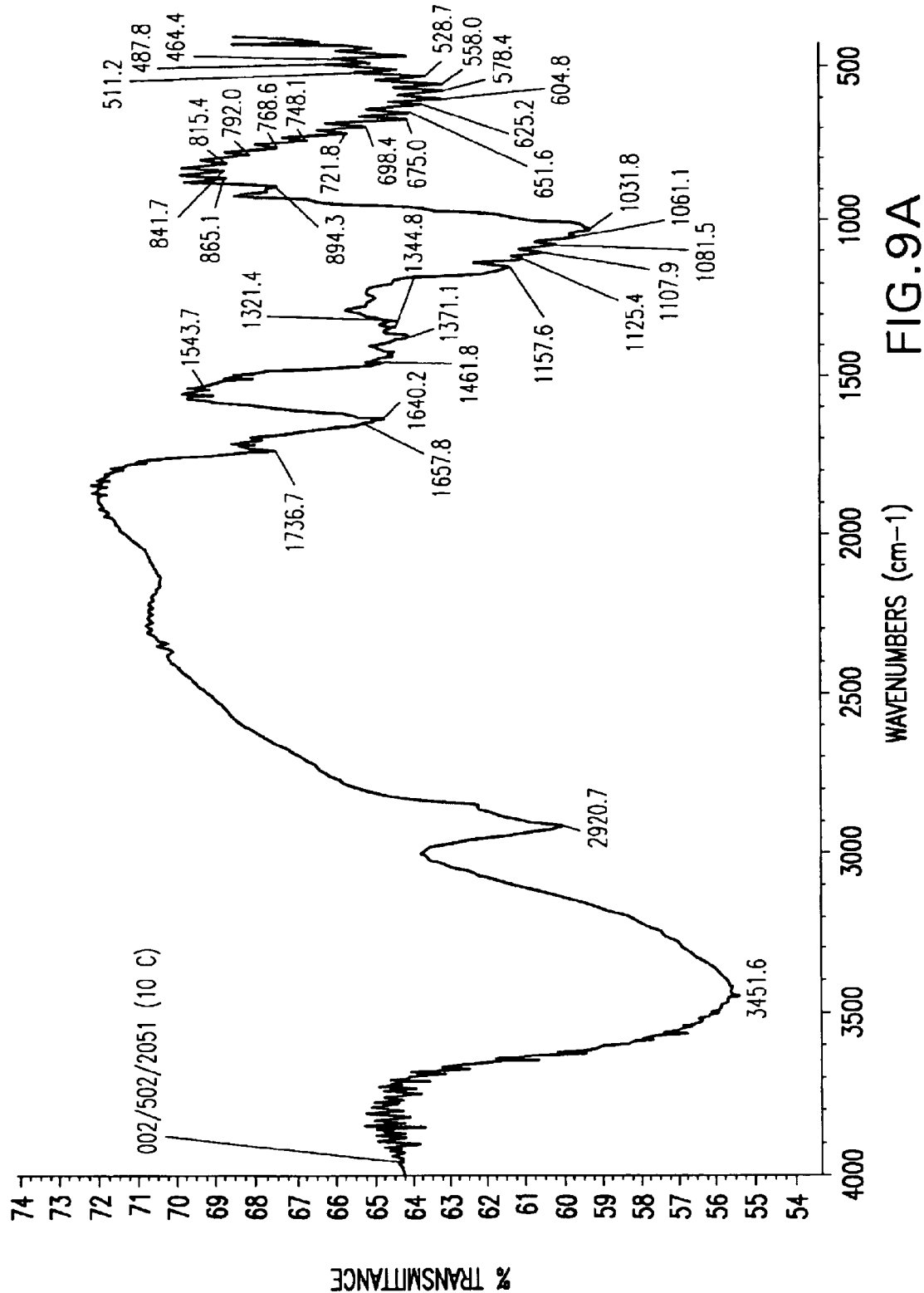
FIGS. 9(A), (B), and (C): IR spectra of an alkaline hydrogen peroxide treated wheat husk sample.
Figure 9B:
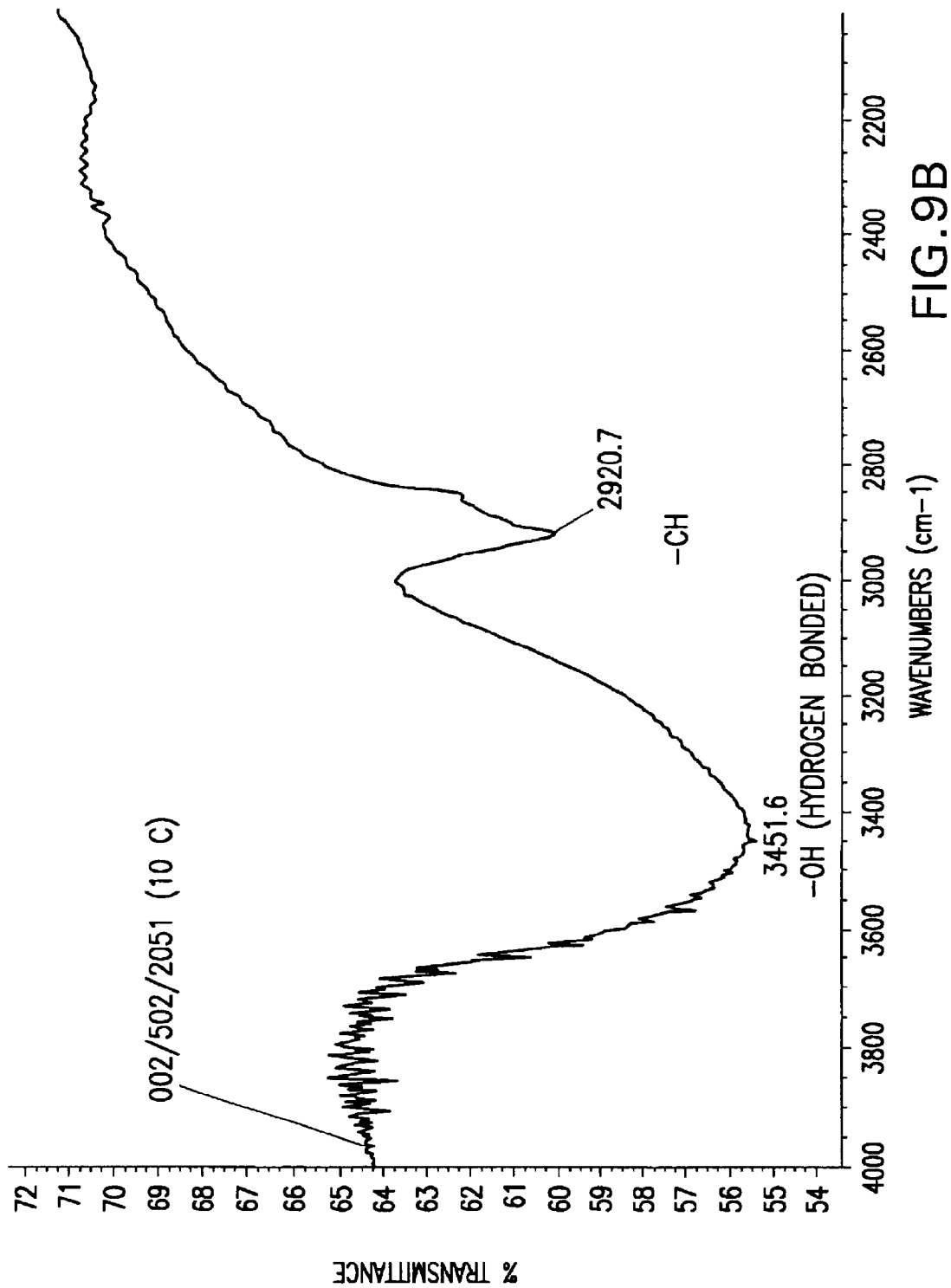
Figure 9C:
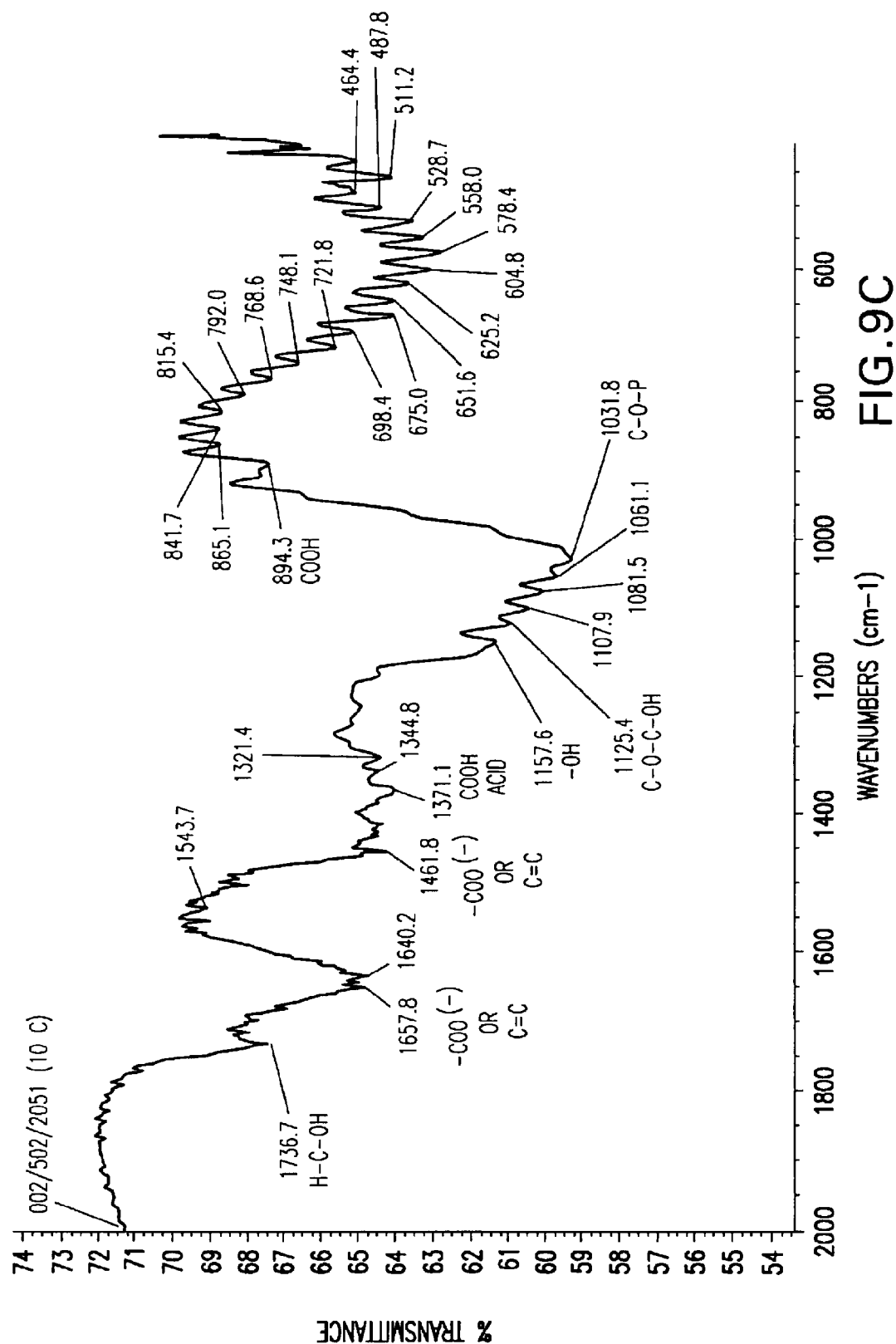
Figure 10A:
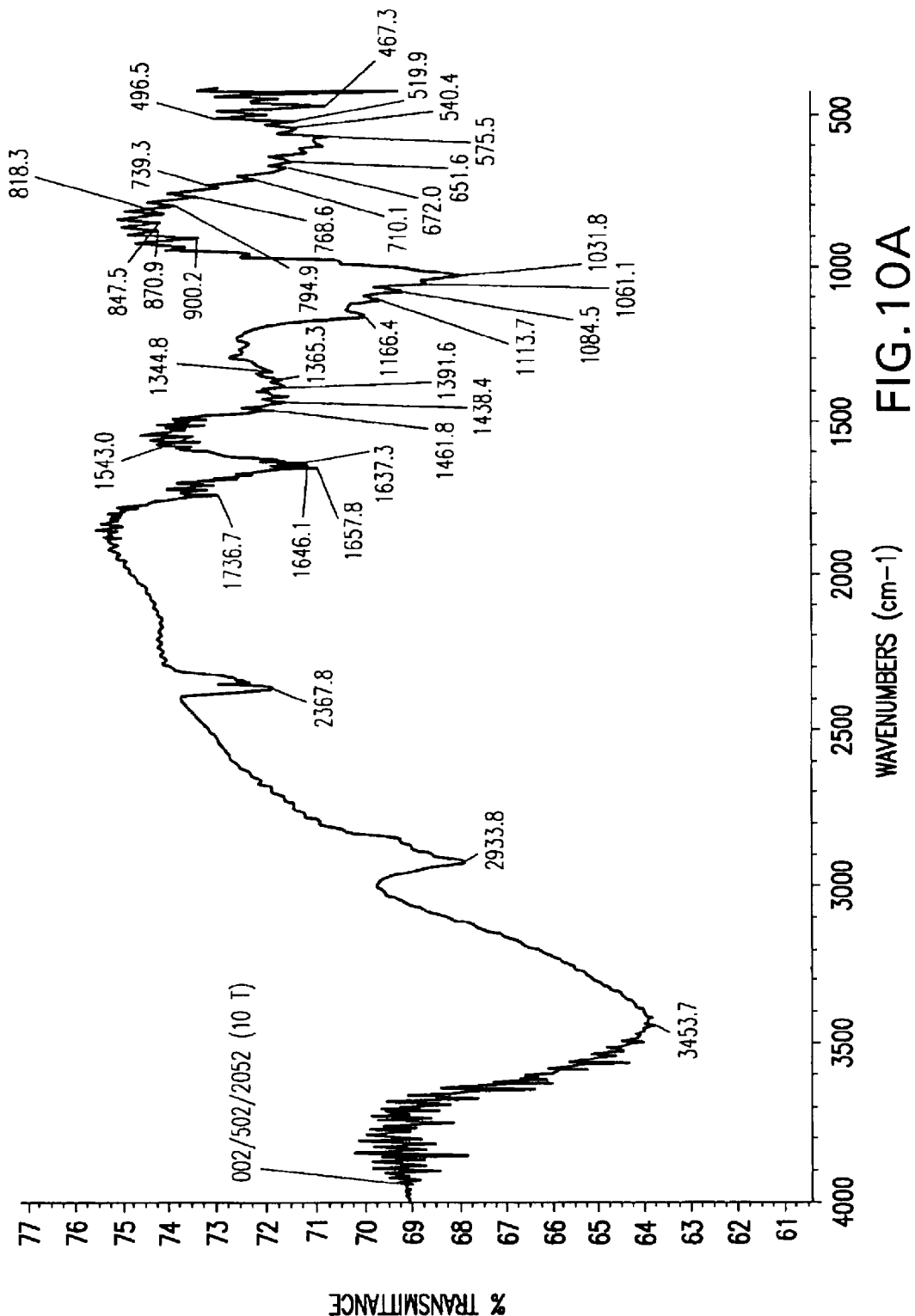
FIGS. 10(A), (B), and (C): IR spectra of an alkaline hydrogen peroxide treated wheat husk sample which was subsequently treated with ferric chloride.
Figure 10C:
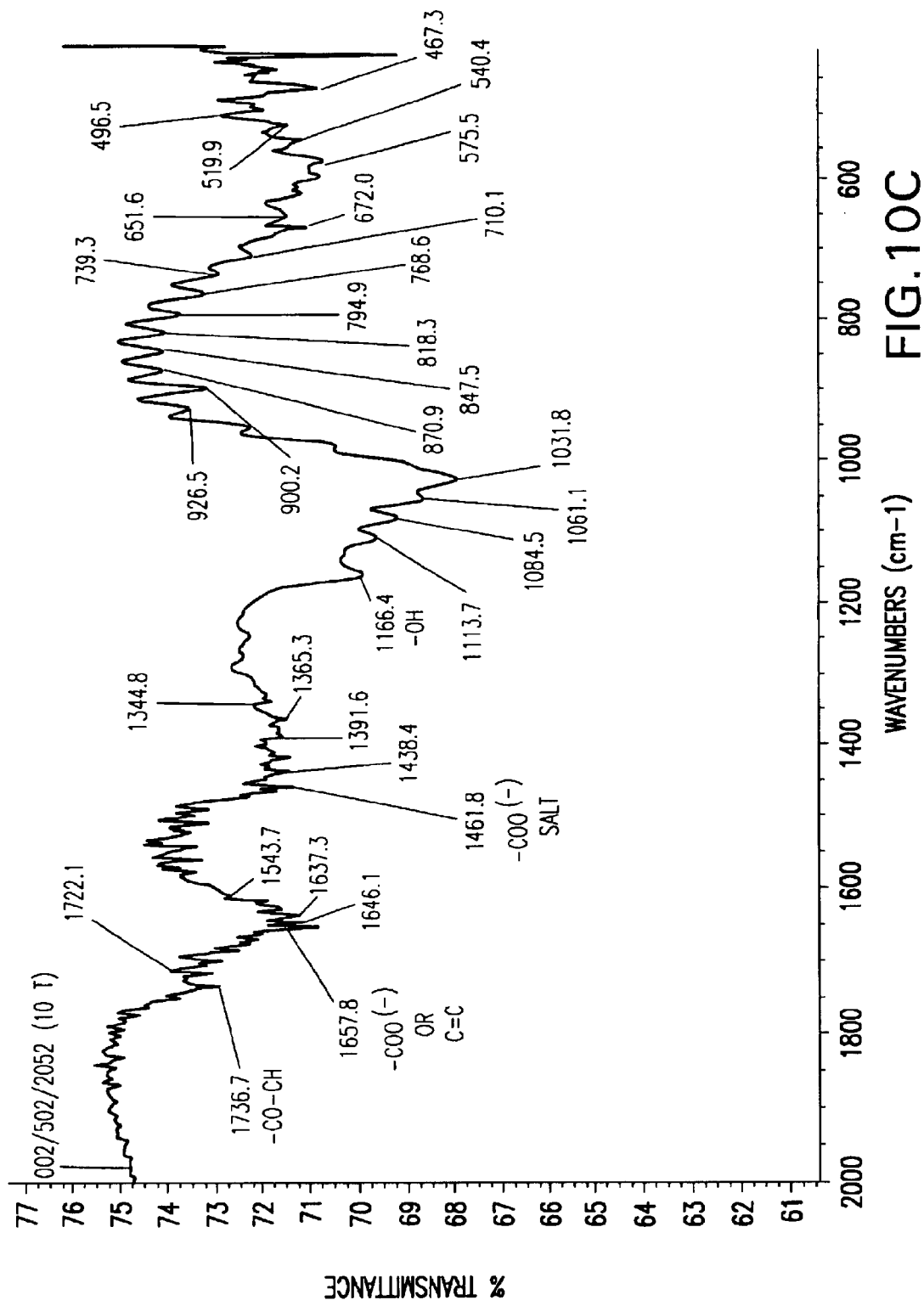

FIGS. 9 and 10 reveal that alkaline hydrogen peroxide treated wheat (*Triticum* sp.) husk resulted in many organometallic bonds, particularly at 2360±10 and 2340±10 wavenumbers ($cm^{-1}$).

Figure 11A:
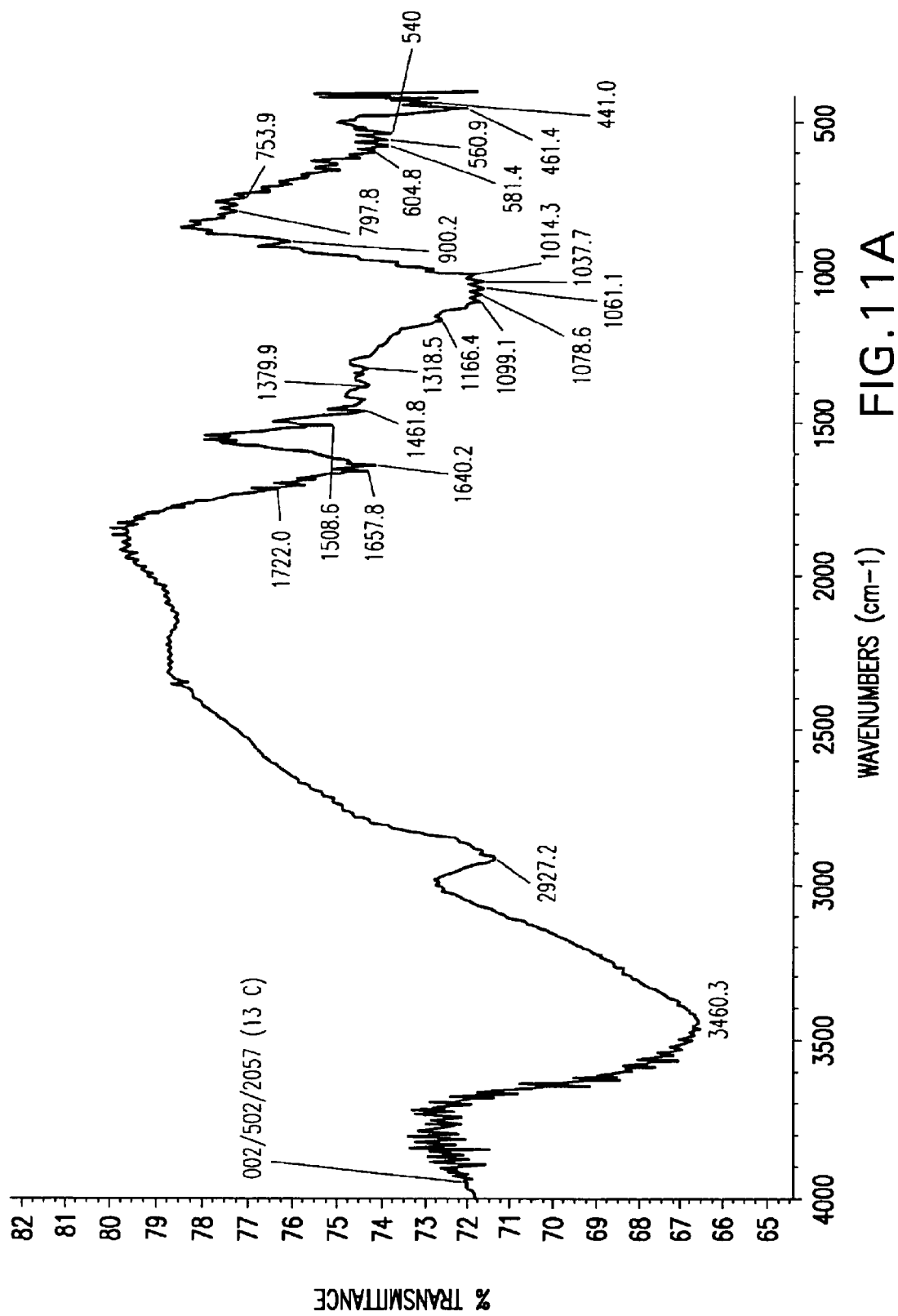
FIGS. 11(A), (B), and (C): IR spectra of a *Panicum miliaceum* husk sample.
Figure 11B:
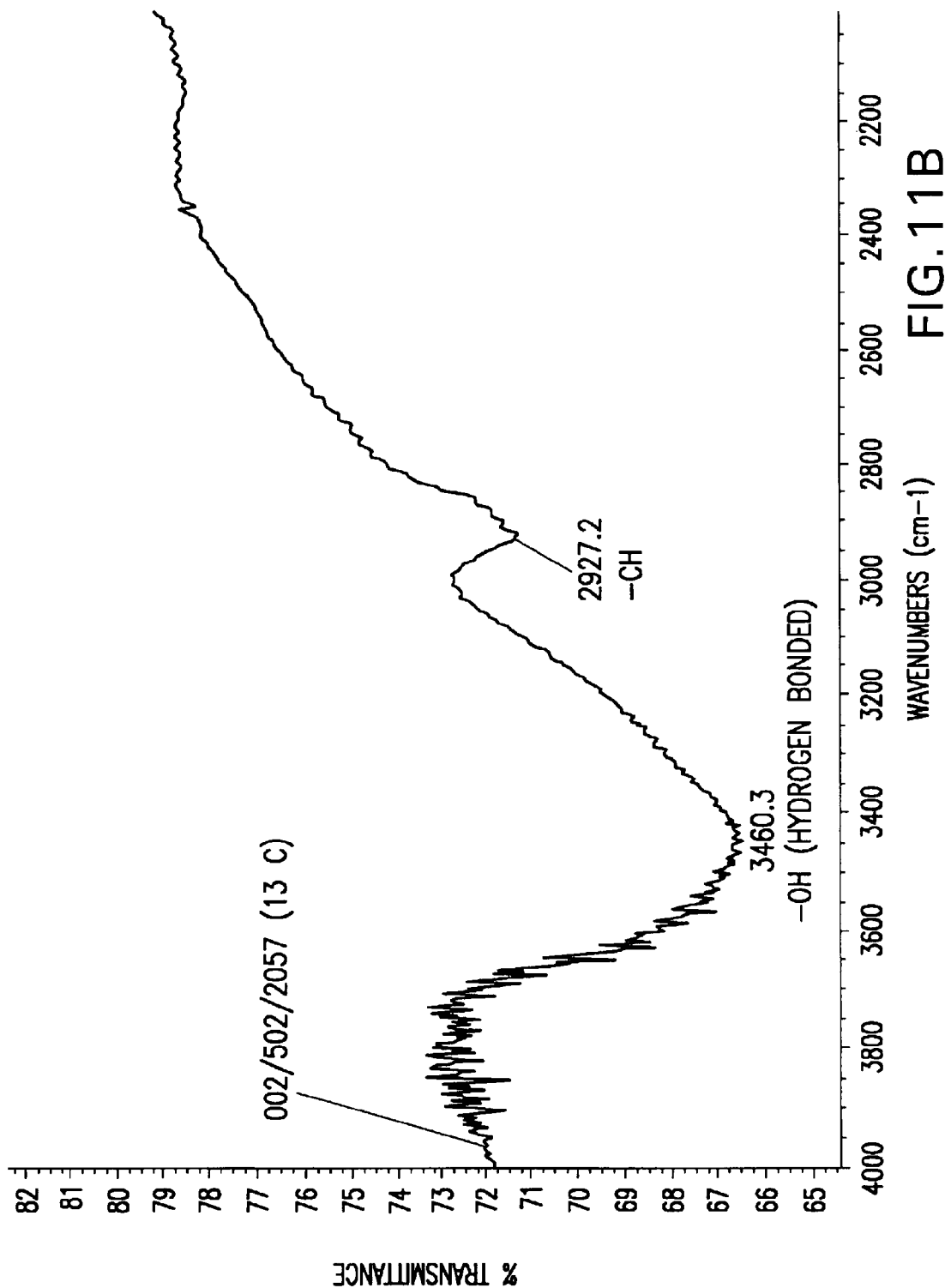
Figure 11C:
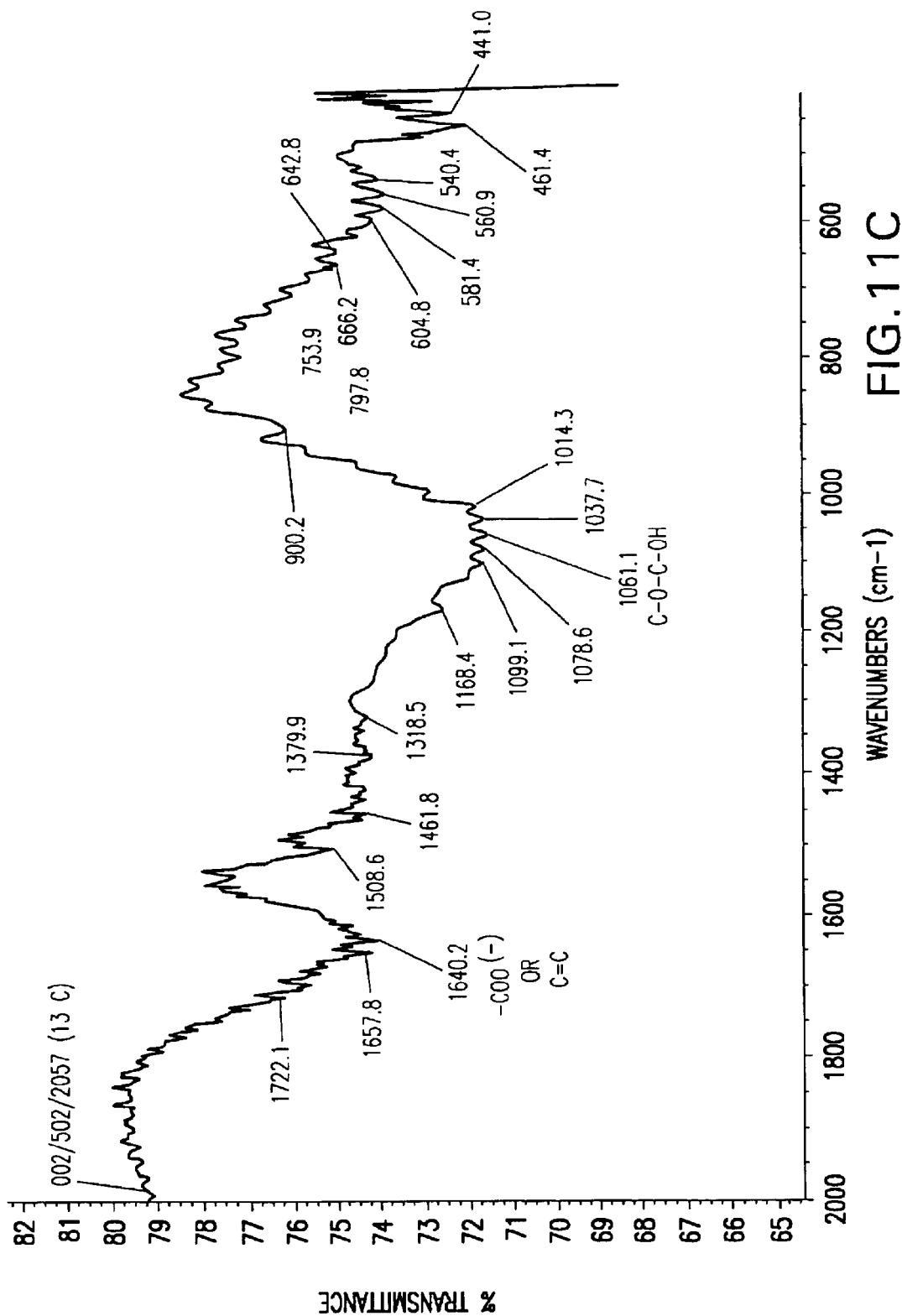
Figure 12A:
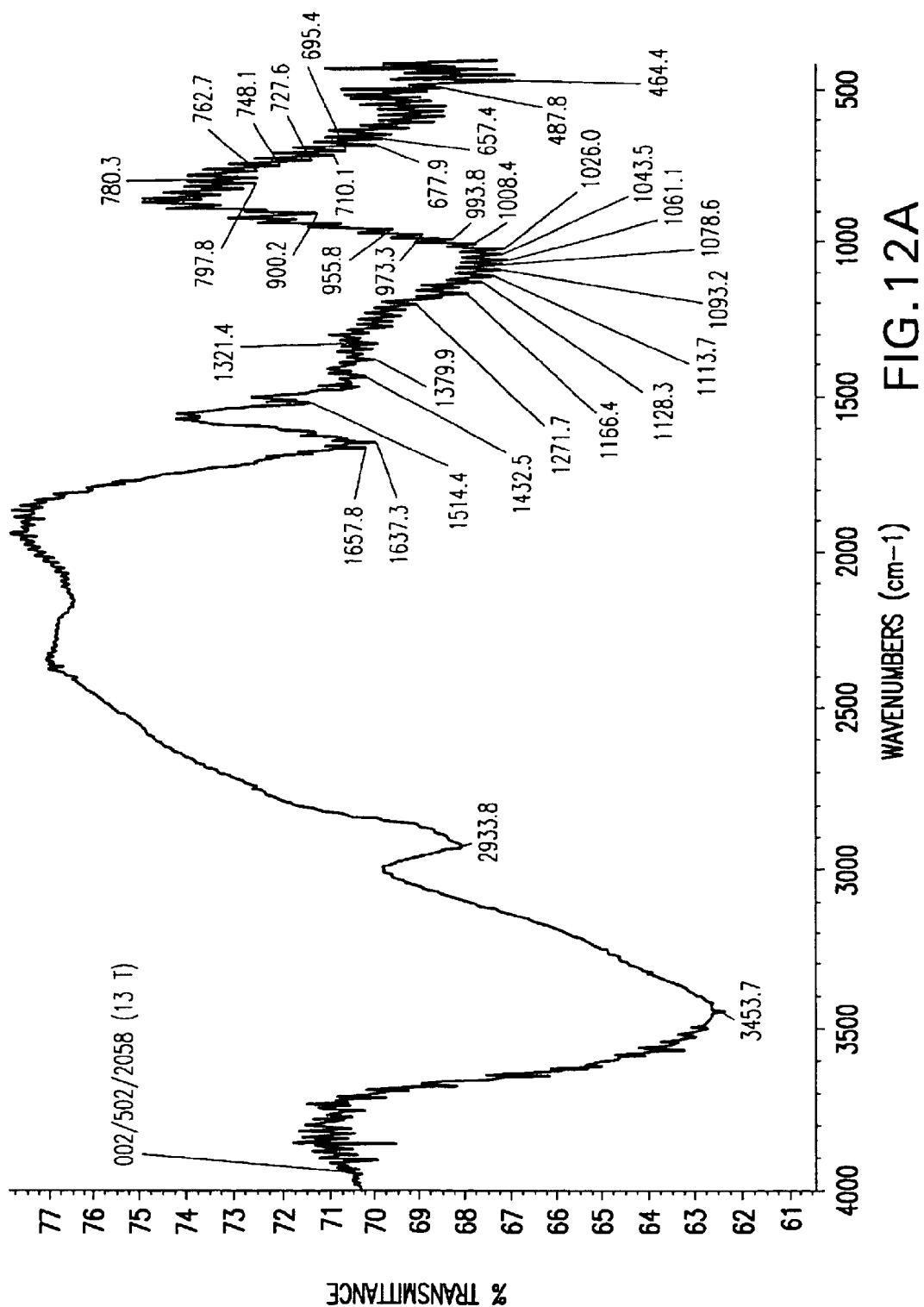
FIGS. 12(A), (B), and (C): IR spectra of an alkaline hydrogen peroxide treated *Panicum miliaceum* husk sample which was subsequently treated with ferric chloride.
Figure 12B:
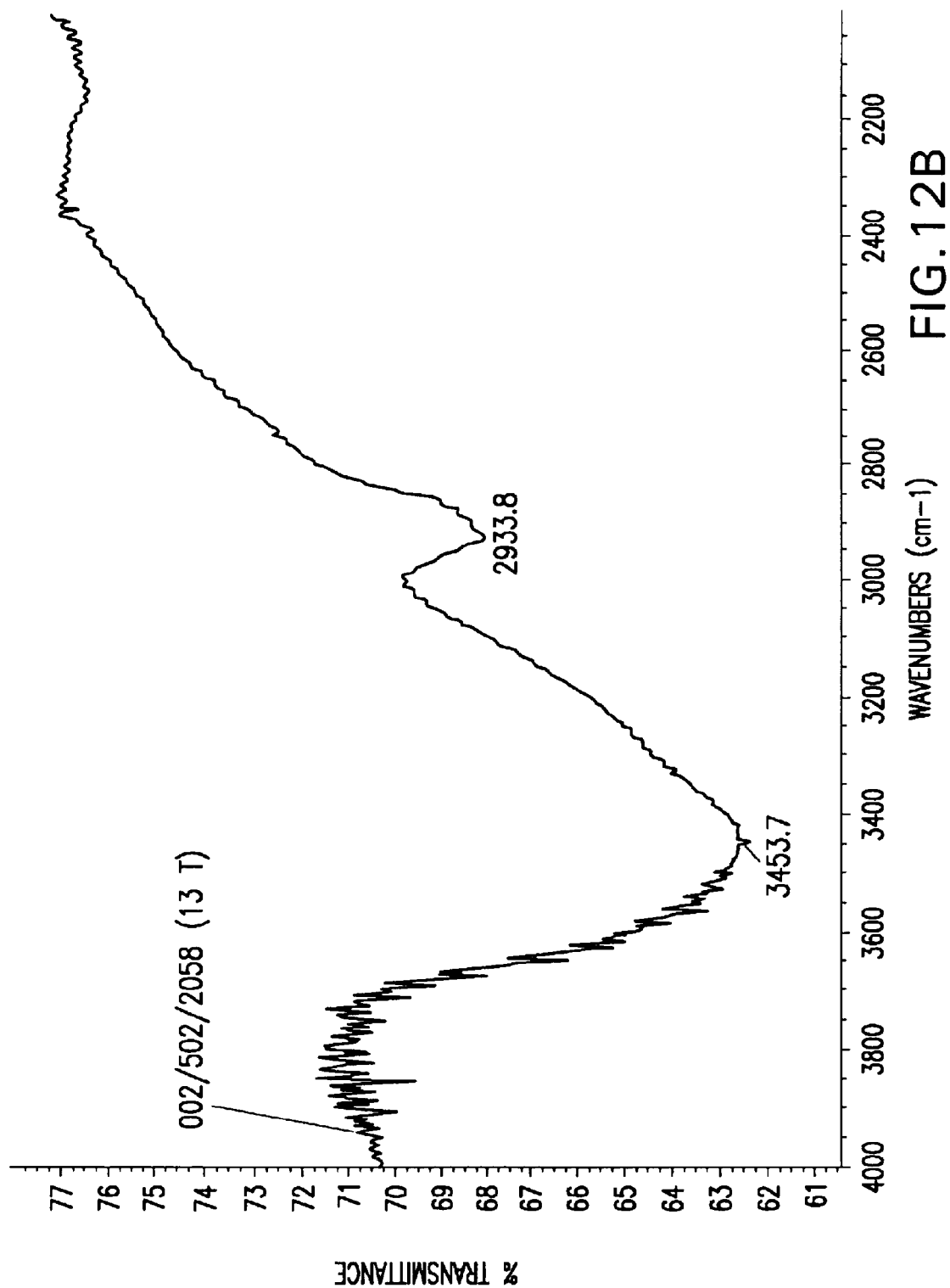

The IR spectra of FIGS. 11 and 12 reveal that organometallic bonds were more predominant for *Panicum miliaceum* husk samples from 1600 to 600 wavenumbers ($cm^{-1}$).

Figure 13A:
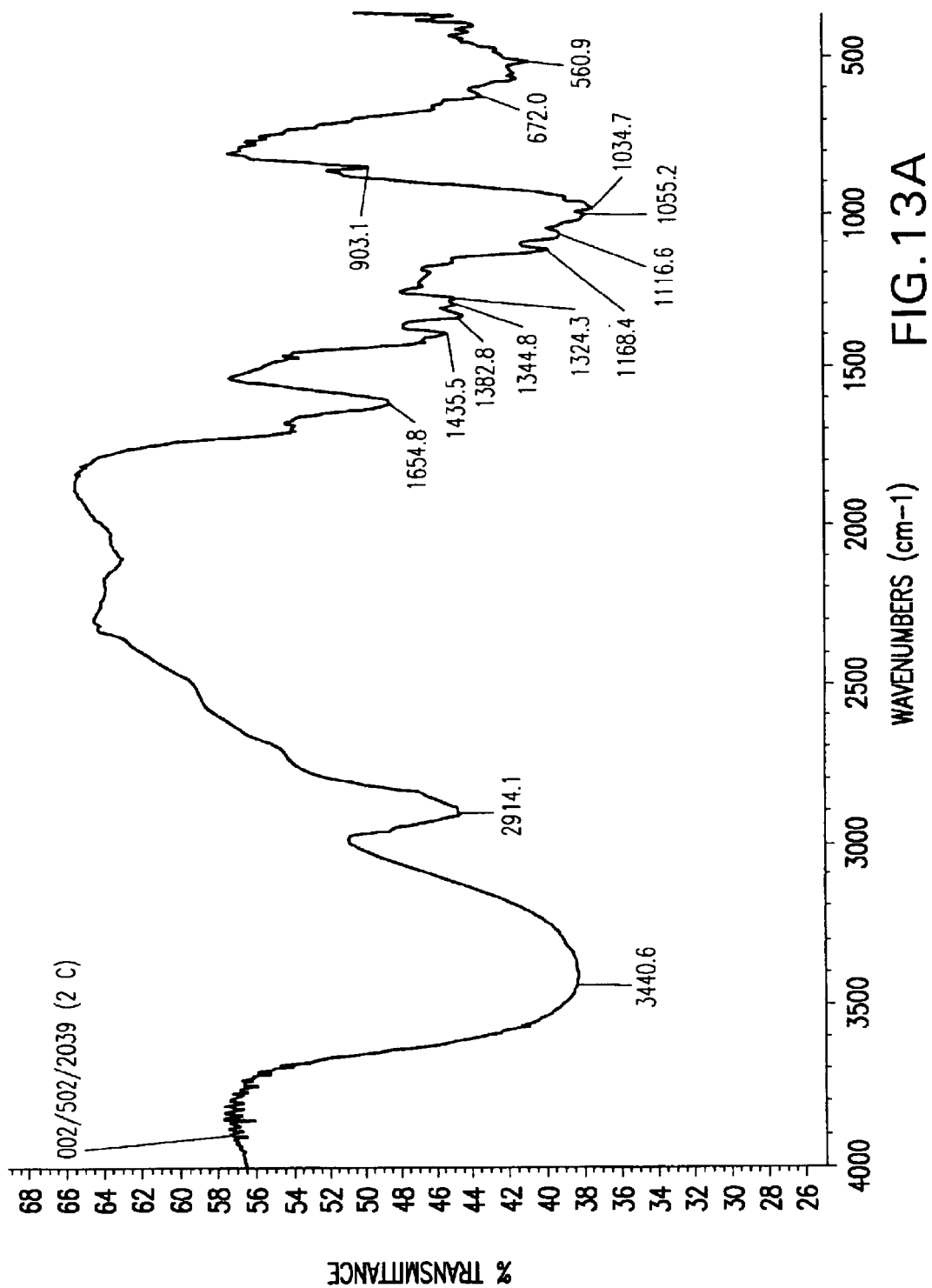
FIGS. 13(A), (B), and (C): IR spectra of an alkaline hydrogen peroxide treated cotton seed (*Gossypium* sp.) hull sample.
Figure 13B:
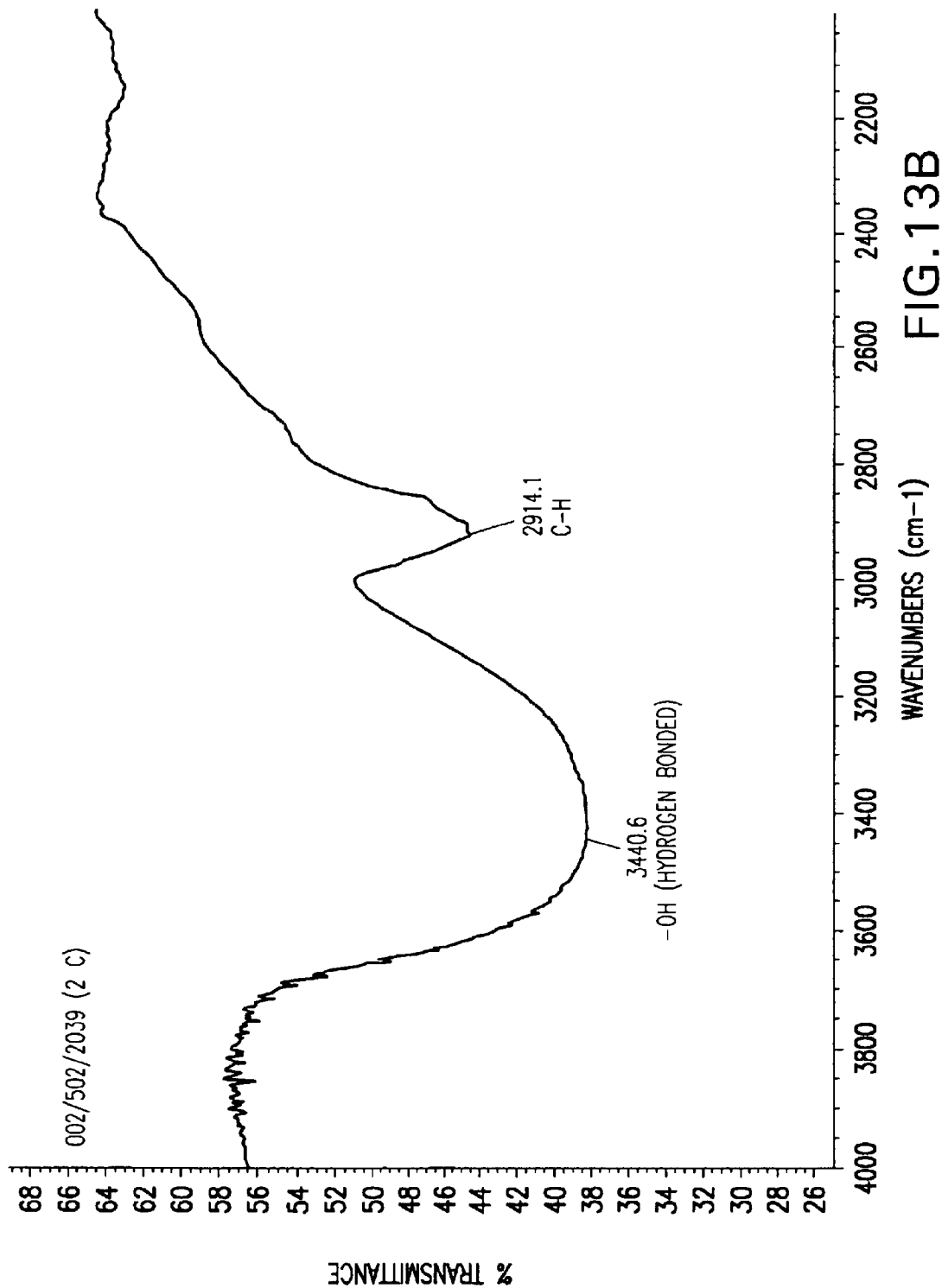
Figure 14A:
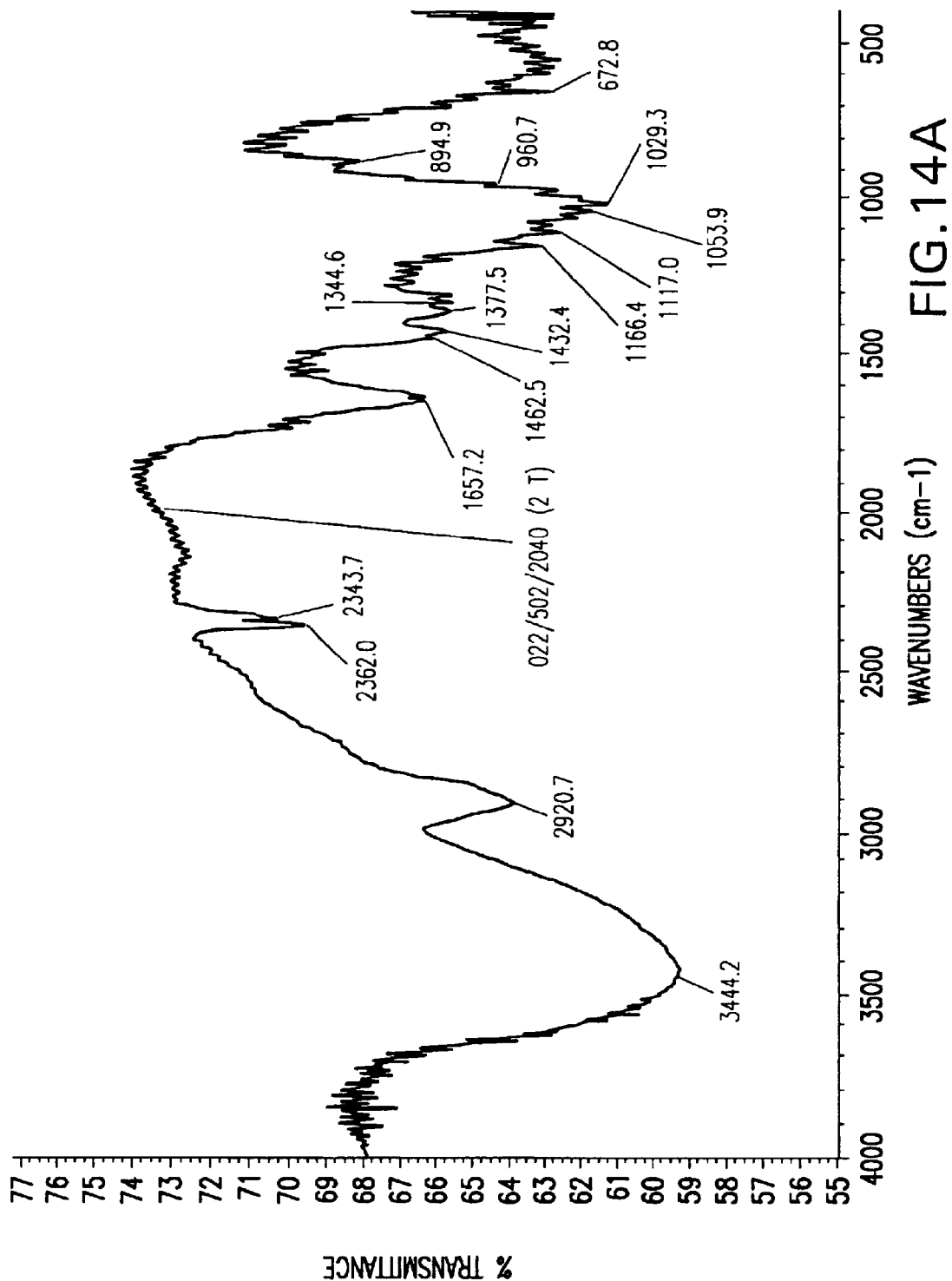
FIGS. 14(A), (B), and (C): IR spectra of an alkaline hydrogen peroxide treated cotton seed (*Gossypium* sp.) hull sample which was subsequently treated with ferric chloride.
Figure 14B:
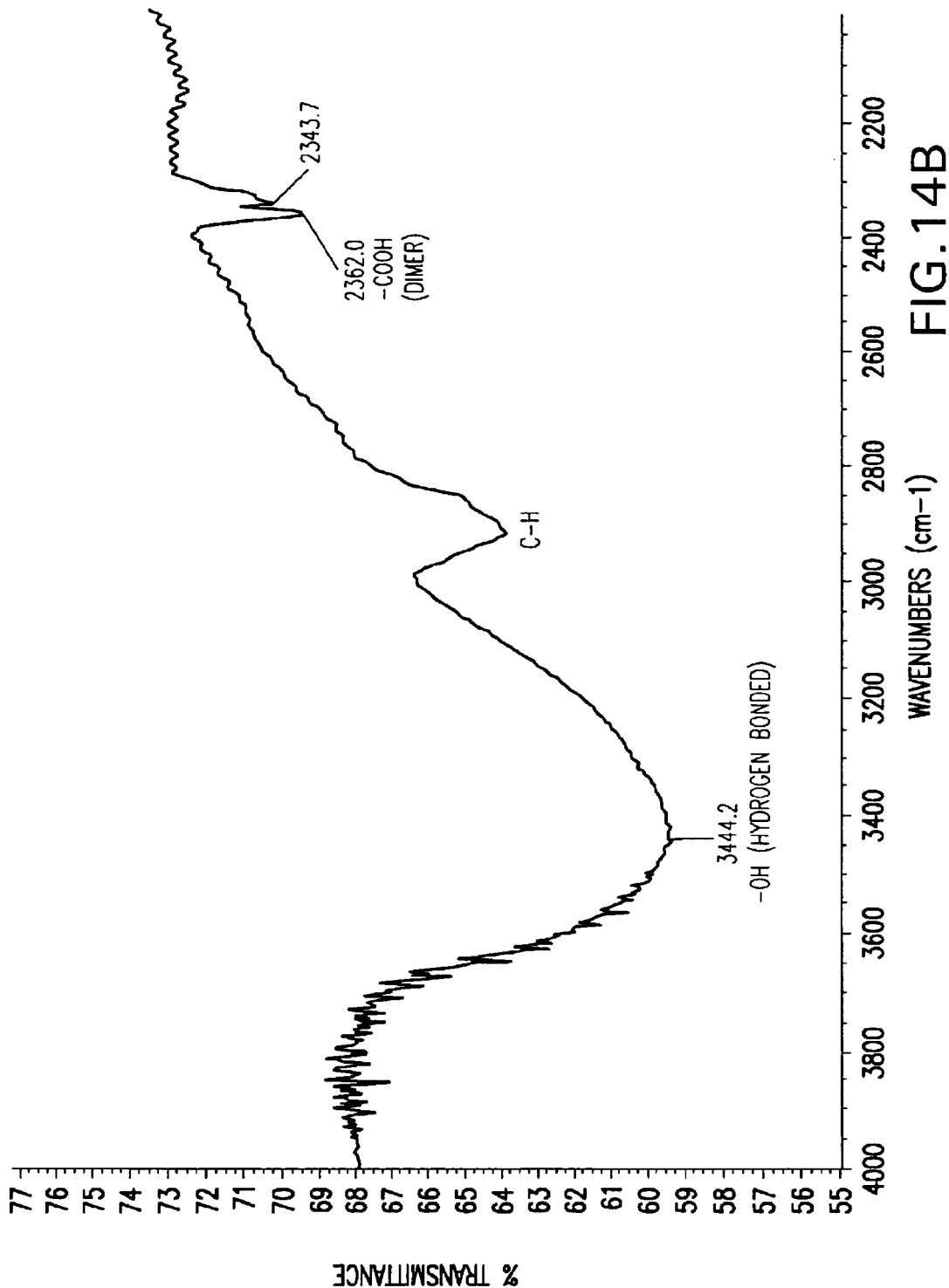
Figure 14C:
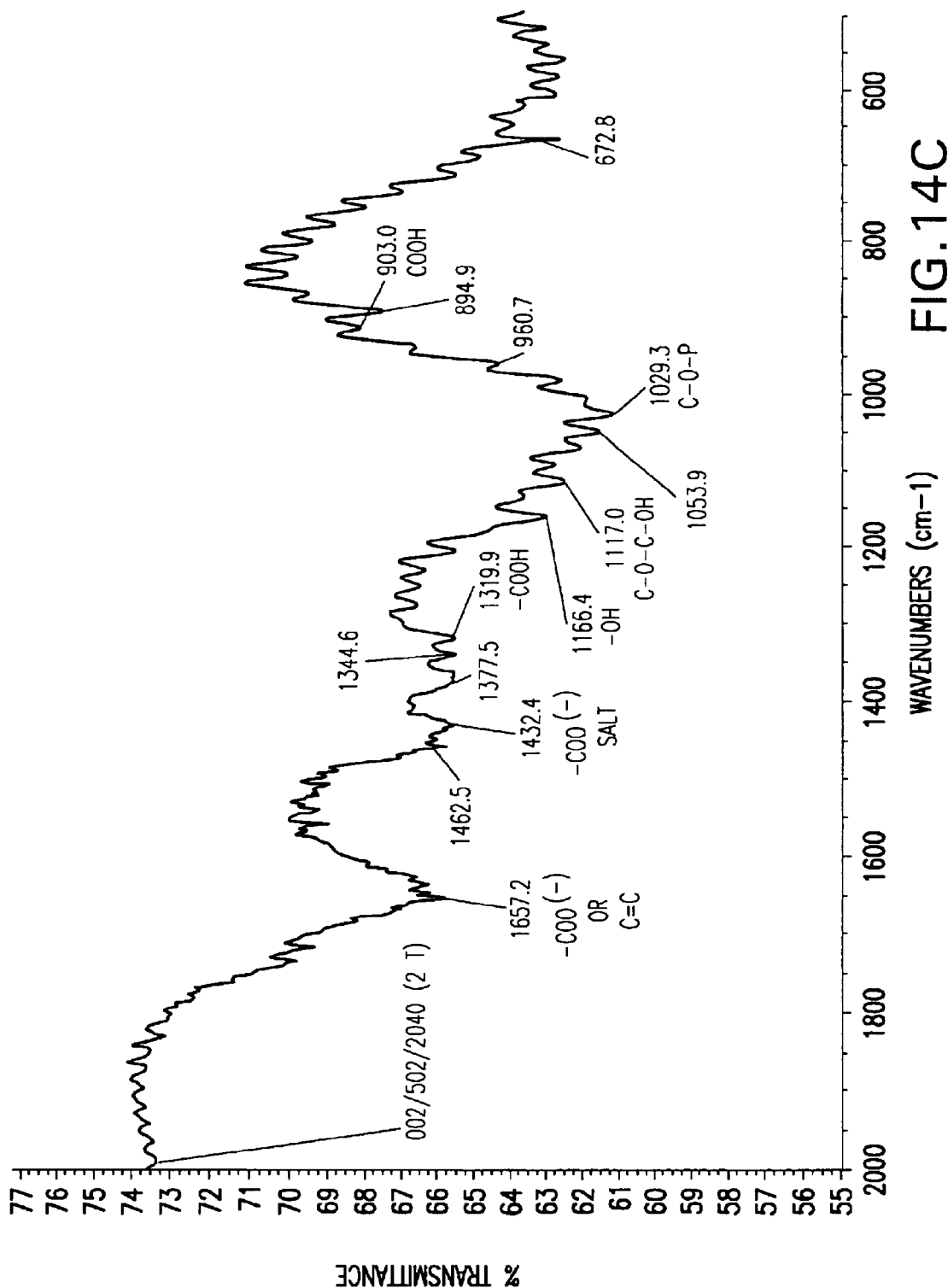

As shown in the IR spectra in FIGS. 13 and 14, alkaline hydrogen peroxide treated cotton seed (*Gossypium* sp.) hulls resulted in many organometallic bonds, particularly at 2360±10 and 2340±10 wavenumbers ($cm^{-1}$).

Figure 15A:
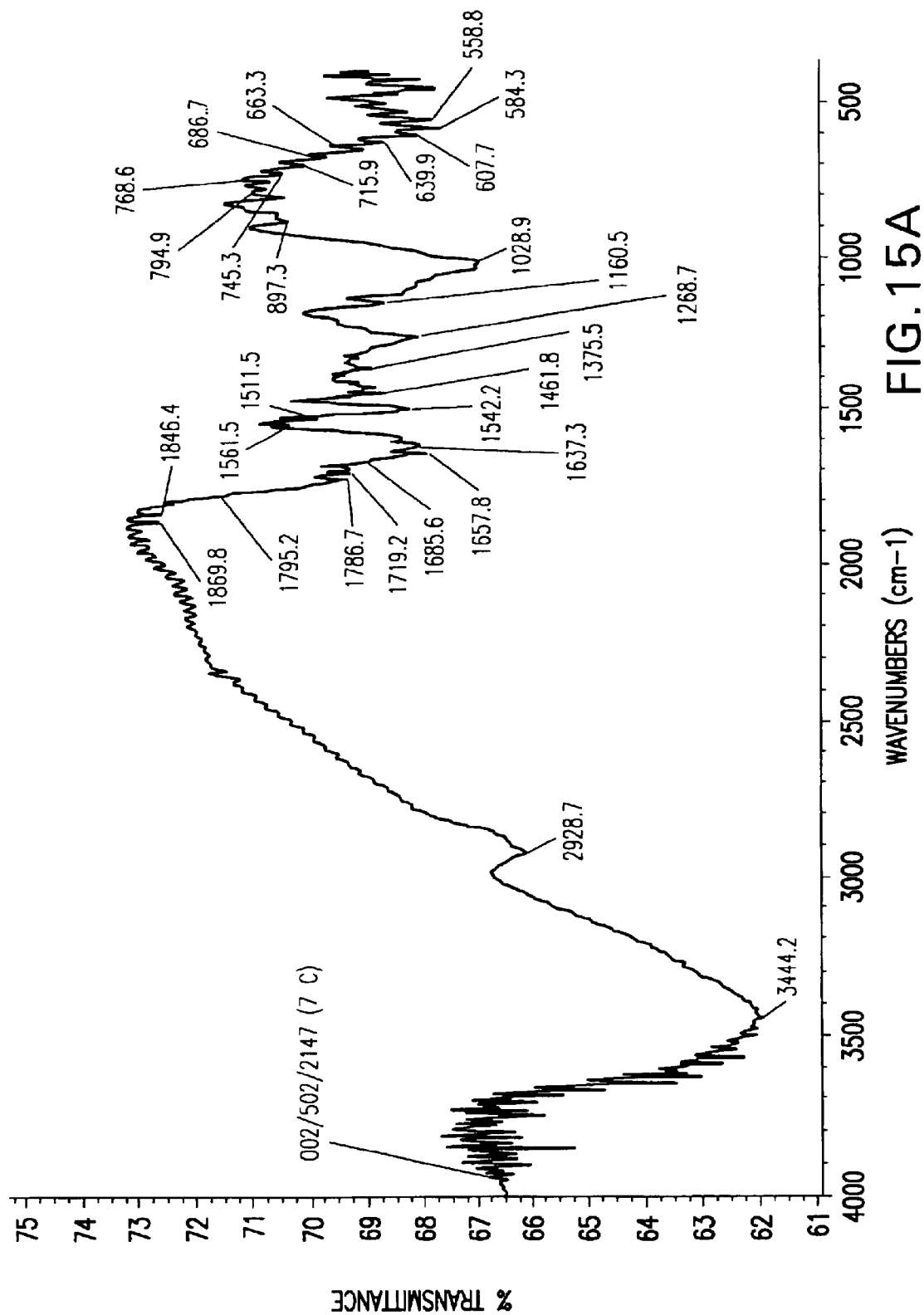
FIGS. 15(A), (B), and (C): IR spectra of an alkaline hydrogen peroxide treated castor (*Ricinus communis*) seed coat sample.
Figure 15B:
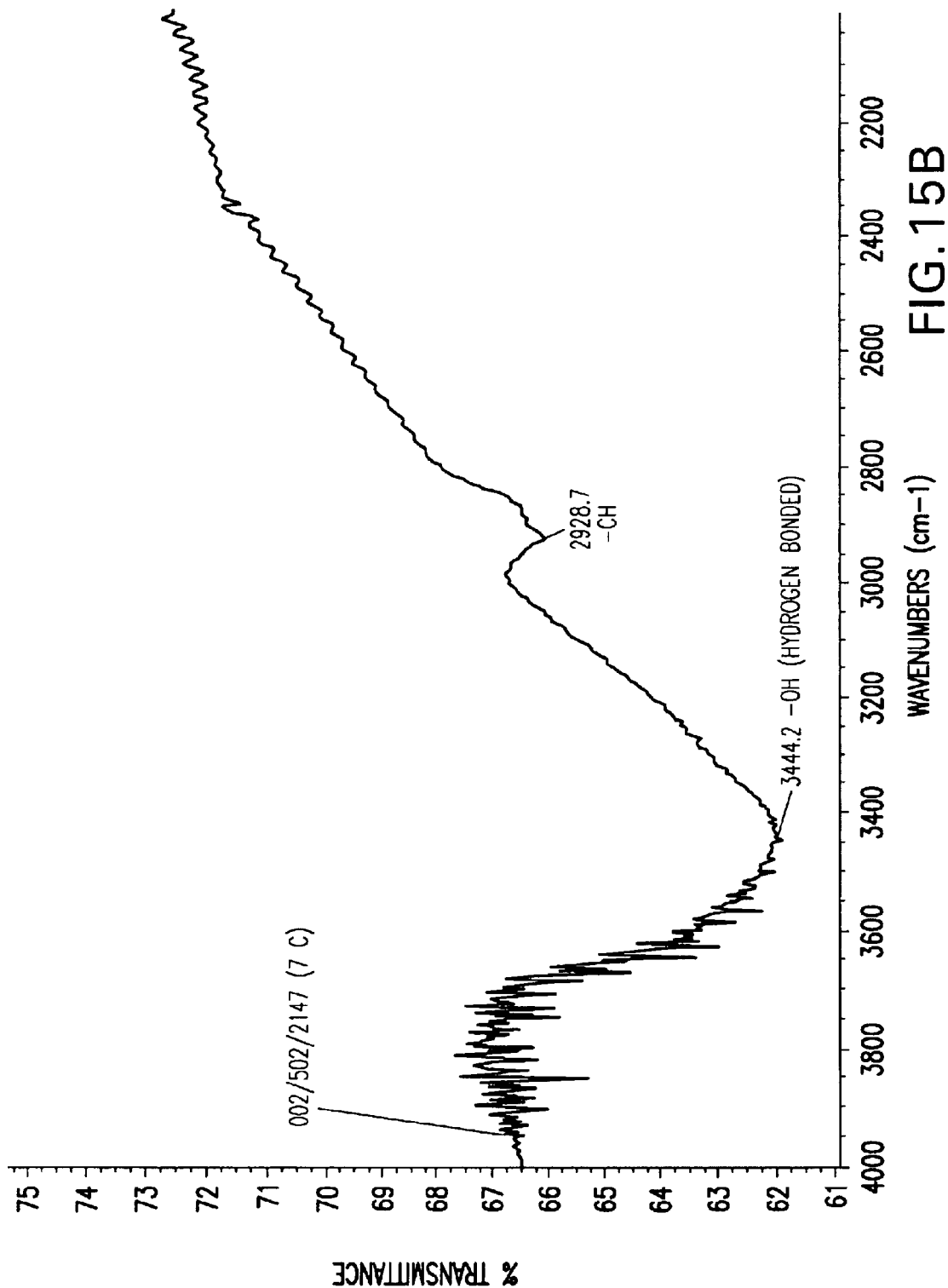
Figure 15C:
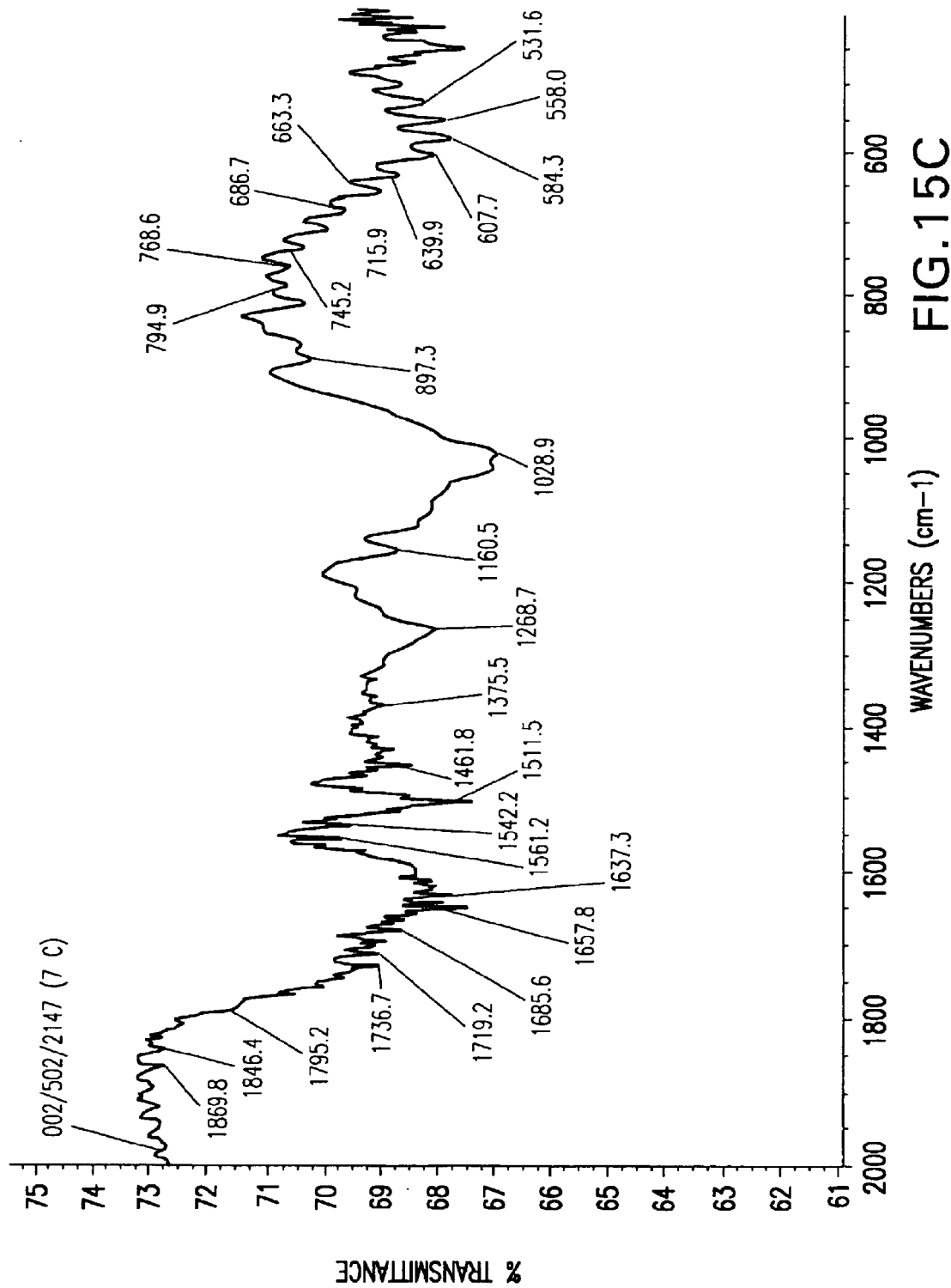
Figure 16A:
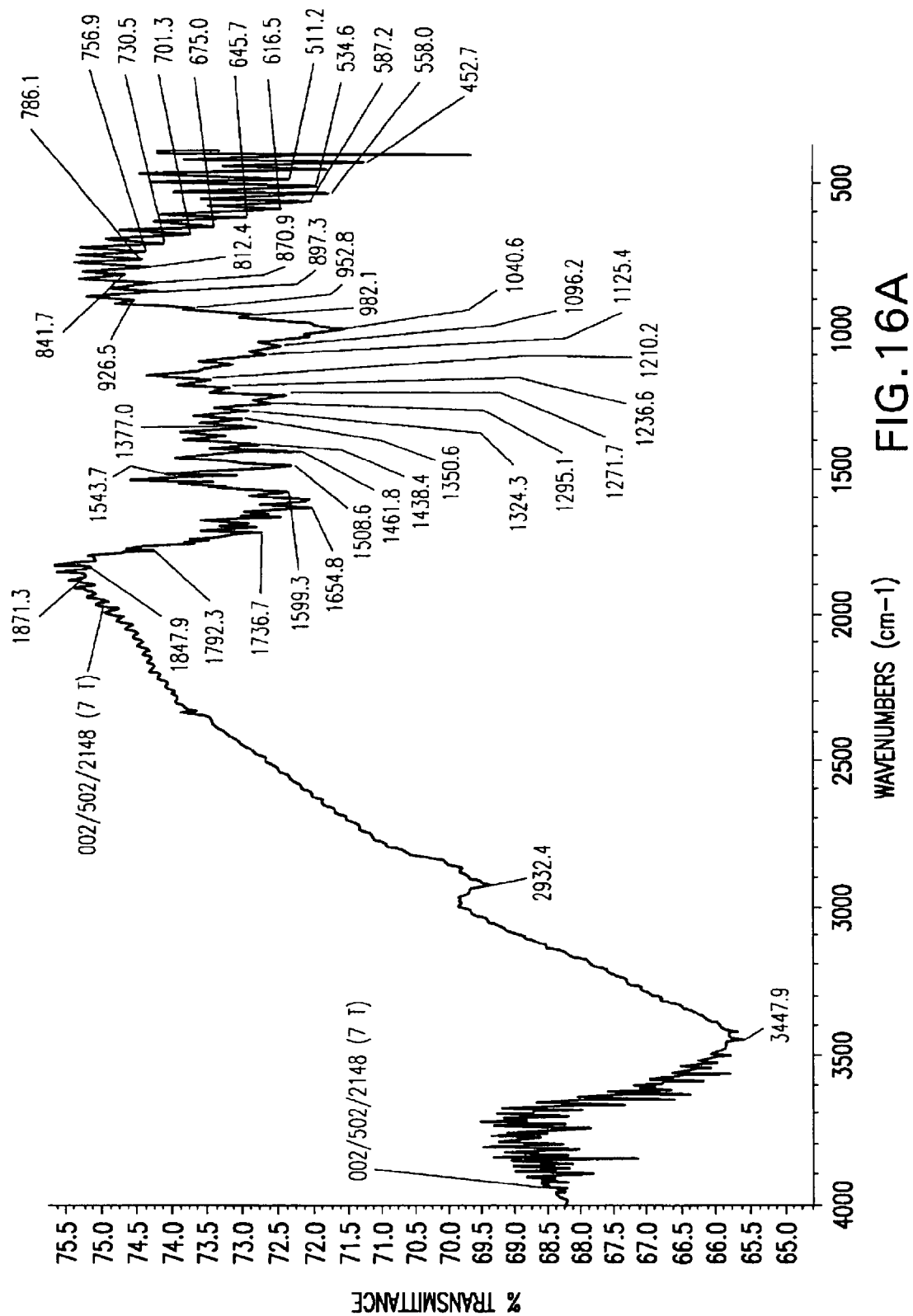
FIGS. 16(A), (B), and (C): IR spectra of an alkaline hydrogen peroxide treated castor (*Ricinus communis*) seed coat sample which subsequently was treated with ferric chloride.
Figure 16B:
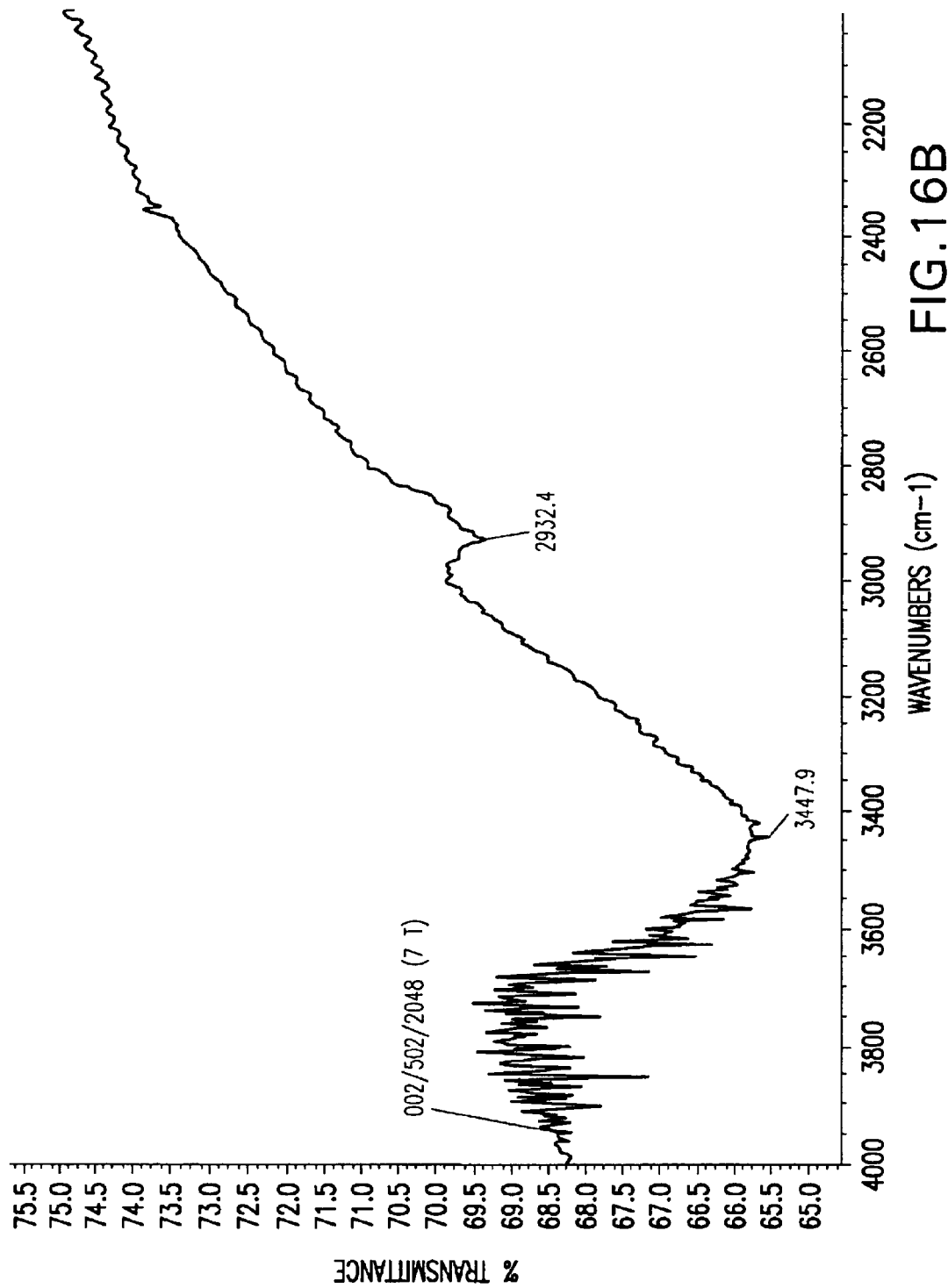
Figure 16C:
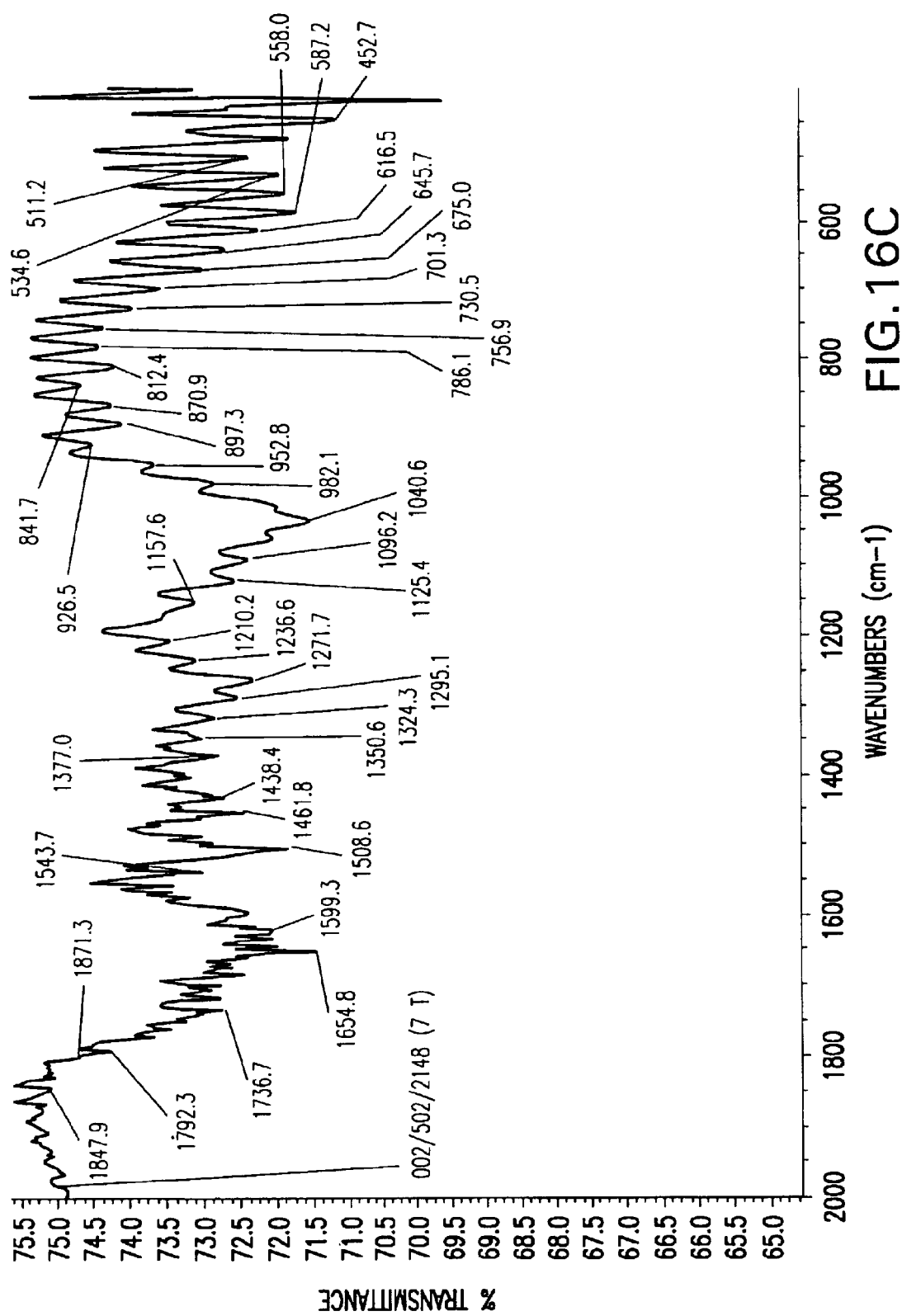

As shown in the IR spectra of FIGS. 15 and 16, alkaline hydrogen peroxide treated castor seed coats (*Ricinus communis*) resulted in many organometallic bonds.

Figure 17A:
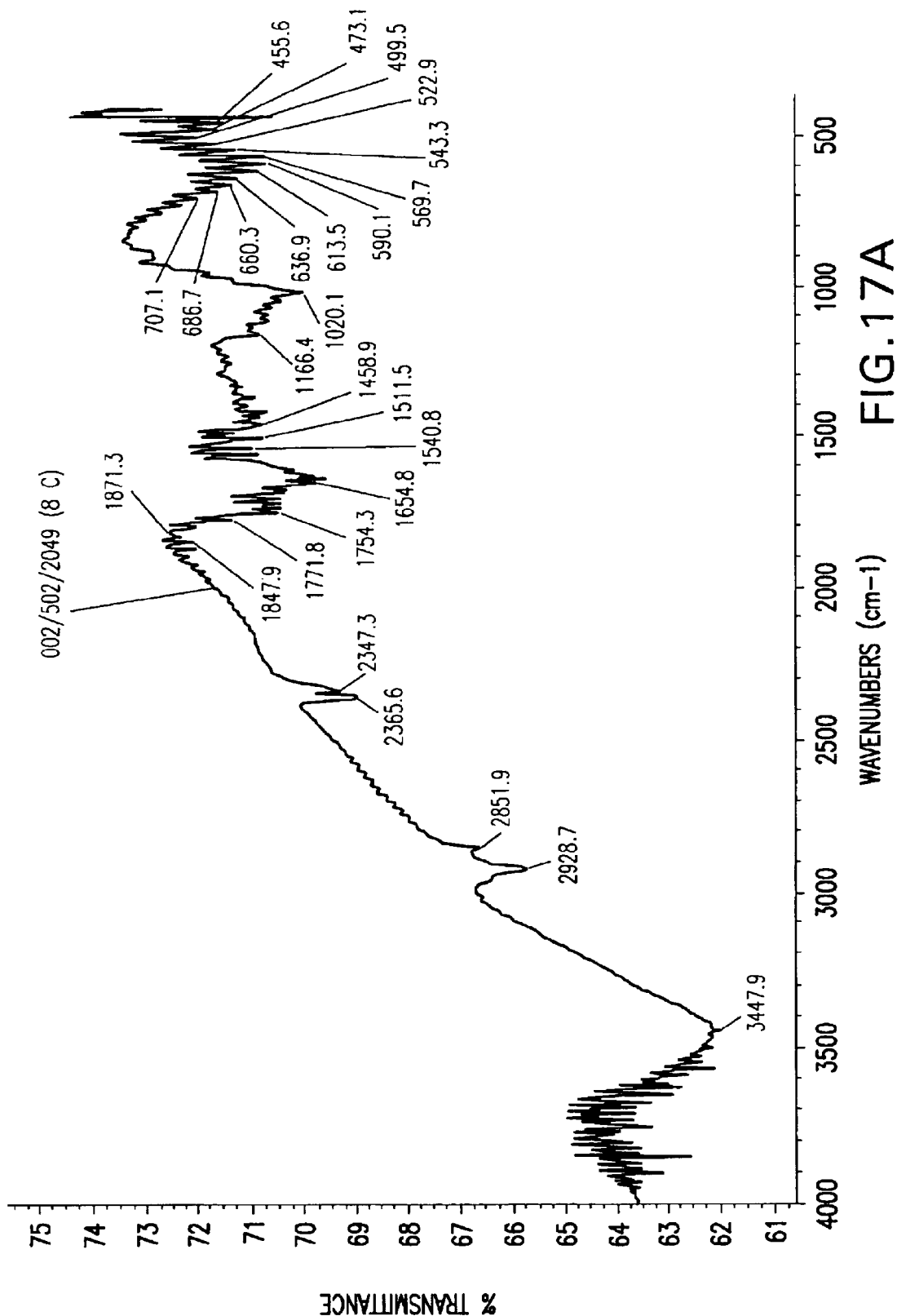
FIGS. 17(A), (B), and (C): IR spectra of an alkaline hydrogen peroxide treated sunflower (*Helianthus annus*) seed coat sample.
Figure 17B:
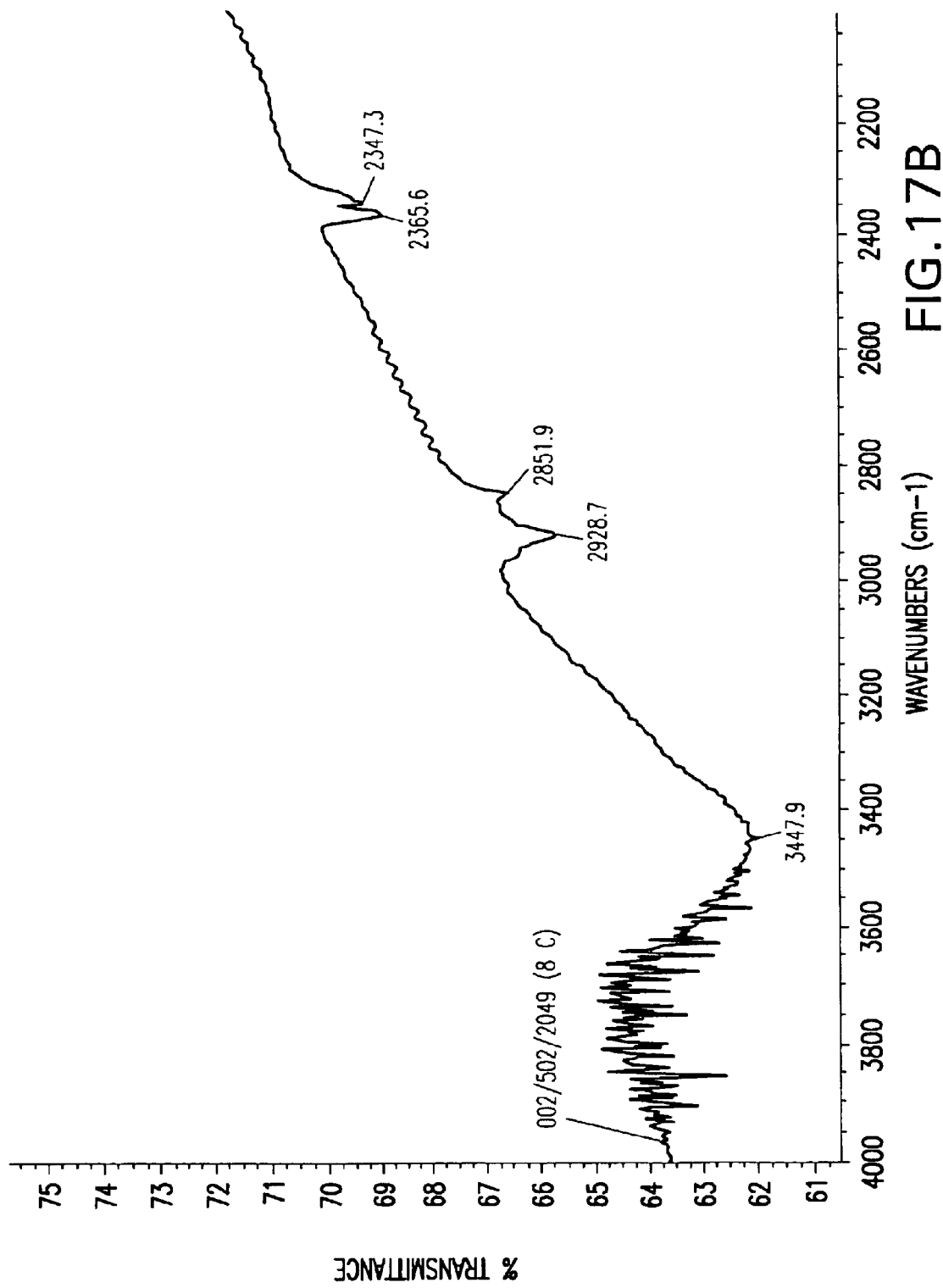
Figure 17C:
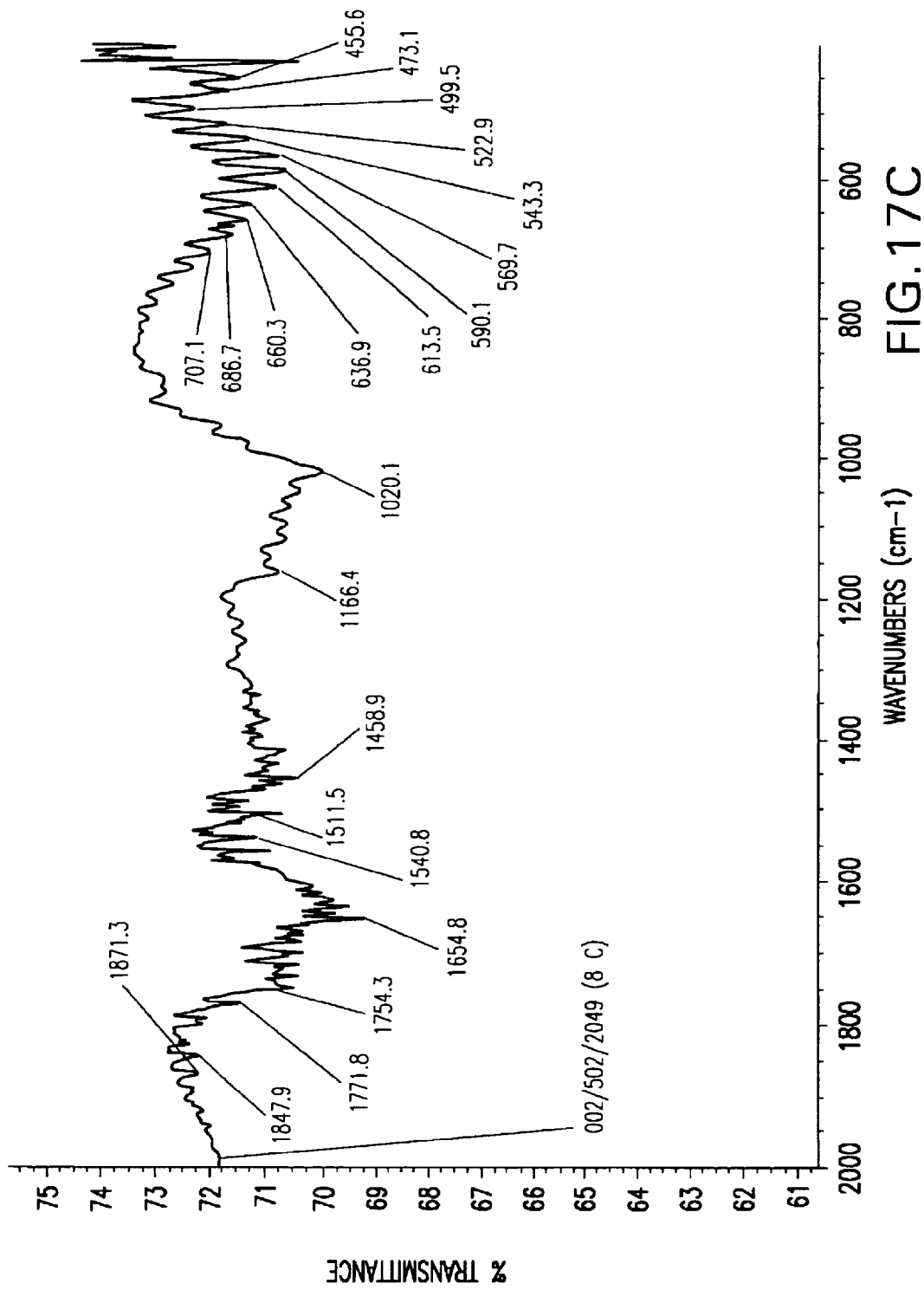
Figure 18A:
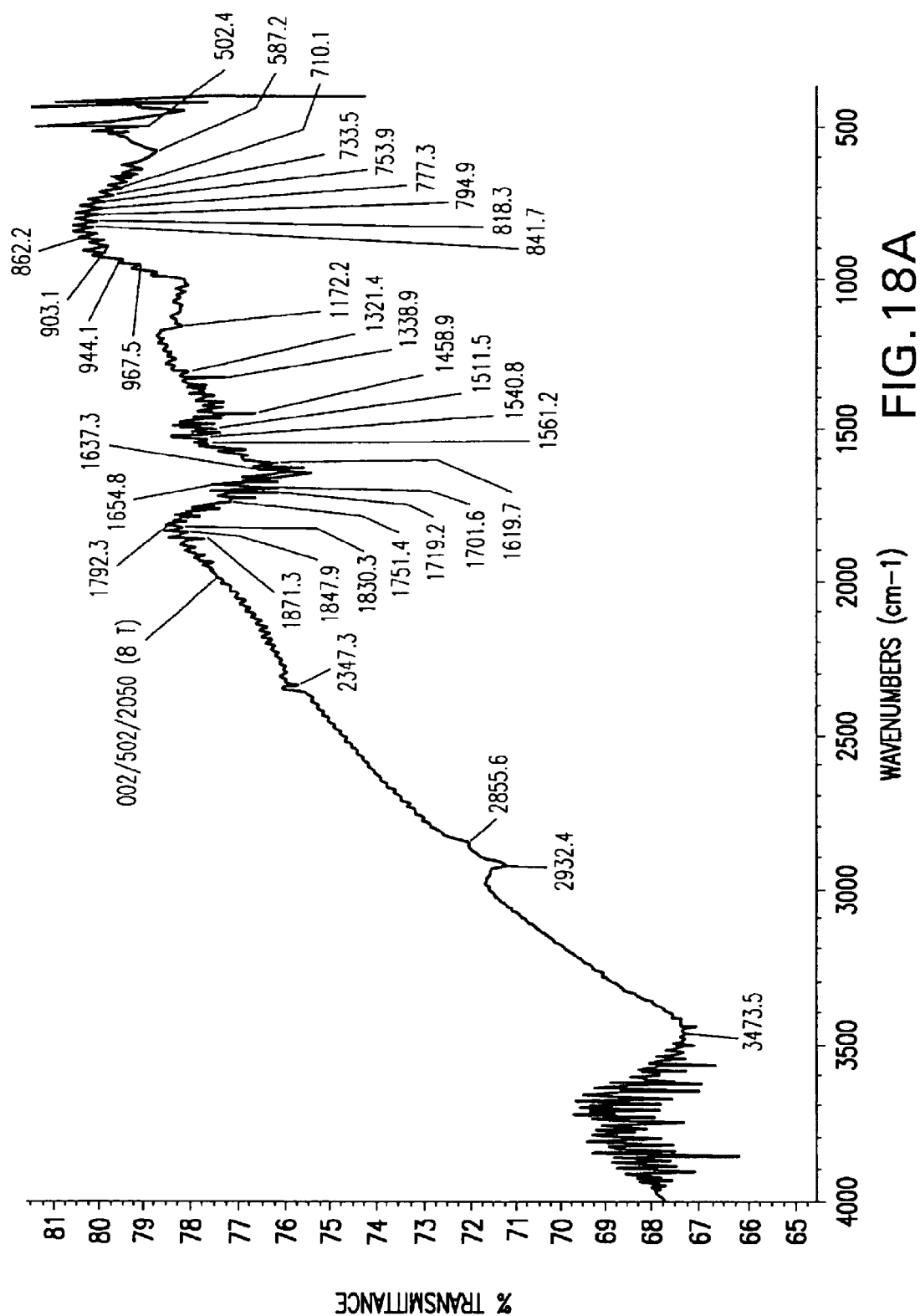
FIGS. 18(A), (B), and (C): IR spectra of an alkaline hydrogen peroxide treated sunflower (*Helianthus annus*) seed coat sample which subsequently was treated with ferric chloride.
Figure 18B:
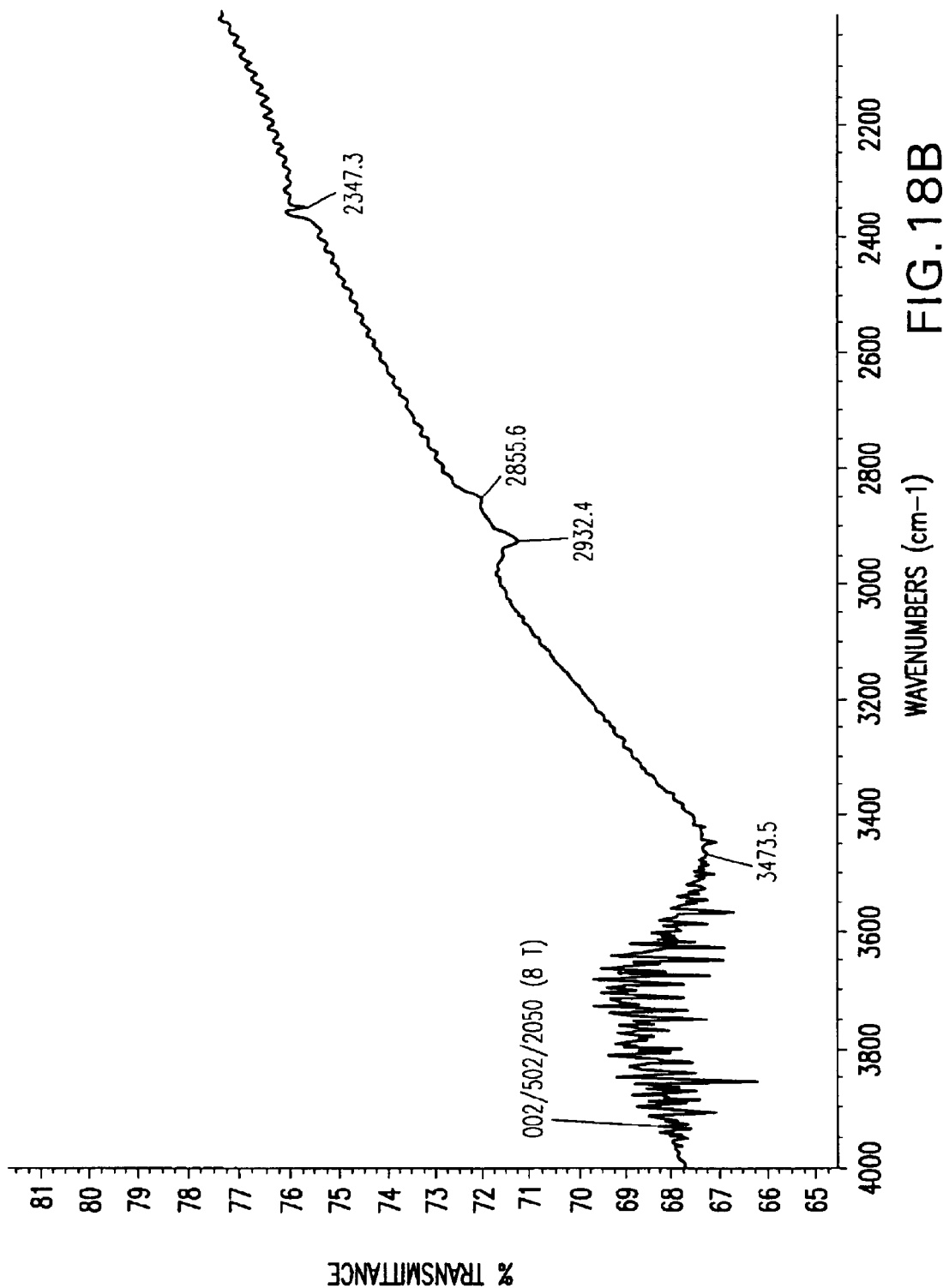
Figure 18C:
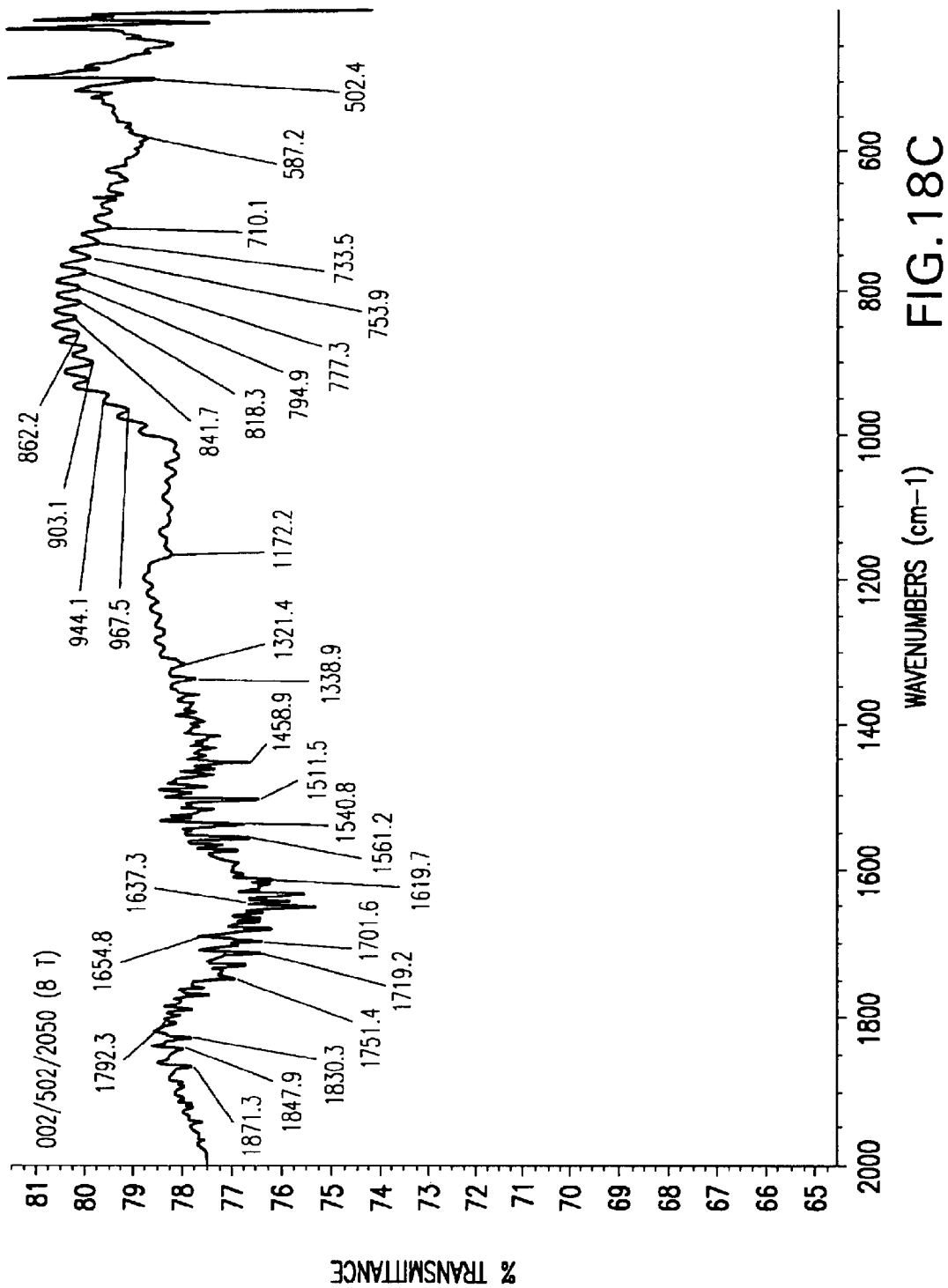

As shown in the IR spectra of FIGS. 17 and 18, alkaline hydrogen peroxide treated sunflower seed coats (*Helianthus annus*) resulted in many organometallic bonds.

Figure 19A:
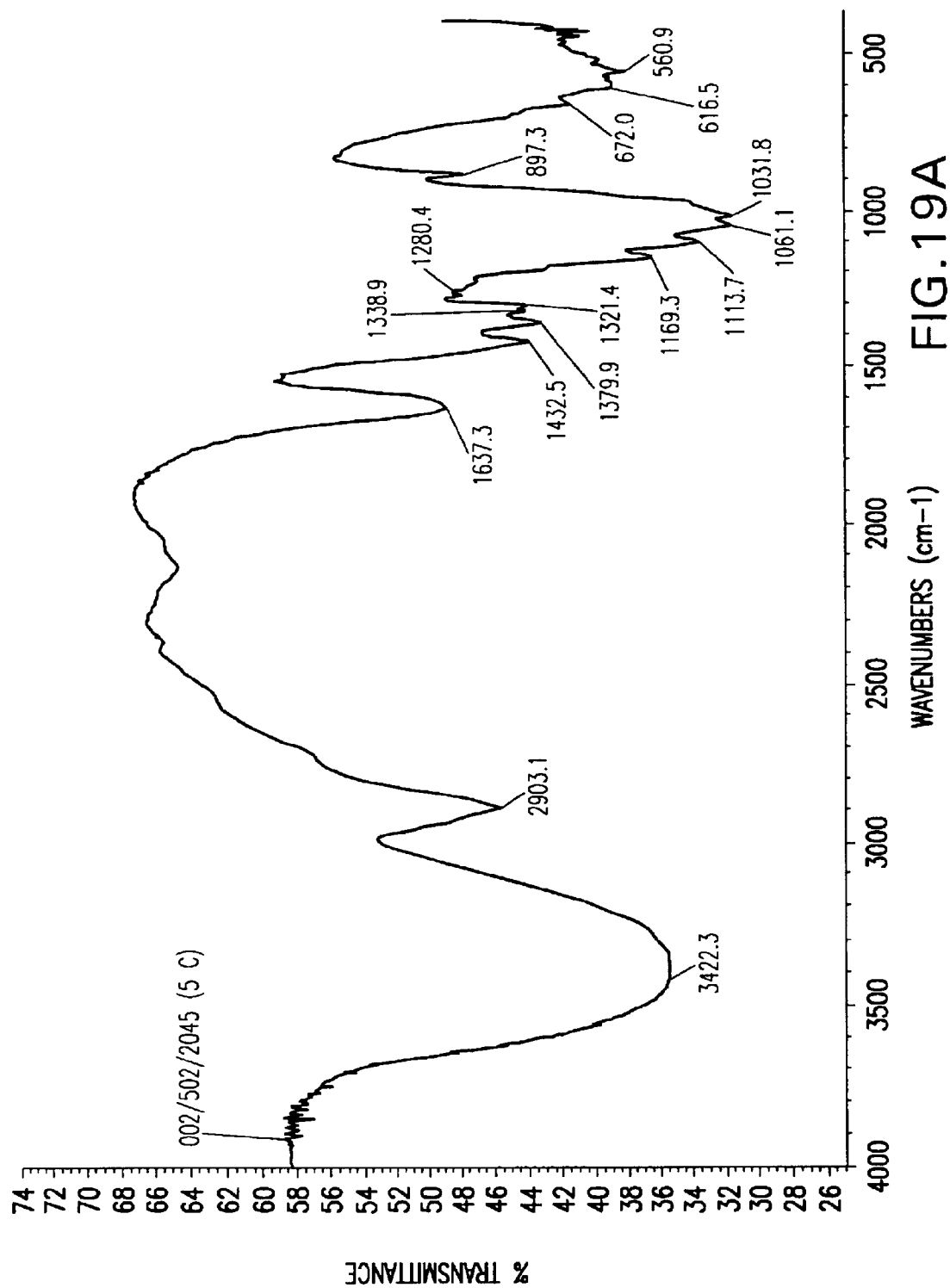
FIGS. 19(A), (B), and (C): IR spectra of an alkaline hydrogen peroxide treated redgram (*Cajanus cajan*) seed coat sample.
Figure 19B:
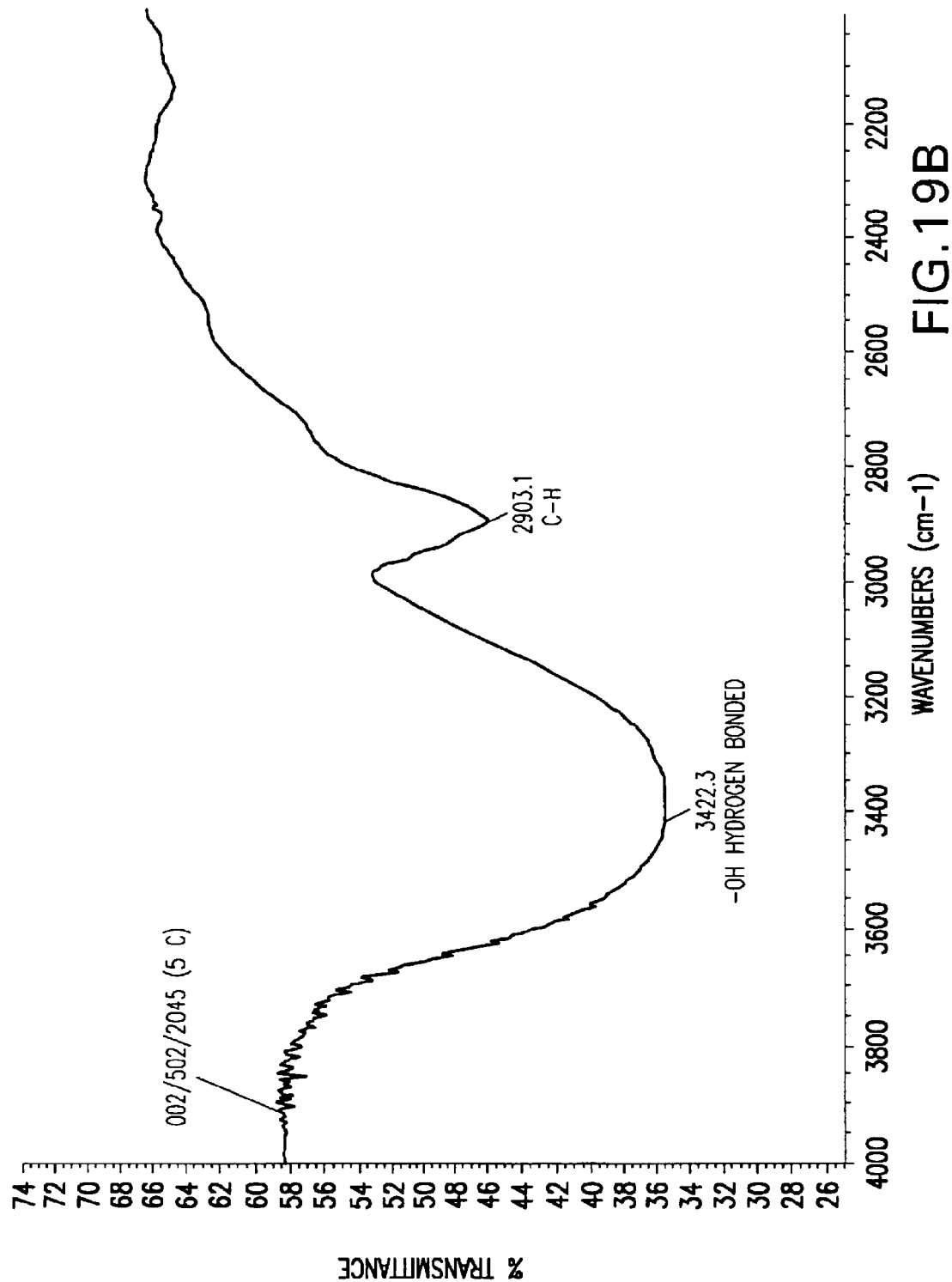
Figure 19C:
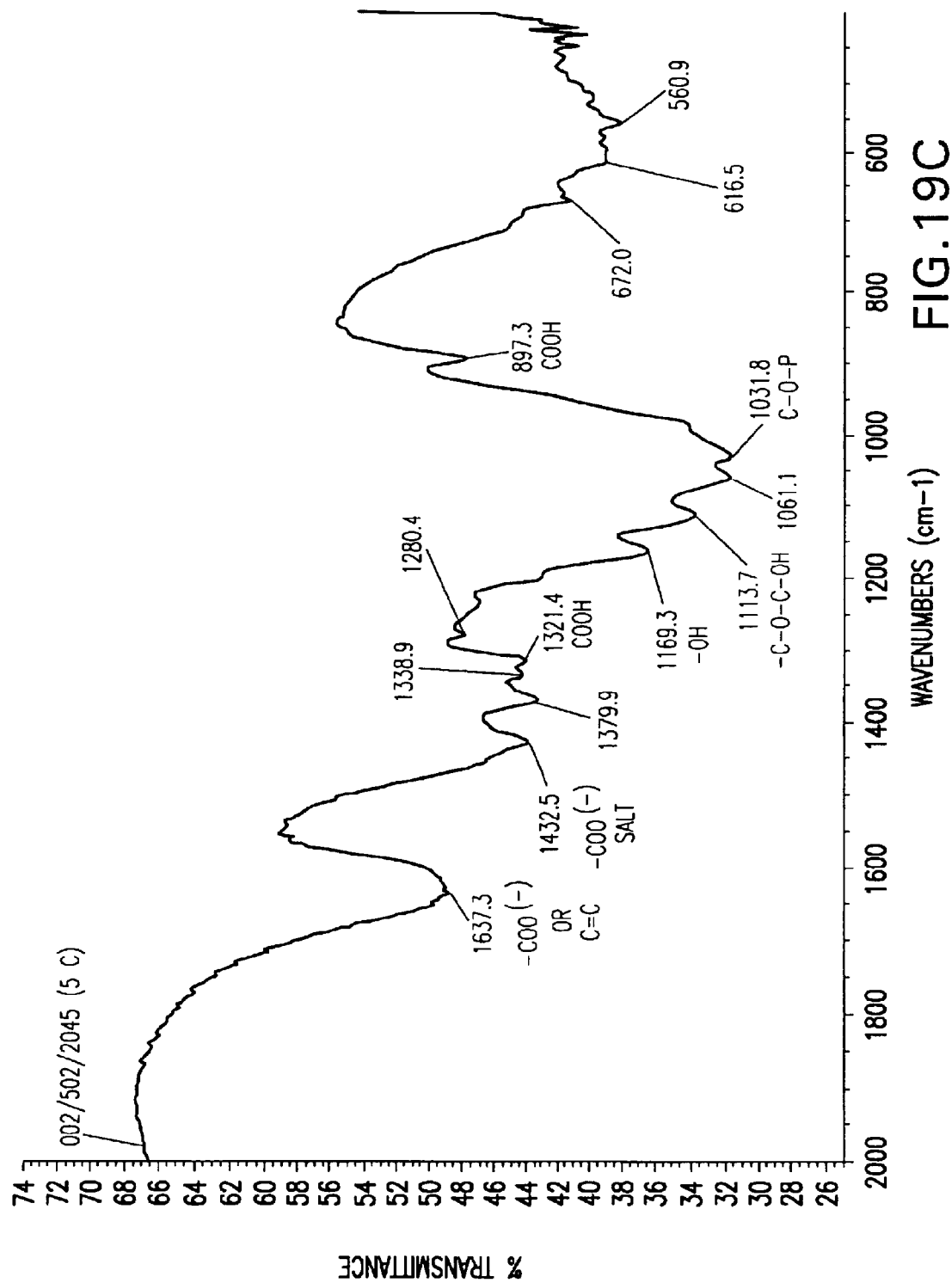
Figure 20A:
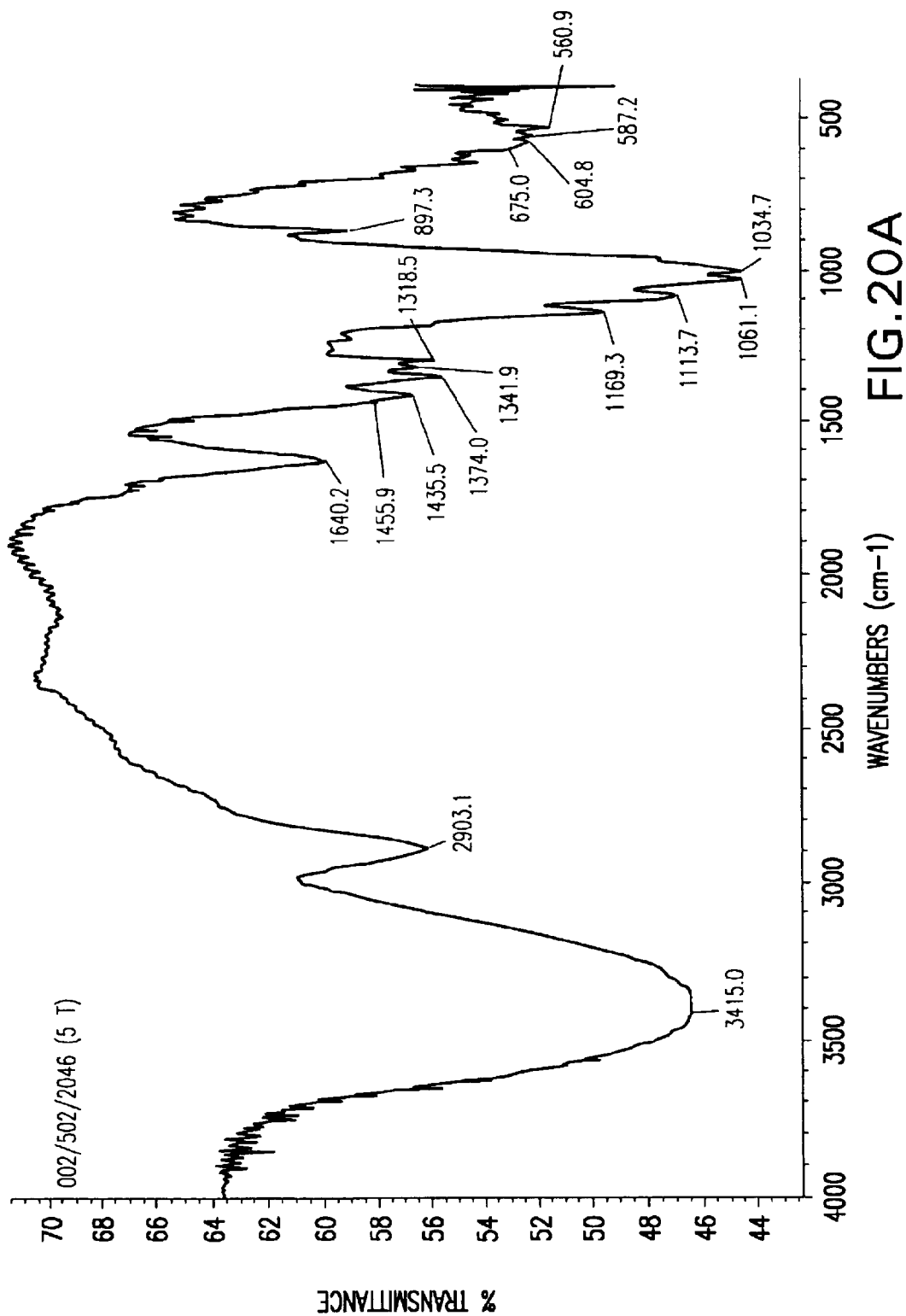
FIGS. 20(A), (B), and (C): IR spectra of an alkaline hydrogen peroxide treated redgram (*Cajanus cajan*) seed coat sample which subsequently was treated with ferric chloride.
Figure 20B:
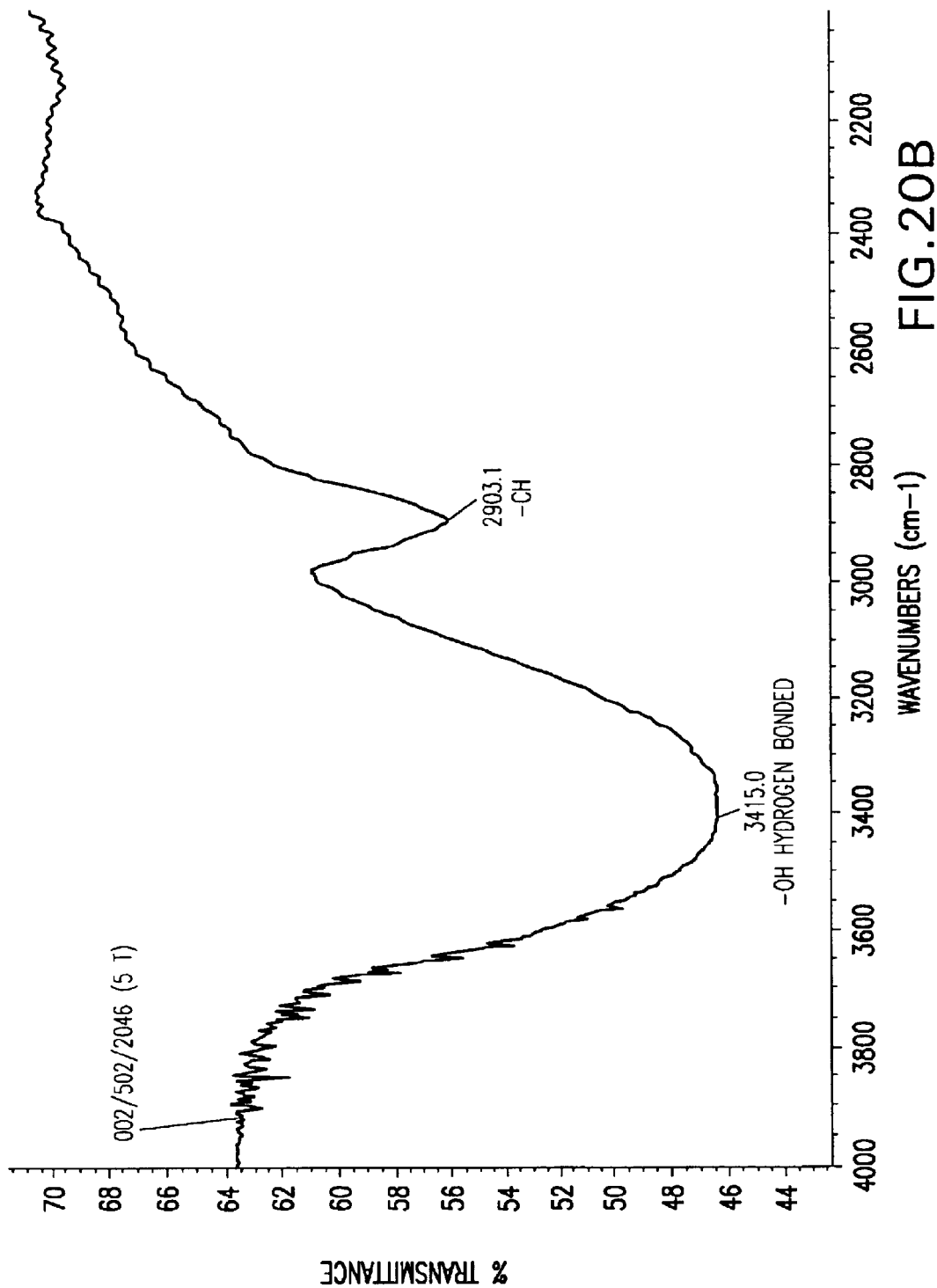
Figure 2O:
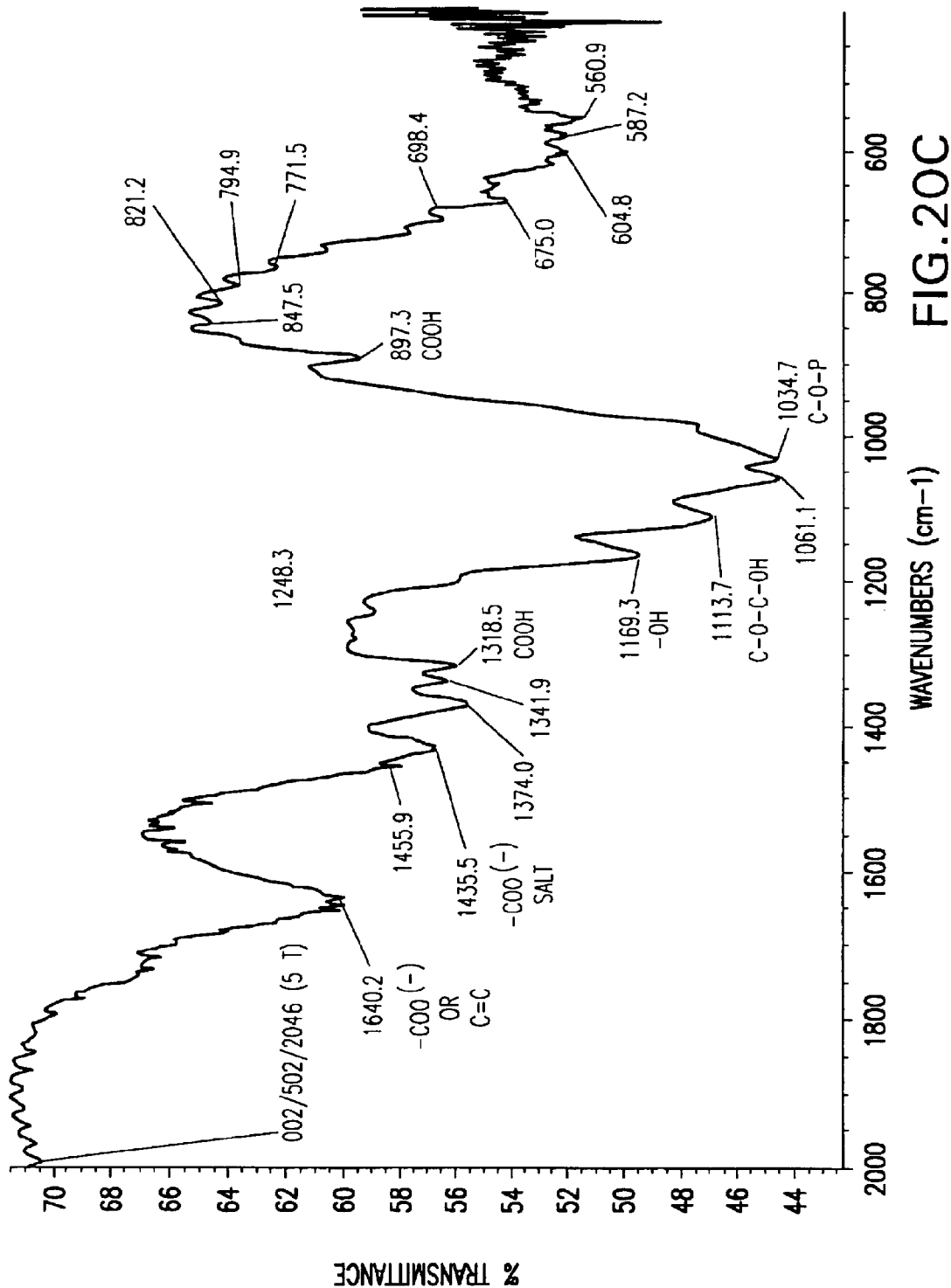

As shown in IR spectra of FIGS. 19 and 20, alkaline hydrogen peroxide treated redgram seed coats (*Cajanus cajan*) resulted in many organometallic bonds.

Figure 21A:
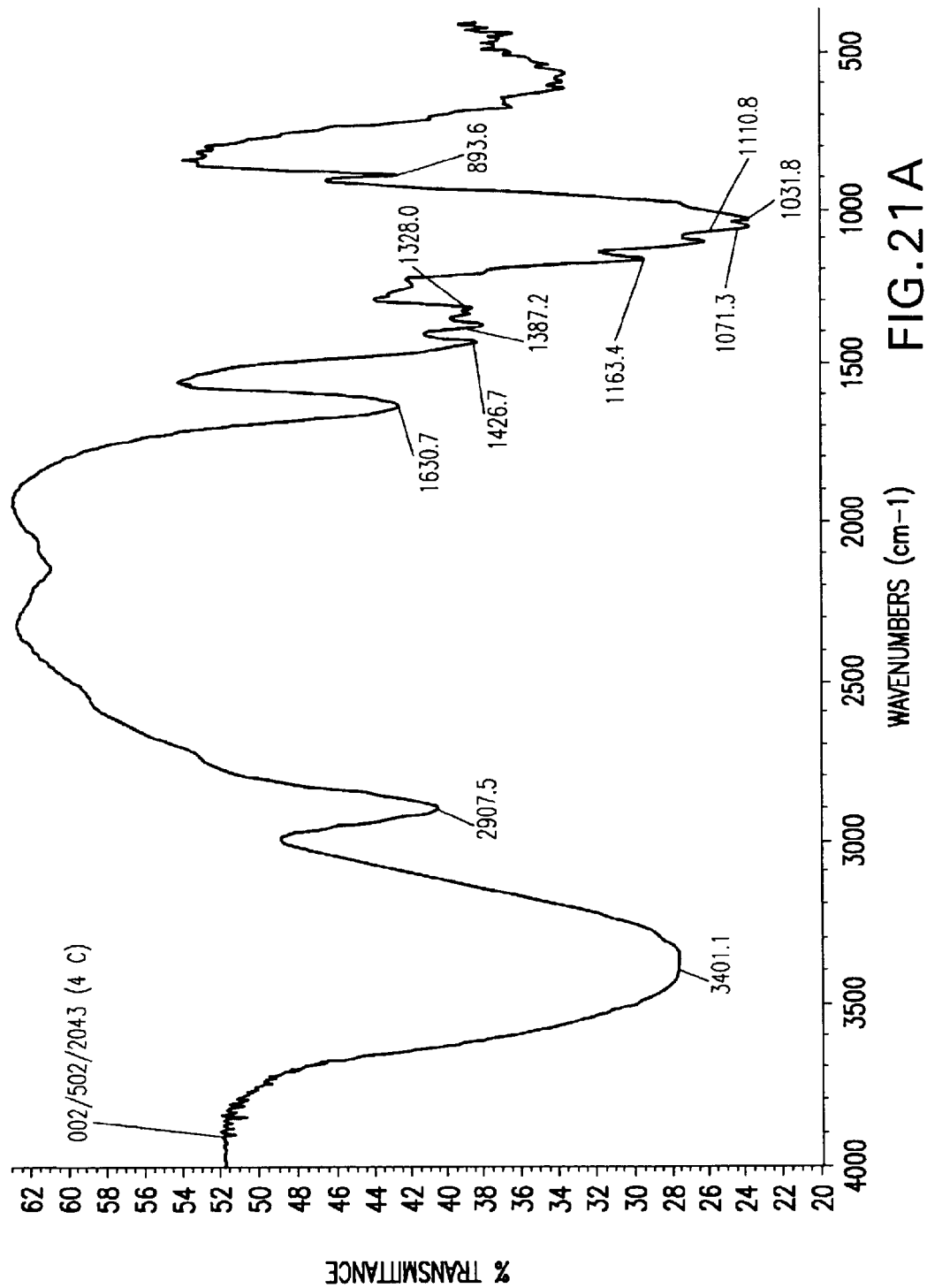
FIGS. 21(A), (B), and (C): IR spectra of an alkaline hydrogen peroxide treated greengram (*Vigna radiata*) seed coat sample.
Figure 21B:
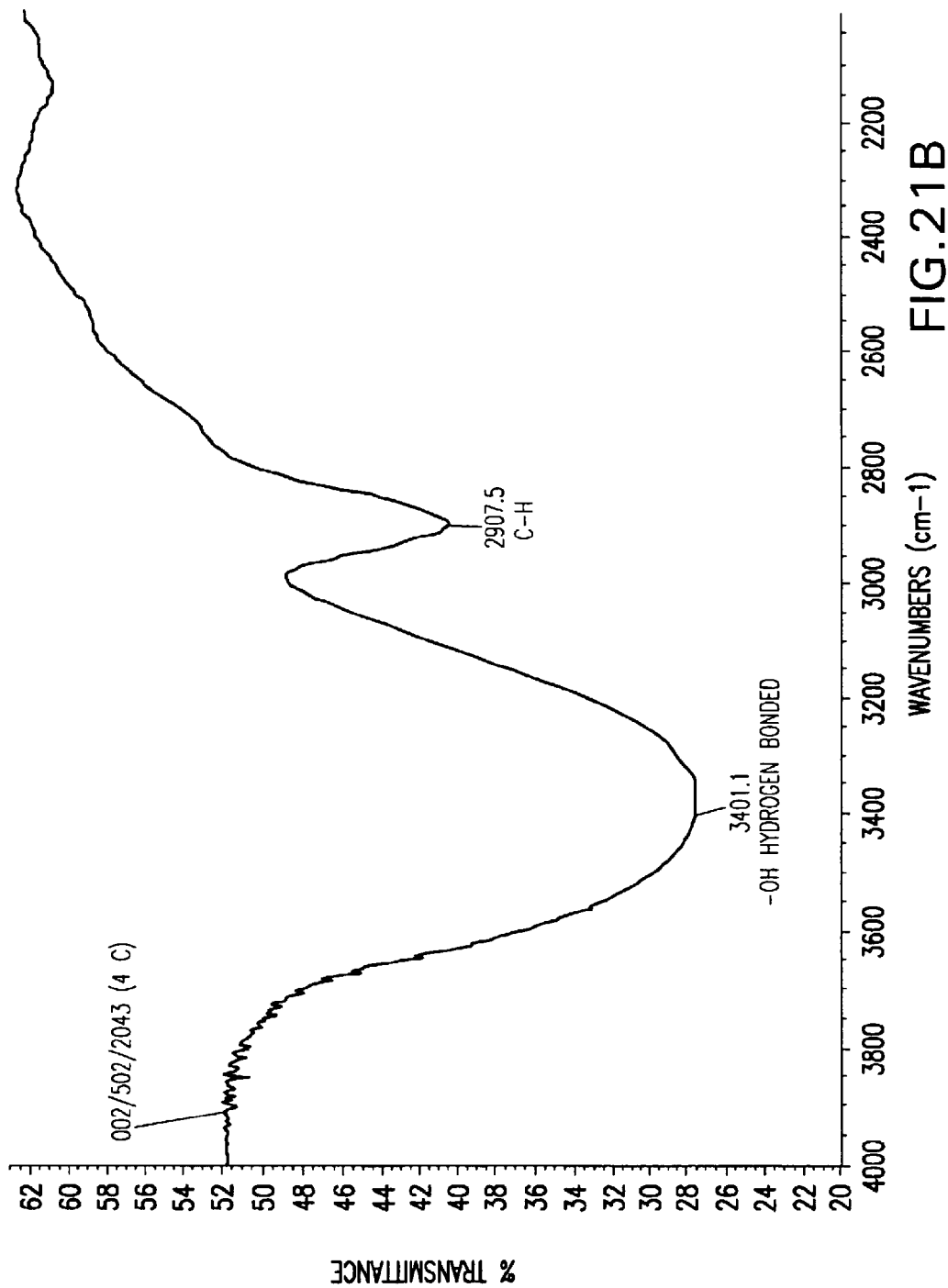
Figure 21C:
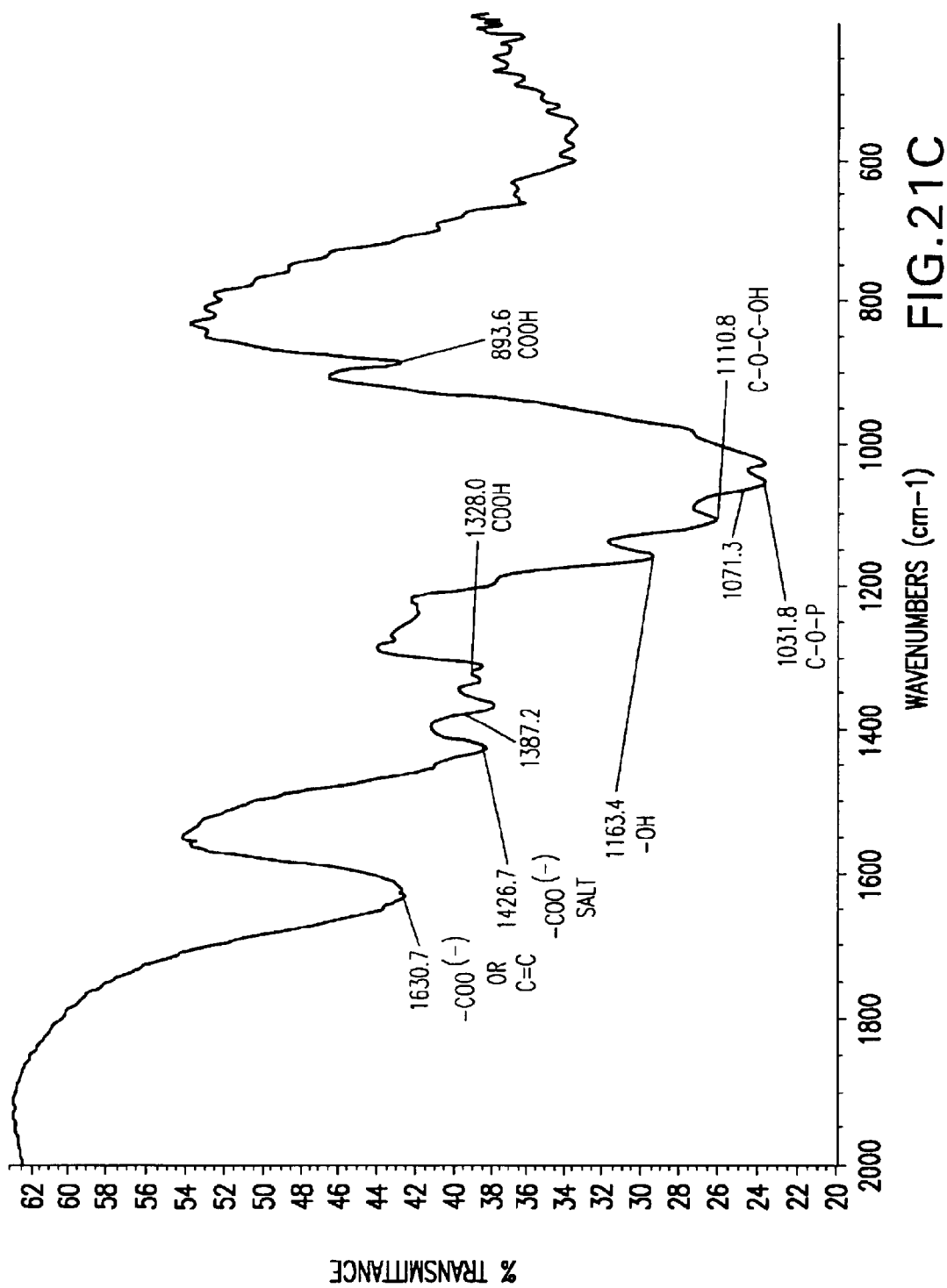
Figure 22A:
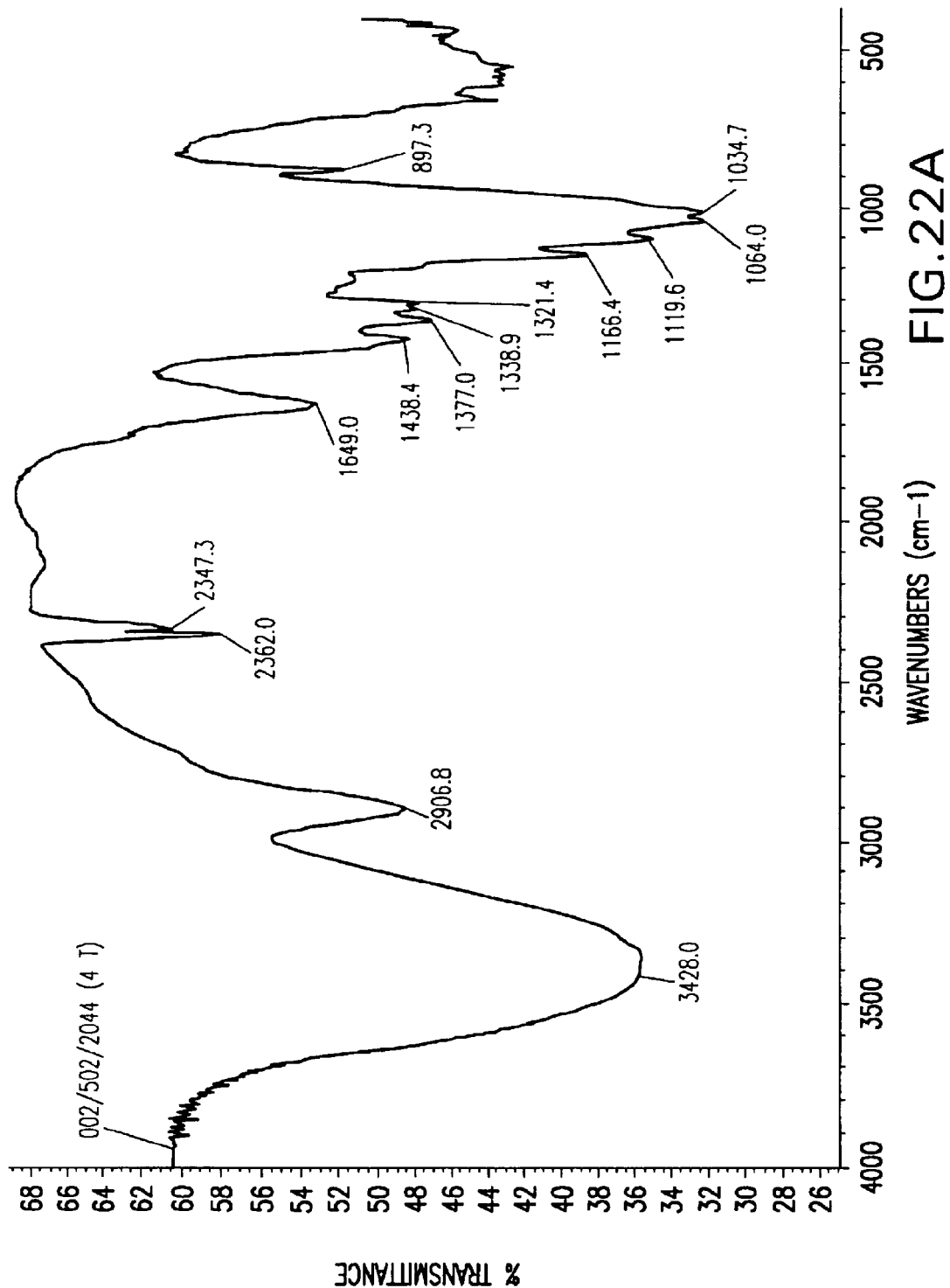
FIGS. 22(A), (B), and (C): IR spectra of an alkaline hydrogen peroxide treated greengram (*Vigna radiata*) seed coat sample which subsequently was treated with ferric chloride.
Figure 22C:
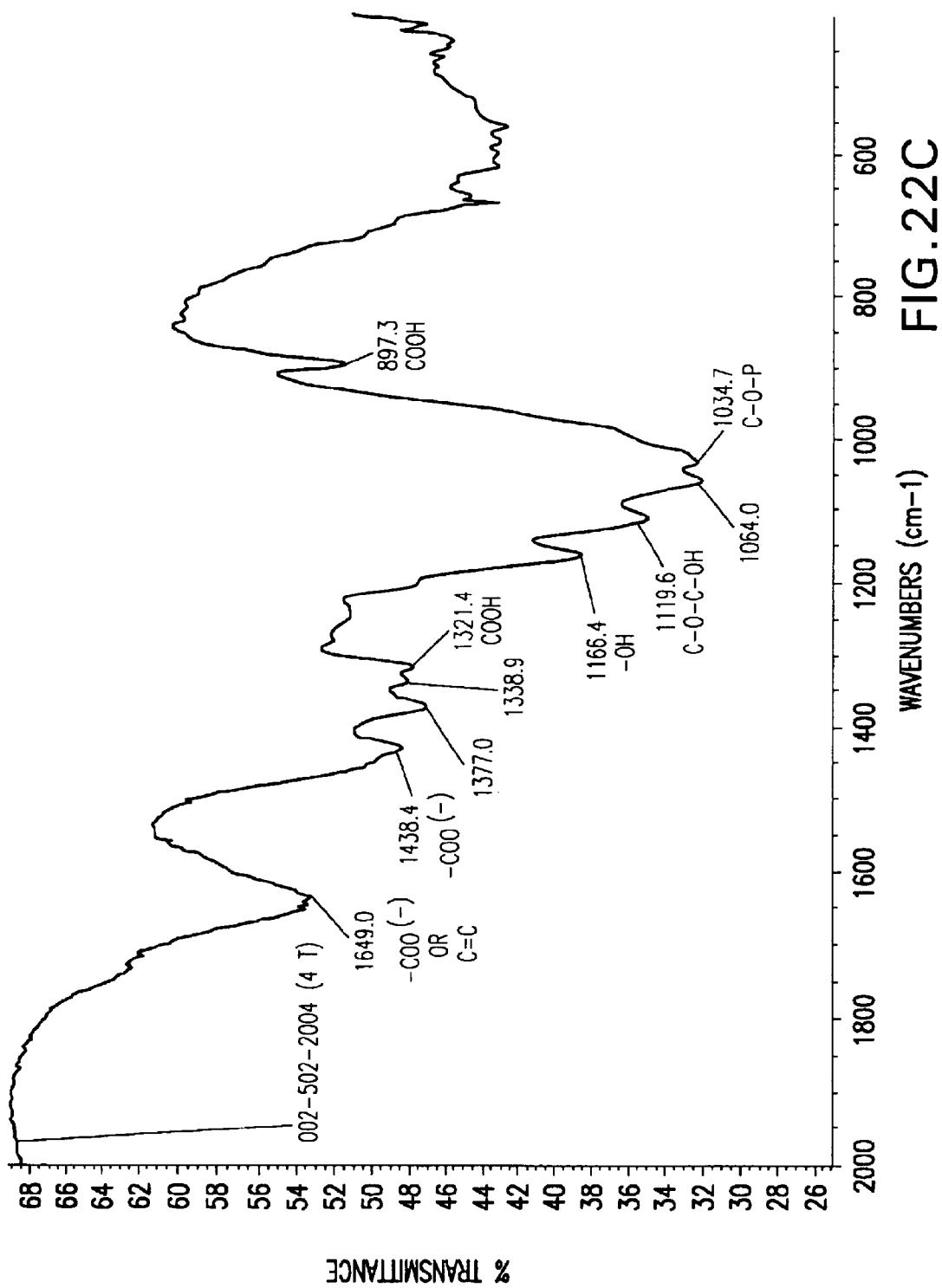

As shown in the IR spectra of FIGS. 21 and 22, alkaline hydrogen peroxide treated greengram (*Vigna radiata*) seed coats resulted in many organometallic bonds, particularly at 2360±10 and 2340±10 wavenumbers ($cm^{-1}$).

Figure 23B:
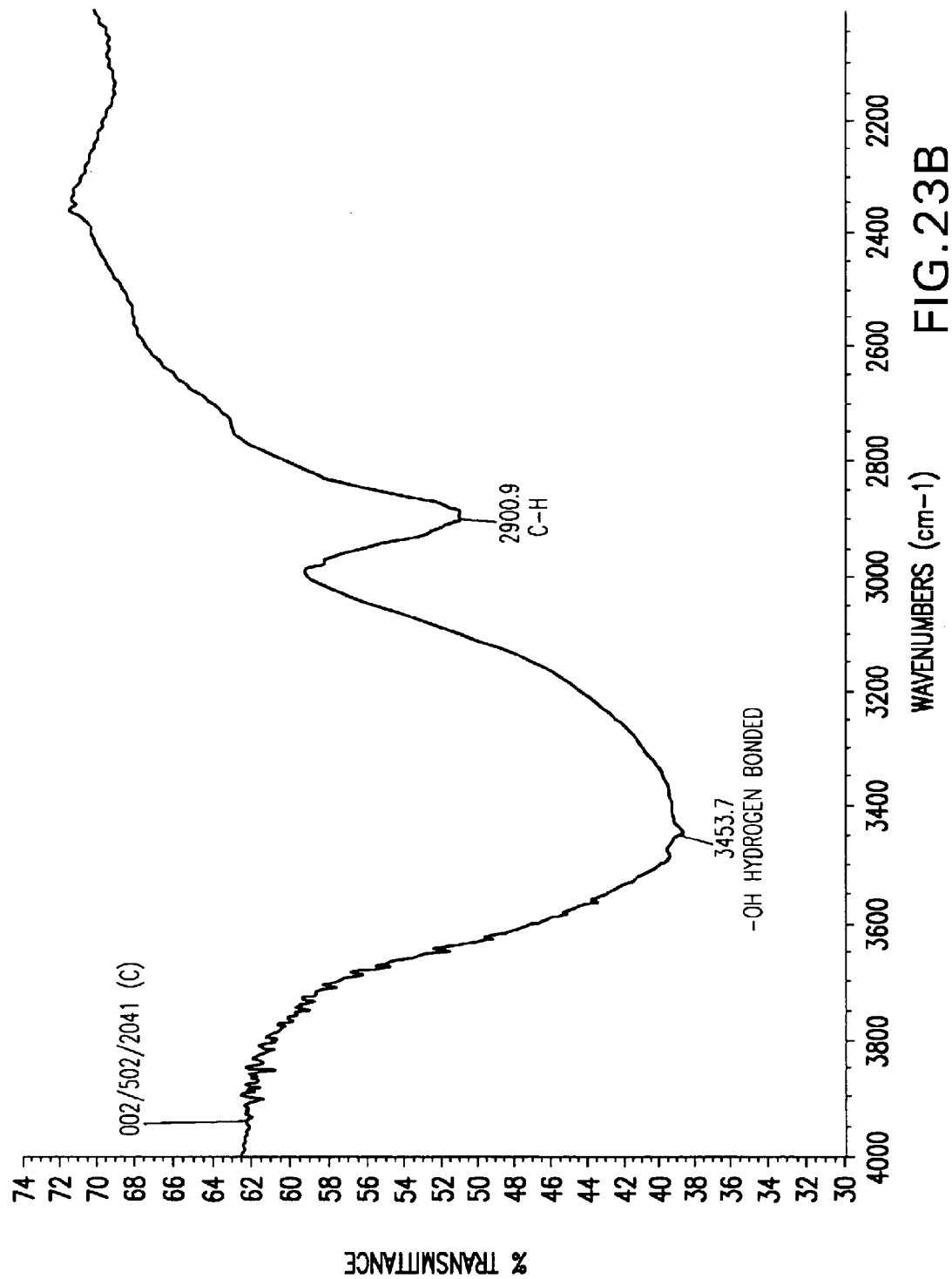
FIGS. 23(A), (B), and (C): IR spectra of an alkaline hydrogen peroxide treated blackgram (*Vigna mungo*) seed coat sample.
Figure 23C:
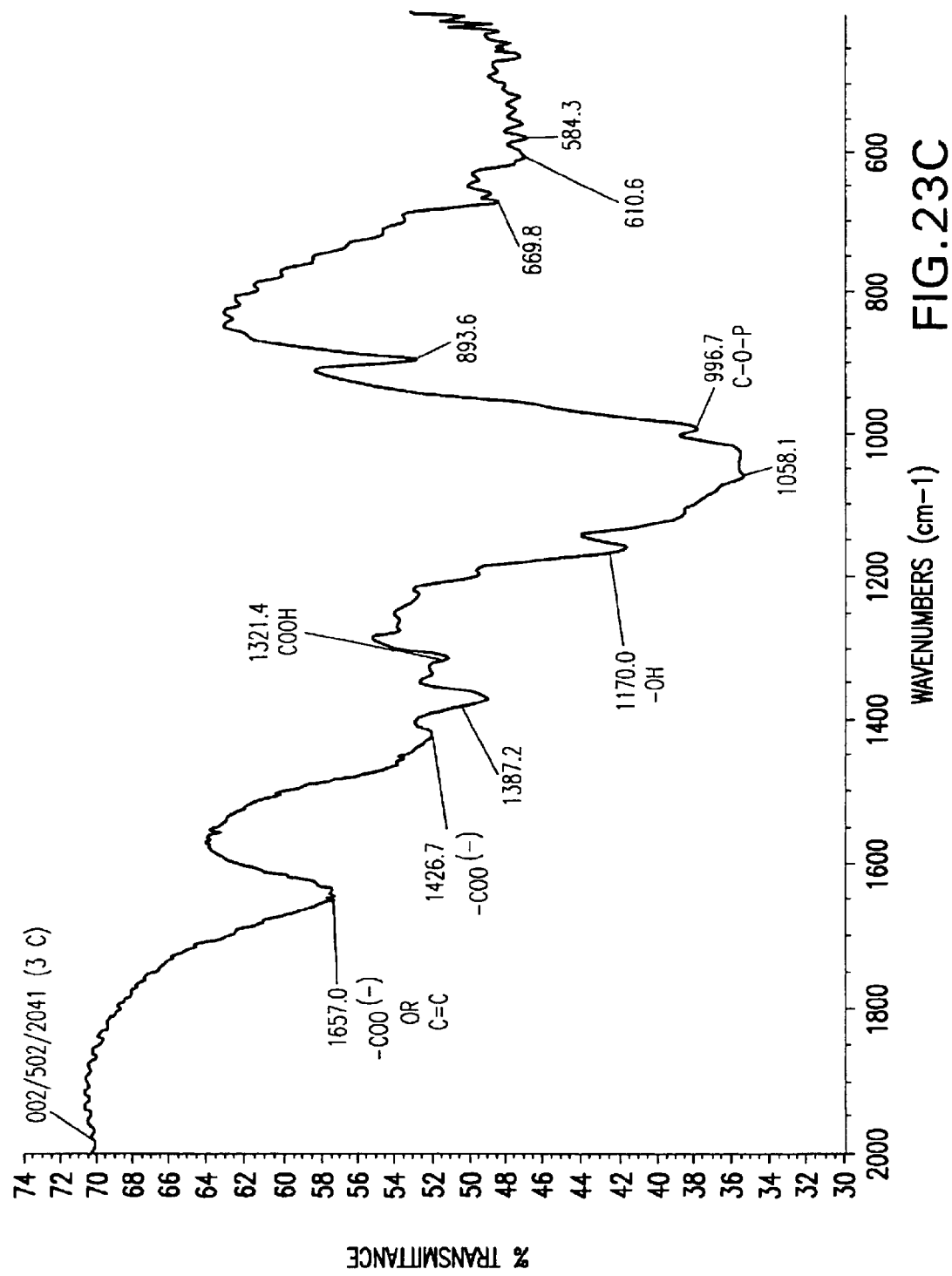
Figure 24A:
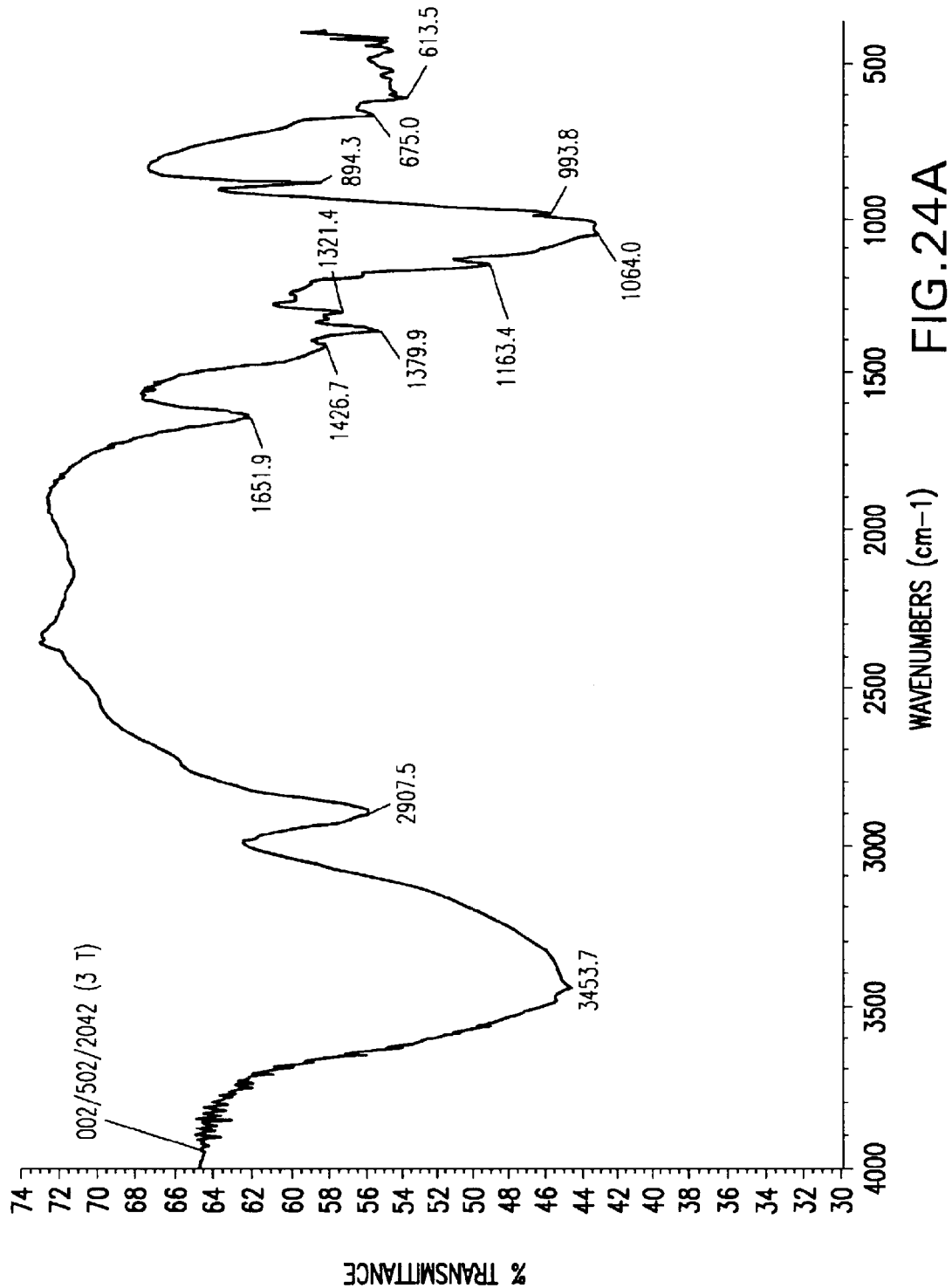
FIGS. 24(A), (B), and (C): IR spectra of an alkaline hydrogen peroxide treated blackgram (*Vigna mungo*) seed coat sample which subsequently was treated with ferric chloride.
Figure 24C:
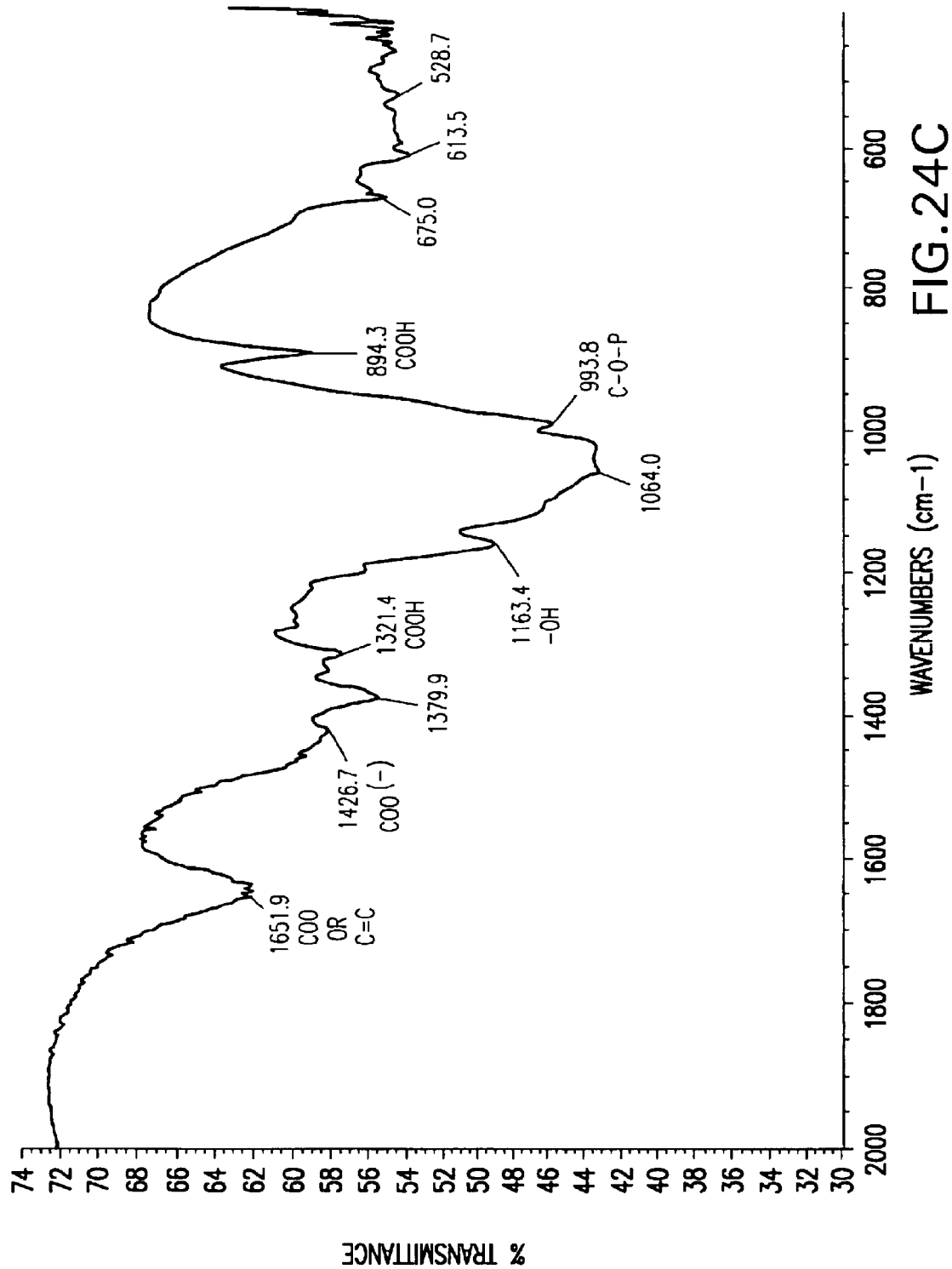

As shown in the IR spectra of FIGS. 23 and 24, alkaline hydrogen peroxide treated blackgram (*Vigna mungo*) seed coats resulted in many organometallic bonds.

Generally, the IR spectra compiled and described above show the capability of organometallic bonding held by agropolymers formed from various agricultural crops according to the present invention.

Example 2

Examination of Metal Sequestration of Agropolymers Derived from Seed Coats or Hulls of *Oryza Sativa, Panicum Miliaceum*, and *Setaria Italica*

In this example, two 1.0 gram agropolymer samples were placed in 1000 mL volumetric flasks, which were filled to 1000 mL with 20.0 PPM standard copper and silver solutions respectively. These agropolymer samples were produced using the alkaline treatment method. The solutions were then kept for 2 hours with regular shaking in between, and were subsequently filtered. The resulting copper and silver present in the solutions was then estimated spectrophotometrically. The difference between the metal content present in solution before and after addition of agropolymer indicates the metal absorbing or sequestering capability of the particular agropolymer used.

Table 1 depicts the results of sequestered copper and silver by agropolymers.

TABLE 1

METAL SEQUESTRATION OF AGROPOLYMERS PRODUCED BY ALKALINE TREATMENT METHOD

| Sample No. | AGROPOLYMER PRODUCED FROM SEED COATS OR HULLS OF: | COPPER CONTENT (MILLIGRAMS) SEQUESTERED BY 1.0 GRAM AGROPOLYMER SAMPLE | SILVER CONTENT (MILLIGRAMS) SEQUESTERED BY 1.0 GRAM AGROPOLYMER SAMPLE |
|---|---|---|---|
| 1. | Setaria italica | 6.0 | 4.1 |
| 2. | Panicum miliaceum | 1.6 | 2.5 |
| 3. | Oryza sativa | 4.5 | 4.7 |

As seen above, a 1.0 gram sample of the *Setaria italica* agropolymer absorbed or sequestered 6.0 and 4.1 milligrams of copper and silver respectively. Also, a 1.0 gram sample of *Panicum miliaceum* agropolymer sequestered 1.6 and 2.5 milligrams of copper and silver respectively. A 1.0 gram sample of the *Oryza sativa* agropolymer sequestered 4.5 and 4.7 milligrams of copper and silver respectively.

Example 3

Examination of Metal Sequestration Using Metal-Impregnated Agropolymers

Agropolymers exhibit a higher capability of metal sequestration in solutions containing higher metal concentrations. Thus, further studies were performed in order to allow the agropolymers to absorb more metal in higher metal concentration solutions with longer retention times of up to 12 to 24 hours. Agropolymers were added to solutions containing metals such as iron or aluminum, and unbound metal was removed by thorough washings with water and/or by neutralization with alkali in cases where the reaction medium had an acidic pH. Subsequently, the material was dried. Metal-impregnated agropolymer was then placed in a beaker, wherein 250 mL of water was added and stirred well. Then, the agropolymer material was filled on a column mode. The agropolymer material present in the column was washed with 50 mL of 1.0 M acid to obtain bound metal. The metal content in acid washings was estimated spectrophotometrically. Table 2, shown below, depicts the amount of the metal content bound on the agropolymers.

TABLE 2

BOUND METAL CONTENT PRESENT IN METAL-IMPREGNATED AGROPOLYMERS PRODUCED BY ALKALINE TREATMENT METHOD

| Sample No. | AGROPOLYMER PRODUCED FROM SEED COATS OR HULLS + METAL | METAL CONTENT (MILLIGRAMS) SEQUESTERED BY 1.0 GRAM AGROPOLYMER SAMPLE |
|---|---|---|
| 1. | Setaria italica + ALUMINUM CHLORIDE | 14.4 |
| 2. | Oryza sativa + ALUMINUM SULFATE | 8.6 |
| 3. | Setaria italica + FERRIC CHLORIDE | 4.7 |

As seen above, a 1.0 gram sample of *Setaria italica* agropolymer impregnated with aluminum chloride absorbed an amount of 14.4 milligrams of aluminum. A 1.0 gram sample of *Oryza sativa* agropolymer impregnated with aluminum sulfate absorbed an amount of 8.6 milligrams of aluminum. A 1.0 gram of *Setaria italica* agropolymer impregnated with ferric chloride absorbed an amount of 4.7 milligrams of iron.

Example 4

Examination of Arsenic Sequestration Using Agropolymers

In this example, agropolymers bound with copper, zinc, and iron were used separately in determining the arsenic sequestering nature of such metal-impregnated agropolymers. 1.0 gram samples of agropolymer were added to 100 mL solutions containing 6.6 PPM sodium arsenate. The solutions were stirred well for a period of 3 to 4 hours. The arsenic content present in the supernatant was estimated spectrophotometrically. As shown below in Table 3, the metal-impregnated agropolymers successfully absorbed significant amounts of arsenic from aqueous solutions. The copper, iron, and zinc-impregnated *Setaria italica* agropolymers absorbed from about 73 to about 75 percent of the arsenic present in solutions whose initial arsenic contents were 6.6 PPM.

TABLE 3

ARSENIC SEQUESTRATION OF METAL-IMPREGNATED AGROPOLYMERS PRODUCED BY ALKALINE TREATMENT METHOD

| Sample No. | AGROPOLYMER PRODUCED FROM SEED COATS OR HULLS + METAL | INITIAL ARSENIC CONTENT (PPM) | ARSENIC SEQUESTERED BY 1.0 GRAM AGROPOLYMER SAMPLE (PERCENTAGE) |
|---|---|---|---|
| 1. | Setaria italica + COPPER SULFATE (IMPREGNATED) | 6.6 | 73.18 |
| 2. | Setaria italica + FERRIC CHLORIDE (IMPREGNATED) | 6.6 | 73.3 |
| 3. | Setaria italica + ZINC CHLORIDE (IMPREGNATED) | 6.6 | 75 |

Further studies showed that agropolymers without metal impregnation were also successful at absorbing arsenic. As shown in Table 4, agropolymers significantly reduced the arsenic content of natural waters containing arsenic. The samples of natural waters containing arsenic used herein were collected in West Bengal State in India.

TABLE 4

ARSENIC SEQUESTRATION OF AGROPOLYMERS IN NATURAL WATERS CONTAINING ARSENIC

| Sample No. | AGROPOLYMER PRODUCED FROM SEED COATS OR HULLS | INITIAL ARSENIC CONTENT PRESENT IN NATURAL WATERS | ARSENIC CONTENT PRESENT IN NATURAL WATERS AFTER TREATMENT WITH AGROPOLYMERS FOR 12 HOURS |
|---|---|---|---|
| 1. | Setaria italica | 325 PPB | 40 PPB |
| 2. | Oryza sativa | 325 PPB | 50 PPB |

Example 5

Examination of Fluoride Sequestration Using Agropolymers

In this example, it was observed that agropolymers cannot absorb fluoride ion except when the agropolymer is bound with metals such as aluminum. Agropolymers bound with aluminum sulfate were added to a solution containing 5 PPM sodium fluoride. Specifically, 1000 milligrams of metal-impregnated agropolymer were added to 50 mL of a 5 PPM sodium fluoride solution. Two metal-impregnated agropolymer samples absorbed fluoride ion in amounts of 77.4% and 90.87% respectively.

These metal-impregnated agropolymer samples were also able to remove fluoride ion from natural water samples containing fluoride. When a natural water samples having 4.15 PPM fluoride content were mixed with an aluminum chloride-impregnated *Setaria Italica* agropolymer sample and an aluminum sulfate-impregnated *Oryza Sativa* agropolymer sample respectively, in the amount of 1.0 gram agropolymer sample per liter of water, significant fluoride ion removal was observed.

Example 6

Examination of the Effects of pH Levels on Metal Sequestration of Agropolymers In this example, the parameters for best metal sequestration and bound metal elution were studied. The effectiveness of the agropolymers disclosed herein is dependent upon pH levels suitable for metal sequestration. Typically, metals bound to the agropolymers disclosed herein can be eluted with mineral acids including sulfuric acid, nitric acid, or hydrochloric acid at pH levels of from about 0.8 to about 1.0. Furthermore, the agropolymer materials typically have maximum metal or ion sequestering capabilities at neutral pH ranges for most of the metals tested.

Example 7

Examination of Iron Sequestration Using Agropolymers

In this example, ferric chloride solution was passed through 1.0 gram samples of various agropolymers in a column at a flow rate of 2 mL per minute. The agropolymers had been treated using the alkaline hydrogen peroxide treatment, and bound metal content was estimated by eluting the bound metal with solutions of about 2% to 5% hydrochloric acid. Before elution, the unbound excess metal from the column was removed by washing with 2.5 pH hydrochloric acid solution. The bound metal content was estimated spectrophotometrically using par reagent at a wavelength of 535 nm.

Table 5 depicts the iron sequestration of agropolymers derived from *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp.

TABLE 5

IRON SEQUESTRATION OF AGROPOLYMERS PRODUCED BY ALKALINE HYDROGEN PEROXIDE TREATMENT METHOD

| Sample No. | AGROPOLYMER PRODUCED FROM SEED COATS OR HULLS OF: | IRON CONTENT (MILLIGRAMS) SEQUESTERED BY 1.0 GRAM AGROPOLYMER SAMPLE |
|---|---|---|
| 1. | *Oryza sativa* | 5.15 |
| 2. | *Panicum miliaceum* | 3.125 |
| 3. | *Setaria italica* | 5.0 |
| 4. | *Cajanus cajan* | 11.75 |
| 5. | *Vigna mungo* | 6.875 |
| 6. | *Vigna radiata* | 17.18 |
| 7. | *Triticum* sp. | 3.125 |
| 8. | *Ricinus communis* | 2.3 |
| 9. | *Helianthus annus* | 11.25 |
| 10. | *Gossypium* sp. | 6.25 |
| 11. | *Arachis sp.* (Red seed coat or cover of groundnut) | 20.56 |

Generally, the results of the above examples illustrate the usefulness and effectiveness of agropolymers and metal-impregnated agropolymers in affinity columns, or the like, to purify aqueous solutions by binding, removing, sequestering, or reacting with reactive metals and ions. Thus, the agropolymer materials may be useful in various industrial applications including, but not limited to, the reduction of ground water contamination by industrial waste water, the improvement of affinity chromatography systems, and possibly even the manufacture of various agropolymer derivatives (such as biodegradable plastics, resins, or carrier materials).

I claim:

1. An agropolymer comprising a carbohydrate and silica matrix obtained from an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, said carbohydrate and silica matrix being substantially devoid of proteins, tannins and polyphenols, said matrix further comprising metal binding reactive sites.

2. The agropolymer of claim 1, wherein said carbohydrate and silica matrix is obtained from plant parts of said agricultural crop, said plant parts being selected from the group consisting of seed coats, seed covers, hulls, and husks.

3. The agropolymer of claim 2, wherein said plant parts are micronized, and wherein said micronized plant parts are treated with ferric chloride and dried, said treated micronized plant parts subsequently being subjected to infrared spectroscopy, thereby revealing reactive, organometallic bonds.

4. The agropolymer of claim 3, wherein said micronized plant parts are derived from a husk of *Triticum* sp, and wherein said plant parts, after undergoing infrared spectroscopy reveal organometallic bonds at 2360±10 and 2340±10 wave numbers ($cm^{-1}$).

5. The agropolymer of claim 3, wherein said micronized plant parts are derived from a member of the group consisting of a seed coat of *Gossypium* sp and a seed coat of *Vigna radiata*, and wherein said plant parts, after first undergoing alkaline hydrogen peroxide treatment, reveal organometallic bonds through infrared spectroscopy at 2360±10 and 2340±10 wave numbers ($cm^{-1}$).

6. The agropolymer of claim 3, wherein said micronized plant parts are derived from a member of the group consisting of a seed coat of *Panicum miliaceum*, a seed coat of

*Setaria italica*, a seed coat of *Cajanus cajan*, a seed coat of *Vigna mungo*, a seed coat of *Ricinus communis*, and a seed coat of *Helianthus annus*, and wherein said plant parts, after first undergoing alkaline hydrogen peroxide treatment, reveal organometallic bonds characteristic of said plant parts.

7. An agropolymer consisting of a carbohydrate and silica matrix obtained from an agricultural crop selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp., said carbohydrate and silica matrix being substantially devoid of proteins, tannins and polyphenols, said matrix further comprising metal binding reactive sites.

8. The agropolymer of claim 7, wherein said carbohydrate a and/or and silica matrix is obtained from plant parts of said agricultural crop, said plant parts being selected from the group consisting of seed coats, seed covers, hulls, and husks.

9. The agropolymer of claim 8, wherein said plant parts are micronized, and wherein said micronized plant parts are treated with ferric chloride and dried, said treated micronized plant parts subsequently being subjected to infrared spectroscopy, thereby revealing reactive, organometallic bonds.

10. The agropolymer of claim 9, wherein said micronized plant parts are derived from a husk of *Triticum* sp, and wherein said plant parts, after undergoing infrared spectroscopy reveal organometallic bonds at 2360±10 and 2340±10 wave numbers (cm-1).

11. The agropolymer of claim 9, wherein said micronized plant parts are derived from a member of the group consisting of a seed coat of *Gossypium* sp and a seed coat of *Vigna radiata*, and wherein said plant parts, after first undergoing alkaline hydrogen peroxide treatment, reveal organometallic bonds, through infrared spectroscopy at 2360±10 and 2340±10 wave numbers (cm-1).

12. The agropolymer of claim 9, wherein said micronized plant parts are derived from a member of the group consisting of a seed coat of *Panicum miliaceum*, a seed coat of *Setaria italica*, a seed coat of *Cajanus cajan*, a seed coat of *Vigna mungo*, a seed coat of *Ricinus communis*, and a seed coat of *Helianthus annus*, and wherein said plant parts, after first undergoing alkaline hydrogen peroxide treatment, reveal organometallic bonds characteristic of said plant parts.

13. An agropolymer comprising a carbohydrate and silica matrix, wherein said matrix is obtained from plant parts of an agricultural crop, wherein said agricultural crop is selected from the group consisting of *Oryza sativa, Panicum miliaceum, Setaria italica, Cajanus cajan, Vigna mungo, Vigna radiata, Triticum* sp., *Ricinus communis, Helianthus annus, Gossypium* sp., and *Arachis* sp, wherein said matrix is substantially devoid of proteins, tannins, and polyphenols, wherein said matrix further comprises metal-binding reactive sites, wherein said plant parts are selected from the group consisting of seed coats, seed covers, hulls, and husks, wherein said plant parts are micronized, wherein said micronized plant parts have been treated with alkali and/or hydrogen peroxide, and wherein said treated, micronized plant parts enhance the ability of the agropolymer to sequester ions from water.

\* \* \* \* \*